US011719791B2

(12) United States Patent
Shimizu et al.

(10) Patent No.: US 11,719,791 B2
(45) Date of Patent: Aug. 8, 2023

(54) DISTANCE MEASURING DEVICE AND DISTANCE MEASURING METHOD

(71) Applicant: Kabushiki Kaisha Toshiba, Tokyo (JP)

(72) Inventors: Yutaka Shimizu, Yokohama Kanagawa (JP); Shoji Ootaka, Yokohama Kanagawa (JP); Ichiro Seto, Fuchu Tokyo (JP); Katsuya Nonin, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 51 days.

(21) Appl. No.: 17/331,021

(22) Filed: May 26, 2021

(65) Prior Publication Data

US 2021/0333376 A1    Oct. 28, 2021

Related U.S. Application Data

(63) Continuation of application No. 16/883,269, filed on May 26, 2020, now Pat. No. 11,047,961, which is a
(Continued)

(30) Foreign Application Priority Data

Mar. 17, 2017 (JP) ................................. 2017-053380
Jul. 14, 2017 (JP) ................................. 2017-138307

(51) Int. Cl.
*G01S 7/4912* (2020.01)
*G01S 17/32* (2020.01)
(Continued)

(52) U.S. Cl.
CPC ............ *G01S 7/4912* (2013.01); *G01S 13/36* (2013.01); *G01S 13/84* (2013.01); *G01S 17/32* (2013.01); *G01S 13/38* (2013.01)

(58) Field of Classification Search
CPC .......... G01S 13/36; G01S 13/38; G01S 13/84; G01S 17/32; G01S 7/4912
See application file for complete search history.

(56) References Cited

U.S. PATENT DOCUMENTS 4,804,961 A   2/1989   Hane
5,227,784 A   7/1993   Masamori et al.
(Continued)

FOREIGN PATENT DOCUMENTS

JP    08-166443      6/1996
JP    2001-51044 A   2/2001
(Continued)

*Primary Examiner* — Timothy X Pham
(74) *Attorney, Agent, or Firm* — Allen & Overy LLP

(57) ABSTRACT

A distance measuring device includes a calculating section that calculates, based on phase information acquired by a first device and a second device, at least one of which is movable, a distance between the first device and the second device. The first device includes a first transceiver that transmits three or more first carrier signals and receives three or more second carrier signals using an output of a first reference signal source. The second device includes a second transceiver that transmits the three or more second carrier signals and receives the three or more first carrier signals using an output of a second reference signal source. The calculating section calculates the distance based on a phase detection result obtained by reception of the first and second carrier signals and corrects the calculated distance based on information concerning an amplitude ratio of the first carrier signals received by the second transceiver.

4 Claims, 45 Drawing Sheets

Related U.S. Application Data continuation of application No. 15/706,091, filed on Sep. 15, 2017, now Pat. No. 10,712,435.

(51) Int. Cl.
*G01S 13/36* (2006.01)
*G01S 13/84* (2006.01)
*G01S 13/38* (2006.01)

(56) References Cited

U.S. PATENT DOCUMENTS

| | | |
|---|---|---|
| 5,589,821 A | 12/1996 | Sallen et al. |
| 8,094,061 B2 | 1/2012 | Aoki |
| 9,319,840 B2 | 4/2016 | Porzio Giusto |
| 10,466,350 B2 * | 11/2019 | Kluge .................... G01S 13/84 |
| 2006/0083406 A1 | 4/2006 | Ishimura et al. |
| 2010/0167662 A1 | 7/2010 | Kluge et al. |
| 2010/0277360 A1 | 11/2010 | Lee |
| 2010/0321245 A1 * | 12/2010 | Aoki ....................... G01S 13/87 |
| | | 455/73 |
| 2013/0288611 A1 | 10/2013 | Kluge et al. |
| 2014/0327517 A1 | 11/2014 | Portet |
| 2015/0084808 A1 | 3/2015 | Vacanti |
| 2017/0067989 A1 | 3/2017 | Nielsen |
| 2018/0267154 A1 | 9/2018 | Ootaka et al. |

FOREIGN PATENT DOCUMENTS

| | | |
|---|---|---|
| JP | 2010-147657 A | 7/2010 |
| JP | 2014-513271 A | 5/2014 |
| WO | 2008-102686 A1 | 8/2008 |

* cited by examiner

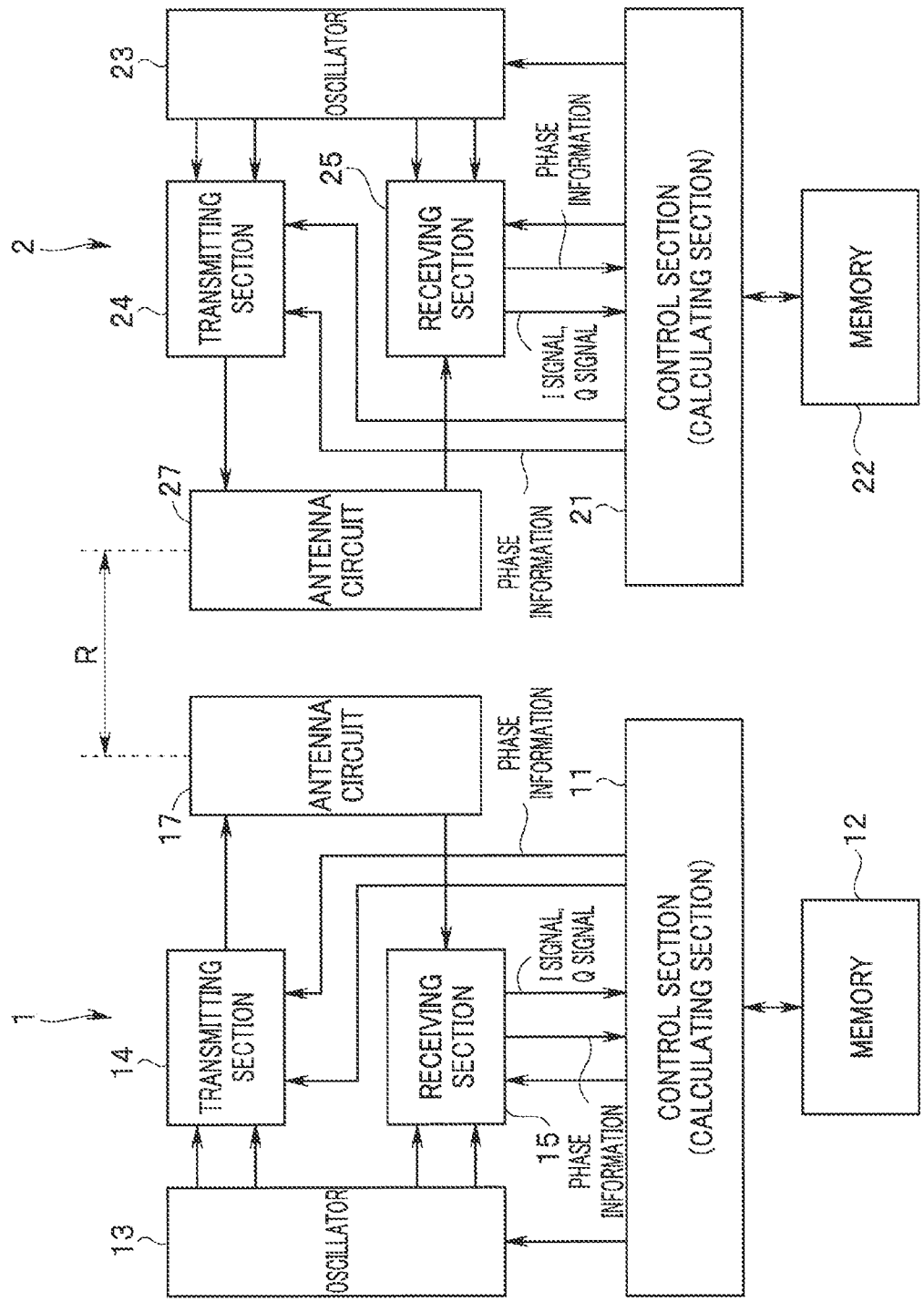

DISTANCE MEASURING DEVICE AND DISTANCE MEASURING METHOD

CROSS-REFERENCE TO RELATED APPLICATIONS

This application is a continuation of application Ser. No. 16/883,269 filed May 26, 2020, which is a continuation of application Ser. No. 15/706,091 filed Sep. 15, 2017 and is based upon and claims the benefit of priority from the prior Japanese Patent Applications No. 2017-053380, filed on Mar. 17, 2017 and No. 2017-138307, filed on Jul. 14, 2017; the entire contents of which are incorporated herein by reference.

FIELD

Embodiments of the present invention relate to a distance measuring device and a distance measuring method.

BACKGROUND

In recent years, keyless entry for facilitating unlocking and locking of a car has been adopted in many cars. This technique performs unlocking and locking of a door using communication between a key of an automobile and the automobile. Further, in recent years, a smart entry system that makes it possible to perform, with a smart key, unlocking and locking of a door lock and start an engine without touching a key has been also adopted.

However, a lot of incidents occur in which an attacker intrudes into communication between a key and an automobile and steals the automobile. As measures against the attack (so-called relay attack), a measure for measuring the distance between the key and the automobile and, when determining that the distance is equal to or larger than a predetermined distance, it is being reviewed to prevent control of the automobile by communication.

As a distance measuring technique, many techniques exist, such as a two-cycle CW (continuous wave) scheme, an FM (frequency modulated) CW scheme, a Doppler scheme, and a phase detection scheme. In general, in distance measurement, a distance from a measuring device to a target object is calculated by providing a transmitter and a receiver in the same housing of the measuring device, hitting a radio wave emitted from the transmitter against the target object, and detecting a reflected wave of the radio wave with the receiver.

However, when it is taking into account a relatively small reflection coefficient of the target object, limitation on output power due to the Radio Law, and the like, in the distance measuring technique for measuring a distance using the reflected wave, a measurable distance is relatively small and is insufficient for use in the measures against the relay attack.

BRIEF DESCRIPTION OF THE DRAWINGS

FIG. 1 is a block diagram showing a distance measuring system in which a distance measuring device according to a first embodiment of the present invention is adopted;

DETAILED DESCRIPTION

Figure 2A:
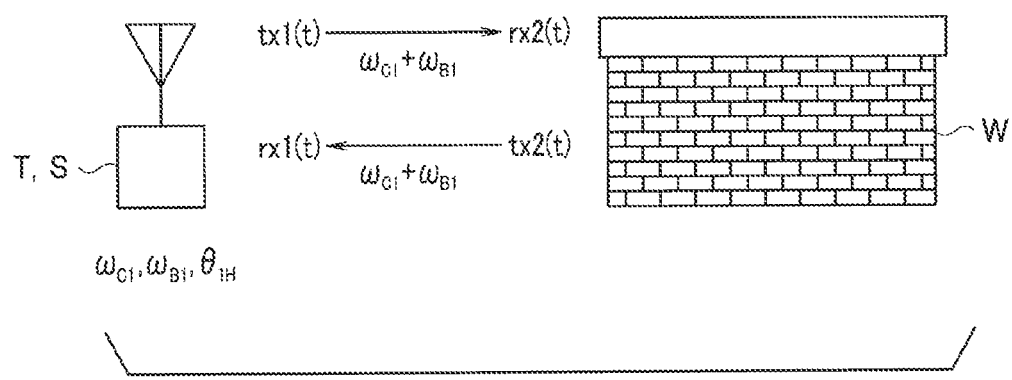
FIG. 2A is an explanatory diagram for explaining the principle of distance measurement by a phase detection scheme for detecting a phase of a reflected wave and problems of the distance measurement.

A distance measuring device according to an embodiment is a distance measuring device that calculates a distance on a basis of carrier phase detection, the distance measuring device including a calculating section configured to calculate, on a basis of phase information acquired by a first device and a second device, at least one of which is movable, a distance between the first device and the second device. The first device includes: a first reference signal source; and a first transceiver configured to transmit three or more first carrier signals and receive three or more second carrier signals using an output of the first reference signal source. The second device includes: a second reference signal source configured to operate independently from the first reference signal source; and a second transceiver configured to transmit the three or more second carrier signals and receive the three or more first carrier signals using an output of the second reference signal source. The calculating section calculates the distance on a basis of a phase detection result obtained by reception of the first and second carrier signals and corrects the calculated distance on a basis of information concerning an amplitude ratio of the first carrier signals received by the second transceiver or information concerning an amplitude ratio of the second carrier signals received by the first transceiver.

Embodiments of the present invention are explained below in detail with reference to the drawings.

First Embodiment

FIG. 1 is a block diagram showing a distance measuring system in which a distance measuring device according to a first embodiment of the present invention is adopted.

In the present embodiment, an example is explained in which a phase detection scheme for detecting a phase of an unmodulated carrier is adopted and communication-type distance measurement for calculating a distance between respective devices through communication between the respective devices is adopted. In a general phase detection scheme for detecting a phase of a reflected wave, a measurable distance is relatively short as explained above. Therefore, in the present embodiment, the communication-type distance measurement for performing communication between devices is adopted. However, since respective transmitters of the respective devices independently operate from each other, initial phases of transmitted radio waves from the respective transmitters are different from each other. An accurate distance cannot be calculated by the phase detection scheme in the past for calculating a distance according to a phase difference. Therefore, in the present embodiment, as explained below, phase information calculated by reception of one device is transmitted to the other device to make it possible to calculate an accurate distance in the other device.

First, the principle of distance measurement by the phase detecting scheme for detecting a phase of a reflected wave and problems of the distance measurement are explained with reference to the explanatory diagrams of FIGS. 2A and 2B.

(Phase Detection Scheme)

In the phase detection scheme, for distance measurement, signals having two frequencies deviating from a center angular frequency $\omega_{C_1}$ by an angular frequency are transmitted. In a distance measuring device that measures a distance using a reflected wave, a transmitter and a receiver are provided in the same housing. A transmission signal (a radio wave) emitted from the transmitter is reflected on a target object and a reflected wave of the radio wave is received by the receiver.

Figure 2B:
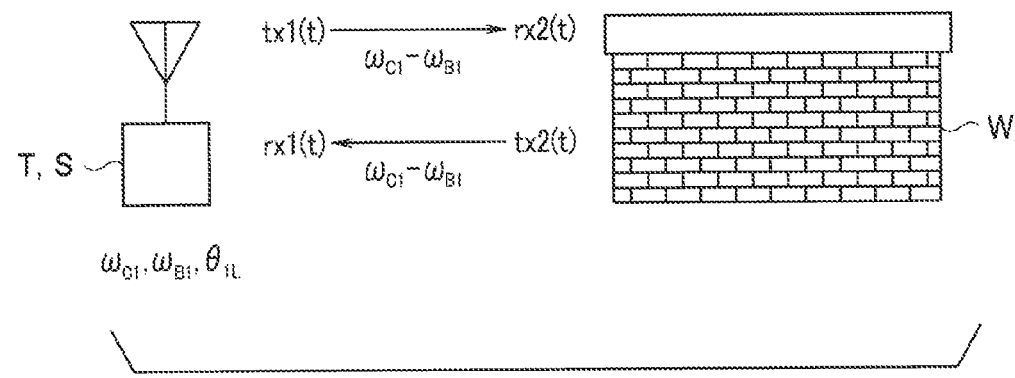
FIG. 2B is an explanatory diagram for explaining the principle of the principle of distance measurement by a phase detection scheme for detecting a phase of a reflected wave and the problems of the distance measurement.

FIGS. 2A and 2B show this state. A radio wave emitted from a transmitter T is reflected by a wall W and received by a receiver S.

As shown in FIG. 2A, an angular frequency of a radio wave emitted from the transmitter is represented as $\omega_{C1}+\omega_{B1}$ and an initial phase is represented as $\theta_{1H}$. In this case, a transmission signal (a transmission wave) $tx1(t)$ emitted from the transmitter is represented by the following Equation (1):

$$tx1(t)=\cos\{(\omega_{C1}+\omega_{B1})t+\theta_{1H}\} \quad (1)$$

The transmission signal reaches a target object (a wall W) apart from the transmitter by a distance R with a delay time $\tau_1$ and is reflected and received by the receiver. Since the speed of the radio wave is equal to the speed of light $c(=3\times10^8$ m/s, $\tau_1=(R/c)$ (seconds). The signal received by the receiver delays by $2\tau_1$ with respect to the emitted signal. Therefore, a received signal (a received wave) $rx1(t)$ of the receiver is represented by the following Equations (2) and (3):

$$rx1(t)=\cos\{(\omega_{C1}+\omega_{B1})t+\theta_{1H}-\theta_{2\times H\tau1}\} \quad (2)$$

$$\theta_{2\times H\tau1}=(\omega_{C1}+\omega_{B1})2\tau_1 \quad (3)$$

That is, the transmission signal is received by the receiver with a phase shift of a multiplication result ($\theta_{2\times H\tau1}$) of the delay time and the transmission angular frequency.

Similarly, as shown in FIG. 2B, the transmission signal $tx1(t)$ and the received signal $rx1(t)$ in the case in which an angular frequency $\omega_{C1}-\omega_{B1}$ is used are represented by the following Equations (4) to (6) with an initial phase set to $\theta_{1L}$:

$$tx1(t)=\cos\{(\omega_{C1}-\omega_{B1})t+\theta_{1L}\} \quad (4)$$

$$rx1(t)=\cos\{(\omega_{C1}-\omega_{B1})t+\theta_{1L}-\theta_{2\times L\tau1}\} \quad (5)$$

$$\theta_{2\times L\tau1}=(\omega_{C1}-\omega_{B1})2\tau_1 \quad (6)$$

When a phase shift amount that occurs until the transmission signal having the angular frequency $\omega_{C1}+\omega_{B1}$ is received is represented as $\theta_{H1}(t)$ and a phase shift amount that occurs until the transmission signal having the angular frequency $\omega_{C1}-\omega_{B1}$ is received is represented as $\theta_{L1}(t)$, a difference between phase shifts of the two received waves is represented by the following Equation (7) obtained by subtracting Equation (6) from Equation (3):

$$\theta_{H1}(t)-\theta_{L1}(t)=(\theta_{2\times H\tau1}-\theta_{2\times L\tau1})=2\omega_{B1}\times2\tau_1 \quad (7)$$

where $\tau_1=R/c$. Since the differential frequency $\omega_{B1}$ is known, if the difference between the phase shift amounts of the two received waves is measured, the distance R can be calculated as follows from a measurement result:

$$R=c\times(\theta_{2\times H\tau1}-\theta_{2\times L\tau1})/(4\omega_{B1})$$

Incidentally, in the above explanation, the distance R is calculated taking into account only the phase information. Amplitude is examined below concerning a case in which a transmission wave having the angular frequency $\omega_{C1}+\omega_{B1}$ is used. The transmission wave indicated by Equation (1) described above delays by a delay amount $\tau_1=R/c$ at a point in time when the transmission wave reaches a target object away from the transmitter by the distance R. Amplitude is attenuated by attenuation L1 corresponding to the distance R. The transmission wave changes to a wave $rx2(t)$ represented by the following Equation (8):

$$rx2(t)=L_1\cos\{(\omega_{C1}+\omega_{B1})t+\theta_{1H}-(\omega_{C1}+\omega_{B1})\tau_1\} \quad (8)$$

Further, the transmission wave is attenuated by attenuation $L_{RFL}$ when the transmission wave is reflected from the target object. A reflected wave $tx2(t)$ in the target object is represented by the following Equation (9):

$$tx2(t)=L_{RFL}L_1\cos\{(\omega_{C1}+\omega_{B1})t+\theta_{1H}-(\omega_{C1}+\omega_{B1})\tau_1\} \quad (9)$$

The received signal $rx1(t)$ received by the receiver is delayed by a delay amount $\tau_1=R/c(s)$ from the target object. Amplitude is attenuated by attenuation L1 corresponding to the distance R. Therefore, the received signal is represented by the following Equation (10):

$$rx1(t)=L_1\times L_{RFL}\times L_1\cos\{(\omega_{C1}+\omega_{B1})t+\theta_{1H}-2(\omega_{C1}+\omega_{B1})\tau_1\} \quad (10)$$

In this way, the transmission signal from the transmitter is attenuated by $L_1\times L_{RFL}\times L_1$ until the transmission signal reaches the receiver. Signal amplitude that can be emitted from the transmitter in distance measurement needs to conform to the Radio Law according to an applied frequency. For example, a specific frequency in a 920 MHz band involves limitation to suppress transmission signal power to 1 mW or less. From the viewpoint of a signal-to-noise ratio of the received signal, it is necessary to suppress attenuation between transmission and reception in order to accurately measure a distance. However, as explained above, since attenuation is relatively large in the distance measurement for measuring a distance using a reflected wave, a distance that can be accurately measured is short.

Therefore, as explained above, in the present embodiment, by transmitting and receiving signals between the two devices without using a reflected wave, attenuation is reduced by $L_{RFL}\times L_1$ to increase the distance that can be accurately measured.

However, the two devices are apart from each other by the distance R and cannot share the same reference signal. In general, it is difficult to synchronize the transmission signal with a local oscillation signal used for reception. That is, between the two devices, deviation occurs in a signal frequency and an initial phase is unknown. Problems in distance measurement performed using such an asynchronous transmission wave are explained.

(Problems in the Case of Asynchronization)

In the distance measuring system in the present embodiment, in distance measurement between two objects, two devices (a first device and a second device) that emit carrier signals (transmission signals) asynchronously from each other are disposed in the positions of the respective objects and the distance R between the two devices is calculated. In the present embodiment, carrier signals having two frequencies deviating from a center angular frequency $\omega_{C1}$ by the angular frequency $\pm\omega_{B1}$ are transmitted in the first device. Carrier signals having two frequencies deviating from the center angular frequency $\omega_{C2}$ by an angular frequency $\pm\omega_{B2}$ are transmitted in the second device.

Figure 3A:
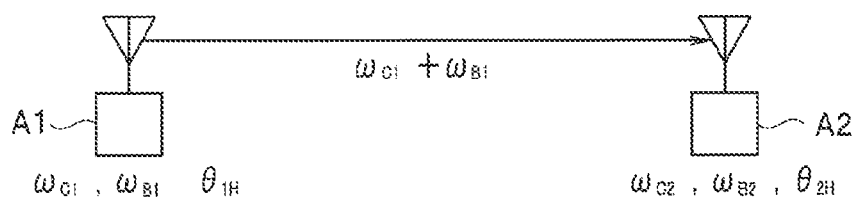
FIG. 3A is an explanatory diagram for explaining problems of the distance measurement by the phase detection scheme.
Figure 3B:
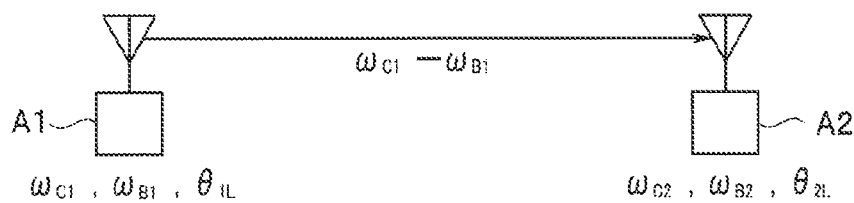
FIG. 3B is an explanatory diagram for explaining the problems of the distance measurement by the phase detection scheme.

FIGS. 3A and 3B are explanatory diagrams for explaining problems in the case in which the phase detection scheme is simply applied between two devices A1 and A2. It is assumed that a transmission signal of the device A1 is received by the device A2. A local oscillator of the device A1 generates a signal having a frequency necessary for generating, in a heterodyne scheme, two transmission waves having carrier angular frequencies $\omega_{C1}+\omega_{B1}$ and $\omega_{C1}-\omega_{B1}$. The device A1 transmits two transmission waves having the angular frequencies. A local oscillator of the device A2 generates a signal having a frequency necessary for generating, in a heterodyne scheme, two transmission waves having carrier angular frequencies $\omega_{C2}+\omega_{B2}$ and $\omega_{C2}-\omega_{B2}$. The device A2 performs reception in the heterodyne scheme using the signal generated by the local oscillator of the device A2.

The distance between the transmission device and the reception device is represented as 2R to correspond to the distance in the case in which the reflected wave is used. Initial phases of a transmission signal having the angular frequency $\omega_{C1}+\omega_{B1}$ and a transmission signal having the angular frequency $\omega_{C1}-\omega_{B1}$ transmitted from the device A1 are respectively represented as $\theta_{1H}$ and $\theta_{1L}$. Initial phases of two signals having the angular frequencies $\omega_{C2}+\omega_{B2}$ and $\omega_{C2}-\omega_{B2}$ of the device A2 are respectively represented as $\theta_{2H}$ and $\theta_{2L}$.

First, a phase is considered concerning the transmission signal having the angular frequency $\omega_{C1}+\omega_{B1}$. The transmission signal represented by Equation (1) described above is output from the device A1. The received signal rx2(t) in the device A2 is represented by the following Equation (11):

$$rx2(t)=\cos\{(\omega_{C1}+\omega_{B1})t+\theta_{1H}-\theta_{2\times H\tau 1}\} \quad (11)$$

The device A2 multiplies together two signals $\cos\{(\omega_{C2}+\omega_{B2})t+\theta_{2H}\}$ and $\sin\{(\omega_{C2}+\omega_{B2})t+\theta_{2H}\}$ and a received wave of Equation (11) to thereby separates the received wave into an in-phase component (an I signal) and a quadrature component (a Q signal). A phase of the received wave (hereinafter referred to as detected phase or simply referred to as phase) can be easily calculated from the I and Q signals. That is, a detected phase $\theta_{H1}(t)$ is represented by the following Equation (12). Note that, in the following Equation (12), since a term of harmonics near an angular frequency $\omega_{C1}+\omega_{c2}$ is removed during demodulation, the term is omitted.

$$\theta_{H1}(t)=\tan^{-1}(Q(t)/I(t))=-\{(\omega_{C1}-\omega_{C2})t+(\omega_{B1}-\omega_{B2})t+\theta_{1H}-\theta_{2\times H\tau 1}\} \quad (12)$$

Similarly, when the transmission signal having the angular frequency $\omega_{C1}-\omega_{B1}$ is transmitted from the device A1, a detected phase $\theta_{L1}(t)$ calculated from the I and Q signals obtained in the device A2 is represented by the following Equation (13). Note that, in the following Equation (13), since a term of harmonics near the angular frequency $\omega_{C1}+\omega_{C2}$ is removed during demodulation, the term is omitted.

$$\theta_{L1}(t)=\tan^{-1}(Q(t)/I(t))=-\{(\omega_{C1}-\omega_{C2})t-(\omega_{B1}-\omega_{B2})t+\theta_{1L}-\theta_{2L}\theta_{2\times L\tau 1}\} \quad (13)$$

A phase difference between these two detected phases (hereinafter referred to as detected phase difference or simply referred to as phase difference) $\theta_{H1}(t)-\theta_{L1}(t)$ is represented by the following Equation (14):

$$\theta_{H1}(t)-\theta_{L1}(t)=-2(\omega_{B1}-\omega_{B2})t+(\theta_{1H}-\theta_{1L})-(\theta_{2H}-\theta_{2L})+(\theta_{2\times H\tau 1}-\theta_{2\times L\tau 1}) \quad (14)$$

In the distance measuring device in the past that measures a distance using a reflected wave, the device A1 and the device A2 are the same device and share the local oscillator. Therefore, the following Equations (15) to (17) are satisfied:

$$\omega_{B1}=\omega_{B2} \quad (15)$$

$$\theta_{1H}=\theta_{2H} \quad (16)$$

$$\theta_{1L}=\theta_{2L} \quad (17)$$

When Equations (15) to (17) hold, Equation (14) is equal to Equation (7) described above. The distance R between the device A1 and the device A2 can be calculated according to a phase difference calculated by I and Q demodulation processing for the received signal in the device A2.

However, since the device A1 and the device A2 are provided to be separated from each other and the local oscillators operate independently from each other, Equations (15) to (17) described above are not satisfied. In this case, unknown information such as a difference between initial phases is included in Equation (14). A distance cannot be correctly calculated.

(Basic Distance Measuring Method of the Embodiment)

The signals having the two angular frequencies explained above transmitted by the first device are received in the second device and phases of the respective signals are calculated. The signals having the two angular frequencies explained above transmitted by the second device are received in the first device and phases of the respective signals are calculated. Further, phase information is transmitted from either one of the first device and the second device to the other. In the present embodiment, as explained below, basically the distance R between the first device and the second device is calculated by adding up a phase difference between the two signals calculated by the reception of the first device and a phase difference between the two signals calculated by the reception of the second device. Note that the phase information may be the I and Q signals or may be information concerning phases calculated from the I and Q signals or may be information concerning a difference between phases calculated from two signals having different frequencies.

(Configuration)

In FIG. 1, the first device 1 (hereinafter referred to as device 1 as well) and the second device 2 (hereinafter referred to as device 2 as well) are disposed to be separated from each other by the distance R. At least one of the device 1 and the device 2 is movable. The distance R changes according to the movement. A control section 11 is provided in the device 1. The control section 11 controls respective sections of the device 1. The control section 11 is configured of a processor including a CPU. The control section 11 may operate according to a computer program stored in a not-shown memory and control the respective sections.

An oscillator 13 is controlled by the control section 11 and generates oscillation signals (local signals) having two frequencies on a basis of a reference oscillator incorporated in the oscillator 13. The respective oscillation signals from the oscillator 13 are supplied to a transmitting section 14 and a receiving section 15. Angular frequencies of the oscillation signals generated by the oscillator 13 are set to angular frequencies necessary for generating three waves of $\omega_{C1}+\omega_{B1}$, $\omega_{C1}-\omega_{B1}$ and $\omega_{C1}$ as angular frequencies of transmission waves of the transmitting section 14.

The transmitting section 14 can be configured of, for example, a quadrature modulator. The transmitting section 14 is controlled by the control section 11 to be capable of outputting three transmission waves of a transmission signal having the angular frequency $\omega_{C1}+\omega_{B1}$, a transmission signal having the angular frequency $\omega_{C1}-\omega_{B1}$ and the angular frequency $\omega_{C1}$. The transmission waves from the transmitting section 14 are supplied to an antenna circuit 17.

The antenna circuit 17 includes one or more antennas and can transmit the transmission waves transmitted from the transmitting section 14. The antenna circuit 17 receives transmission waves from the device 2 explained below and supplies received signals to the receiving section 15.

The receiving section 15 can be configured of, for example, a quadrature demodulator. The receiving section 15 is controlled by the control section 11 to be capable of receiving and demodulating a transmission wave from the device 2 using, for example, signals having angular frequencies $\omega_{C1}$ and $\omega_{B1}$ from the oscillator 13 and separating and outputting an in-phase component (an I signal) and a quadrature component (a Q signal) of the received wave.

A configuration of the device 2 is the same as the configuration of the device 1. That is, a control section 21 is provided in the second device. The control section 21 controls respective sections of the device 2. The control section 21 is configured of a processor including a CPU. The control section 21 may operate according to a computer program stored in a not-shown memory and control the respective sections.

An oscillator 23 is controlled by the control section 21 to generate oscillation signals having two frequencies on a basis of a reference oscillator incorporated in the oscillator 23. The respective oscillation signals from the oscillator 23 are supplied to a transmitting section 24 and a receiving section 25. Angular frequencies of the oscillation signals generated by the oscillator 23 are set to angular frequencies necessary for generating two waves of $\omega_{C2}+\omega_{B2}$ and $\omega_{C2}-\omega_{B2}$ as angular frequencies of transmission waves of the transmitting section 24.

The transmitting section 24 can be configured of, for example, a quadrature modulator. The transmitting section 24 is controlled by the control section 21 to be capable of outputting two transmission waves of a transmission signal having an angular frequency $\omega_{C2}+\omega_{B2}$ and a transmission signal having an angular frequency $\omega_{C2}-\omega_{B2}$. The transmission waves from the transmitting section 24 are supplied to an antenna circuit 27.

The antenna circuit 27 includes one or more antennas and can transmit the transmission waves transmitted from the transmitting section 24. The antenna circuit 27 receives transmission waves from the device 1 and supplies received signals to the receiving section 25.

The receiving section 25 can be configured of, for example, a quadrature demodulator. The receiving section 25 is controlled by the control section 21 to be capable of receiving and demodulating a transmission wave from the device 1 using, for example, signals having angular frequencies $\omega_{C2}$ and $\omega_{B2}$ from the oscillator 23 and separating and outputting an in-phase component (an I signal) and a quadrature component (a Q signal) of the received wave.

Figure 4:
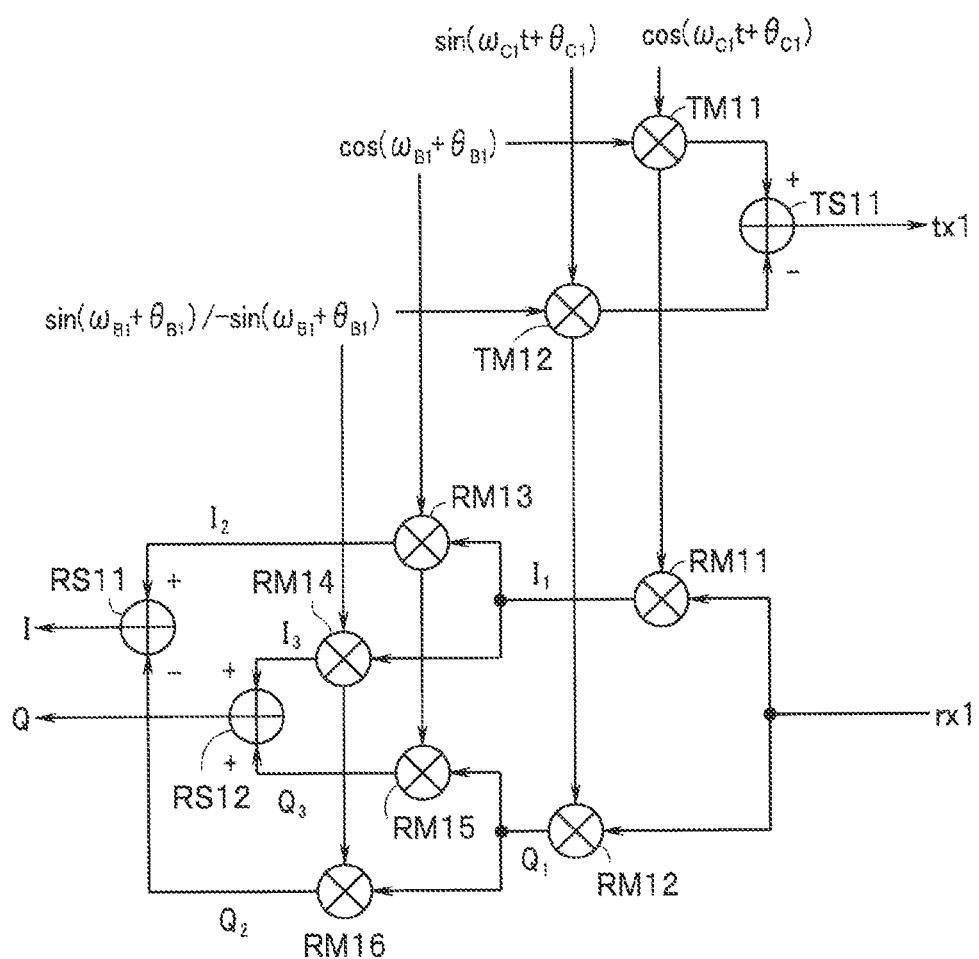
FIG. 4 is a circuit diagram showing an example of specific configurations of a transmitting section 14 and a receiving section 15 shown in FIG. 1.
Figure 5:
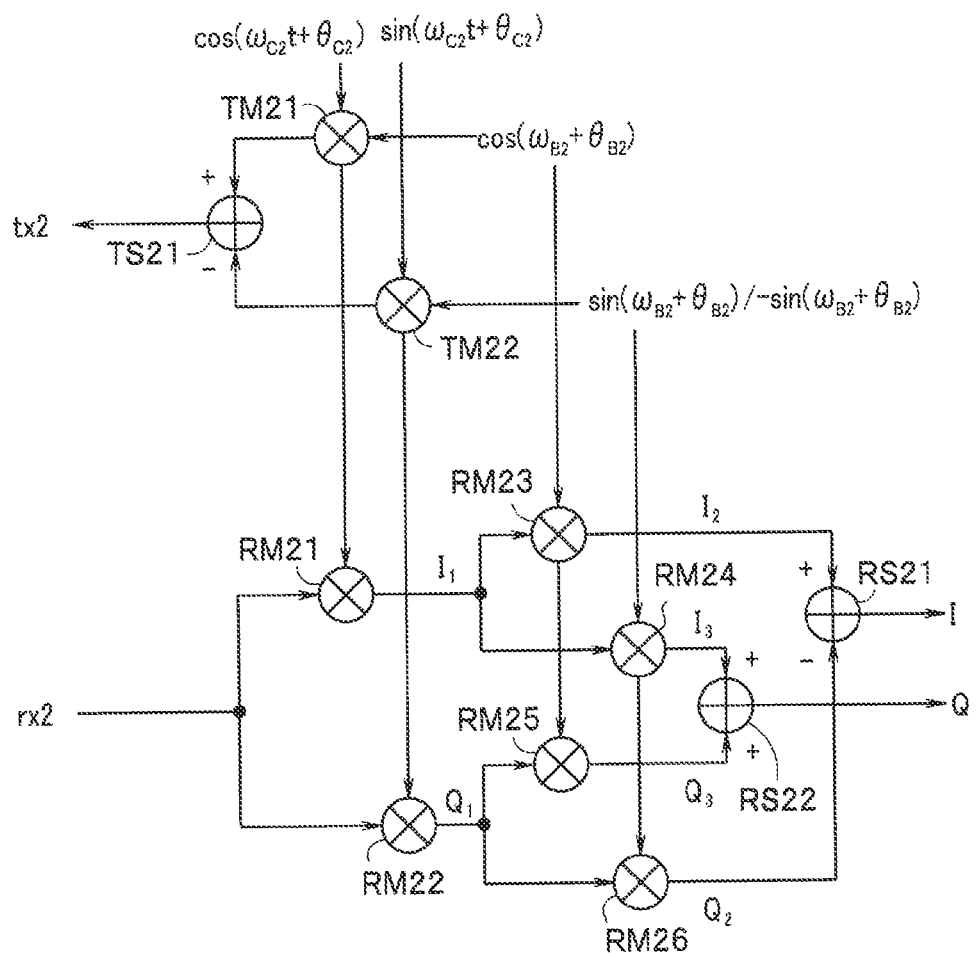
FIG. 5 is a circuit diagram showing an example of specific configuration of a transmitting section 24 and a receiving section 25 shown in FIG. 1.

FIG. 4 is a circuit diagram showing an example of specific configurations of the transmitting section 14 and the receiving section 15 shown in FIG. 1. FIG. 5 is a circuit diagram showing an example of specific configurations of the transmitting section 24 and the receiving section 25 shown in FIG. 1. FIGS. 4 and 5 show a transceiver of an image suppression scheme. However, the transceiver is not limited to the configuration.

Note that a configuration of the image suppression scheme is publicly known. As characteristics of the image suppression scheme, when a higher angular frequency band is demodulated centering on a local angular frequency for a high frequency, that is, $\omega_{C1}$ or $\omega_{C2}$, a signal in a lower angular frequency band is attenuated and, when a lower angular frequency band is demodulated, a signal in a higher angular frequency band is attenuated. This filtering effect is due to signal processing. The same applies to transmission. When the higher angular frequency band is demodulated centering on $\omega_{C1}$ or $\omega_{C2}$, $\sin(\omega_{B1}t+\theta_{B1})$ or $\sin(\omega_{B2}t+\theta_{B2})$ shown in FIGS. 4 and 5 is used. When the lower angular frequency band is demodulated, $-\sin(\omega_{B1}t+\theta_{B1})$ or $-\sin(\omega_{B2}t+\theta_{B2})$ shown in FIGS. 4 and 5 is used. The frequency band demodulated is decided by change of such polarity.

Note that, in a receiver of the image suppression scheme, a term of harmonics near the angular frequency $\omega_{C2}+\omega_{C2}$ is removed during demodulation. Therefore, in an operation explained below, this term is omitted.

The transmitting section 14 is configured of multipliers TM11 and TM12 and an adder TS11. Oscillation signals having an angular frequency $\omega_{C1}$ and having phases 90 degrees different from each other are respectively given to the multipliers TM11 and TM12 from the oscillator 13. Oscillation signals having an angular frequency $\omega_{B1}$ and having phases 90 degrees different from each other are respectively given to the multipliers TM11 and TM12 from the oscillator 13. An inverted signal of the oscillation signal having the angular frequency $\omega_{B1}$ is also given to the multiplier TM12 from the oscillator 13.

The multipliers TM11 and TM12 respectively multiply together the two inputs and give multiplication results to the adder TS11. The adder TS11 adds up outputs of the multipliers TM11 and TM12 and outputs an addition result as a transmission wave tx1.

The receiving section 15 is configured of multipliers RM11 to RM16 and adders RS11 and RS12. A transmission wave of the device 2 is input to the multipliers RM11 and RM12 via the antenna circuit 17 as a received signal rx1. Oscillation signals having the angular frequency $\omega_{C1}$ and phases 90 degrees different from each other are respectively given to the multipliers RM11 and RM12 from the oscillator 13. The multiplier RM11 multiplies together the two inputs and gives a multiplication result to the multipliers RM13 and RM14. The multiplier RM12 multiplies together the two inputs and gives a multiplication result to the multipliers RM15 and RM16.

An oscillation signal having the angular frequency (a local angular frequency for baseband processing) $\omega_{B1}$ is given to the multipliers RM13 and RM15 from the oscillator 13. The multiplier RM13 multiplies together the two inputs and gives a multiplication result to the adder RS11. The multiplier RM14 multiplies together the two inputs and gives a multiplication result to the adder RS12.

An oscillation signal having the angular frequency $\omega_{B1}$ or an inverted signal of the oscillation signal, that is, a signal orthogonal to the oscillation signal having the angular frequency $\omega_{B1}$ given to the multiplier RM13 is given to the multipliers RM14 and RM16 from the oscillator 13. The multiplier RM14 multiplies together the two inputs and gives a multiplication result to the adder RS12. The multiplier RM16 multiplies together the two inputs and gives a multiplication result to the adder RS11.

The adder RS11 adds up outputs of the multipliers RM13 and RM16 and outputs an addition result as an I signal. The adder RS12 adds up outputs of the multipliers RM14 and RM15 and outputs an addition result as a Q signal. The I and Q signals from the receiving section 15 are supplied to the control section 11.

The circuits shown in FIGS. 4 and 5 are the same circuit. That is, in FIG. 5, the configurations of the multipliers TM21, TM22, and RM21 to RM26 and the adders TS21, RS21, and RS22 are respectively the same as the configurations of the multipliers TM11, TM12, and RM11 to RM16 and the adders TS11, RS11, and RS12 shown in FIG. 4. The configurations are only different in that, since the frequency and the phase of the oscillation signal of the oscillator 23 are different from the frequency and the phase of the oscillation signal of the oscillator 13, in FIG. 5, a local angular frequency for baseband $\omega_{B2}$ is input instead of the angular frequency $\omega_{B1}$ shown in FIG. 4 and $\omega_{C2}$ is input instead of the angular frequency $\omega_{C1}$ shown in FIG. 4. The I and Q signals from the receiving section 25 are supplied to the control section 21.

In the present embodiment, the control section 11 of the device 1 controls the transmitting section 14 to transmit two transmission waves having angular frequencies $\omega_{C1}+\omega_{B1}$ and $\omega_{C1}-\omega_{B1}$ via the antenna circuit 17.

On the other hand, the control section 21 of the device 2 controls the transmitting section 24 to transmit two transmission waves having angular frequencies $\omega_{C2}+\omega_{B2}$ and $\omega_{C2}-\omega_{B2}$ via the antenna circuit 27.

The control section 11 of the device 1 controls the receiving section 15 to receive the two transmission waves from the device 2 and acquires the I and Q signals. The control section 11 calculates a difference between two phases calculated from the I and Q signals respectively obtained by two received signals.

Similarly, the control section 21 of the device 2 controls the receiving section 25 to receive the two transmission waves from the device 1 and acquires the I and Q signals. The control section 21 calculates a difference between two phases calculated from the I and Q signals respectively obtained by two received signals.

In the present embodiment, the control section 11 of the device 1 gives phase information based on the acquired I and Q signals to the transmitting section 14 and causes the transmitting section 14 to transmit the phase information. Note that, as explained above, as the phase information, for example, a predetermined initial value may be given. The phase information may be I and Q signals calculated from the two received signals, may be information concerning phases calculated from the I and Q signals, or may be information concerning a difference between the phases.

For example, the control section 11 may generate I and Q signals based on phase information of a received signal having an angular frequency $\omega_{B2}$ and supplies the I and Q signals respectively to the multipliers TM11 and TM12 to transmit the phase information.

During output of the oscillation signal having the angular frequency $\omega_{B1}$, the control section 11 may generate I and Q signals obtained by adding phase information of the received signal having the angular frequency $\omega_{B2}$ to an initial phase of the oscillation signal having angular frequency $\omega_{B1}$ and supply the I and Q signals respectively to the multipliers TM11 and TM12 to transmit the phase information.

The receiving section 25 of the device 2 receives the phase information transmitted by the transmitting section 14 via the antenna circuit 27. The receiving section 25 demodulates a received signal and obtains I and Q signals of the phase information. The I and Q signals are supplied to the control section 21. The control section 21 obtains, according to the phase information from the receiving section 25, a value including the phase difference acquired by the control section 11 of the device 1. The control section 21 functioning as a calculating section adds up the phase difference obtained by the reception result of the receiving section 25 and the phase difference based on the phase information transmitted from the device 2 to calculate the distance R between the first device 1 and the second device 2.

Note that, in FIG. 1, an example is shown in which both of the first device 1 and the second device 2 have a function of transmitting phase information and a function of giving received phase information to the control section and calculating the distance R. However, it is sufficient that one of the first device 1 and the second device 2 has the function of transmitting phase information and the other has the function of giving received phase information to the control section and calculating the distance R.

(Explanation of Distance Measurement in Which Two Waves are Used)

Figure 6:
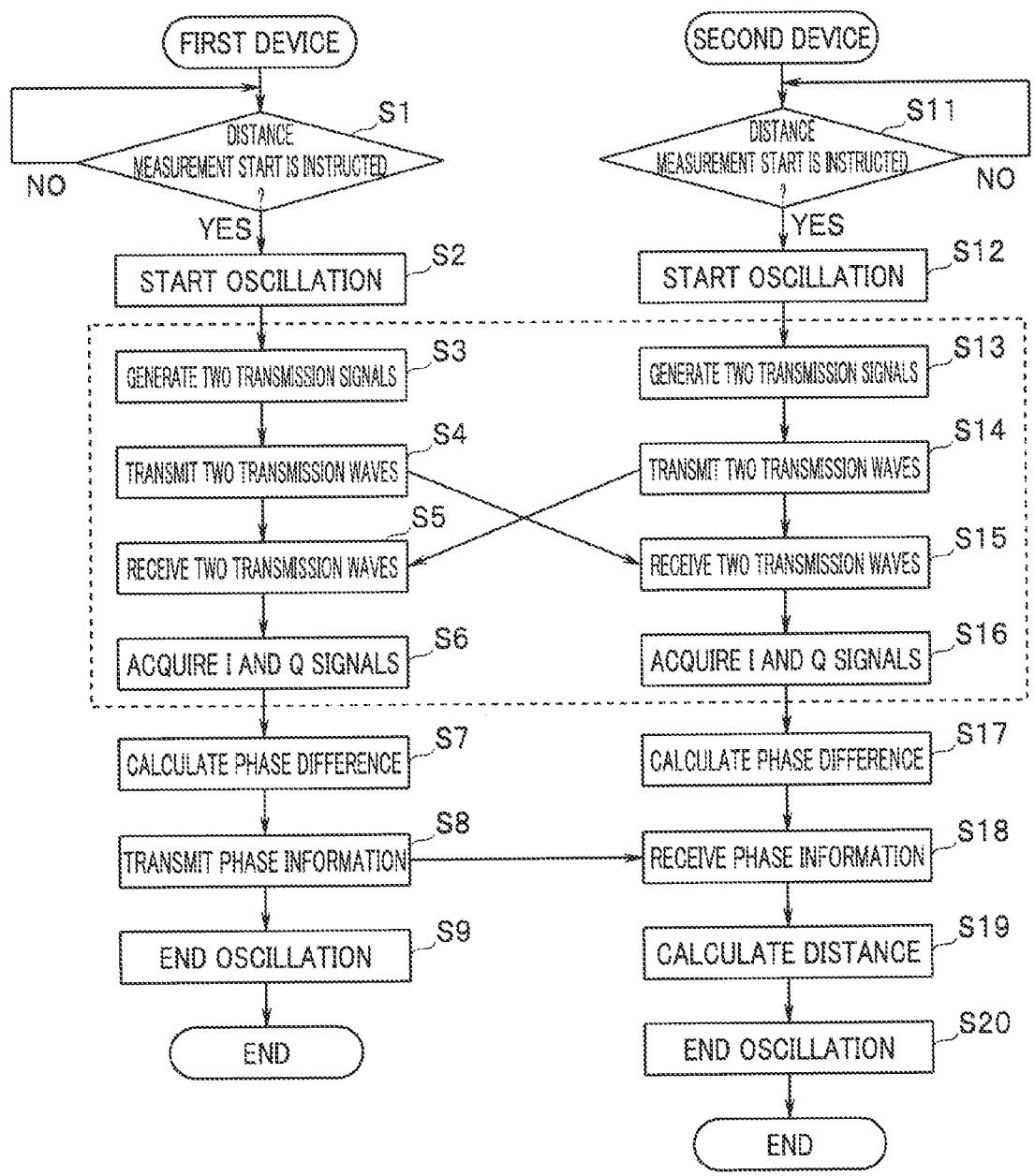
FIG. 6 is a flowchart for explaining distance measurement in which two waves are used.

An operation of the distance measuring system is explained with reference to the flowchart of FIG. 6 concerning a case in which two waves are used. In FIG. 6, an operation of the device 1 is shown on a left side and an operation of the device 2 is shown on a right side. In FIG. 6, an arrow connecting steps of the devices 1 and 2 indicates that communication is performed between the devices 1 and 2. Note that steps S4, S5, S14, and S15 are substantially simultaneously executed.

In step S1, the control section 11 of the device 1 determines whether an instruction for a distance measurement start is received. When the instruction for the distance measurement start is received, the control section 11 controls the oscillator 13 to start an output of a necessary oscillation signal. In step S11, the control section 21 of the device 2 determines whether an instruction for a distance measurement start is received. When the instruction for the distance measurement start is received, the control section 21 controls the oscillator 23 to start an output of a necessary oscillation signal.

Note that, as explained below, in step S9, the control section 11 ends oscillation. In step S20, the control section 21 ends oscillation. Control of a start and an end of oscillation in the control sections 11 and 21 indicates that oscillation of the oscillators 13 and 23 is not stopped during transmission and reception periods for distance measurement. Actual start and end timings of the oscillation are not limited to the flow shown in FIG. 6. In a period in which the oscillation of the oscillators 13 and 23 continues, initial phases of the respective oscillators 13 and 23 are not set anew.

The control section 11 of the device 1 generates two transmission signals in step S3 and causes the antenna circuit 17 to transmit the transmission signals as transmission waves (step S4). The control section 21 of the device 2 generates two transmission signals in step S13 and causes the antenna circuit 27 to transmit the transmission signals as transmission waves (step S14).

It is assumed that an initial phase of an oscillation signal having the frequency $\omega_{C1}$ output from the oscillator 13 of the device 1 is $\theta_{c1}$ and an initial phase of an oscillation signal having the frequency $\omega_{B1}$ is $\theta_{B1}$. Note that, as explained above, the initial phases $\theta_{c1}$ and $\theta_{B1}$ are not set anew as long as the oscillation of the oscillator 13 continues.

Note that it is assumed that an initial phase of an oscillation signal having the frequency $\omega_{C2}$ output from the oscillator 23 of the device 2 is $\theta_{c2}$ and an initial phase of an oscillation signal having the frequency $\omega_{B2}$ is $\theta_{B2}$. The initial phases $\theta_{c2}$ and $\theta_{B2}$ are not set anew as long as the oscillation of the oscillator 23 continues.

Note that, when simultaneous transmission and simultaneous reception of two frequencies are assumed, two wireless sections shown in FIG. 4 are necessary in the device 1 and two wireless sections shown in FIG. 5 are necessary in the device 2. Alternatively, a radio of a superheterodyne scheme or the like is used. However, the respective oscillators use the same radio section.

(Transmission and Reception of a Transmission Wave Having the Angular Frequency $\omega_{C1}+\omega_{B1}$ from the Device 1)

Two transmission waves having the angular frequencies $\omega_{C1}+\omega_{B1}$ and $\omega_{C1}-\omega_{B1}$ are output from the transmitting section 14 of the device 1, and the transmitting section 14 is composed of the multipliers TM11 and TM12 and the adder TS11. The transmission signal $tx1(t)$ having the angular frequency $\omega_{C1}+\omega_{B1}$ is represented by the following Equation (18):

$$tx1(t)=\cos(\omega_{C1}t+\theta_{C1})\cos(\omega_{B1}t+\theta_{B1})-\sin(\omega_{C1}t+\theta_{c1})\sin(\omega_{B1}t+\theta_{B1})=\cos\{(\omega_{C1}+\omega_{B1})t+\theta_{C1}+\theta_{B1}\} \quad (18)$$

When the distance between the devices 1 and 2 is represented as R and a delay until a transmission wave from the device 1 is received by the device 2 is represented as $\tau_1$, the received signal $rx2(t)$ of the device 2 can be represented by the following Equations (19) and (20):

$$rx2(t)=\cos\{(\omega_{C1}+\omega_{B1})(t-\tau_1)+\theta_{C1}+\theta_{B1}\}=\cos\{(\omega_{C1}+\omega_{B1})t+\theta_{C1}+\theta_{B1}-\theta_{\tau H1}\} \quad (19)$$

$$\theta_{\tau H1}=(\omega_{C1}+\omega_{B1})\tau_1 \quad (20)$$

The received signal $rx2(t)$ is received by the antenna circuit 27 and supplied to the receiving section 25. In the receiver shown in FIG. 5, the received signal $rx2(t)$ is input to the multipliers RM21 and RM22. Subsequently, signals in respective nodes of the receiver shown in FIG. 5 are sequentially calculated. Outputs of the multipliers RM21, RM23, and RM24 are respectively represented as $I_1(t)$, $I_2(t)$, and $I_3(t)$, outputs of the multipliers RM22, RM26, and RM25 are respectively represented as $Q_1(t)$, $Q_2(t)$, and $Q_3(t)$, and outputs of the adders RS21 and RS22 are respectively represented as I(t) and Q(t). The outputs are represented by the following Equations (21) to (26):

$$I_1(t)=\cos(\omega_{C2}t+\theta_{C2})\times\cos\{(\omega_{C1}+\omega_{B1})t+\theta_{c1}+\theta_{B1}-\theta_{\tau H1}\} \quad (21)$$

$$Q_1(t)=\sin(\omega_{C2}t+\theta_{C2})\times\cos\{(\omega_{C1}+\omega_{B1})t+\theta_{c1}+\theta_{B1}-\theta_{\tau H1}\} \quad (22)$$

$$I_2(t)=I_1(t)\times\cos(\omega_{B2}t+\theta_{B2}) \quad (23)$$

$$Q_2(t)=Q_1(t)\times\sin(\omega_{B2}t+\theta_{B2}) \quad (24)$$

$$I_3(t)=I_1(t)\times\sin(\omega_{B2}t+\theta_{B2}) \quad (25)$$

$$Q_3(t)=Q_1(t)\times\cos(\omega_{B2}t+\theta_{B2}) \quad (26)$$

An output I(t) of the adder RS21 is $I(t)=I_2(t)+Q_2(t)$. An output Q(t) of the adder RS22 is $Q(t)=I_3(t)-Q_3(t)$. A phase $\theta_{H1}(t)$ obtained from I(t) and Q(t) is represented by the following Equation (27):

$$\theta_{H1}(t)=\tan^{-1}(Q(t)/I(t))=-\{(\omega_{C1}-\omega_{C2})t+(\omega_{B1}-\omega_{B2})t+\theta_{C1}-\theta_{C2}+\theta_{B1}-\theta_{B2}-\theta_{\tau H1}\} \quad (27)$$

(Transmission and Reception of a Transmission Wave Having the Angular Frequency $\omega_{C2}+\omega_{B2}$ from the Device 2)

Similarly, when the signal $tx2(t)$ having the angular frequency $\omega_{C2}+\omega_{B2}$ transmitted from the device 2 is received by the device 1 after a delay $\tau_2$, a phase $\theta_{H2}(t)$ obtained from the signals I(t) and Q(t) detected by the device 1 is calculated.

$$tx2(t)=\cos(\omega_{C2}t+\theta_{C2})\cos(\omega_{B2}t+\theta_{B2})-\sin(\omega_{C2}t+\theta_{c2})\sin(\omega_{B2}t+\theta_{B2})=\cos\{(\omega_{C2}+\omega_{B2})t+\theta_{C2}+\theta_{B2}\} \quad (28)$$

$$rx1(t)=\cos\{(\omega_{C2}+\omega_{B2})(t-\tau_2)+\theta_{C2}+\theta_{B2}\}=\cos\{(\omega_{C2}+\omega_{B2})t+\theta_{C2}+\theta_{B2}+\theta_{\tau H2}\} \quad (29)$$

$$\theta_{\tau H2}=(\omega_{C2}+\omega_{B2})\tau_2 \quad (30)$$

The received signal $rx1(t)$ is received by the antenna circuit 17 and supplied to the receiving section 15. In the receiver shown in FIG. 4, the received signal $rx1(t)$ is input to the multipliers RM11 and RM12. Subsequently, signals in respective nodes of the receiver shown in FIG. 4 are sequentially calculated. Outputs of the multipliers RM11, RM13, and RM14 are respectively represented as $I_1(t)$, $I_2(t)$, and $I_3(t)$, outputs of the multipliers RM12, RM16, and RM15 are respectively represented as $Q_1(t)$, $Q_2(t)$, and $Q_3(t)$, and outputs of the adders RS11 and RS12 are respectively represented as I(t) and Q(t). The outputs are represented by the following Equations (31) to (36):

$$I_1(t)=\cos(\omega_{C1}t+\theta_{C1})\times\cos\{(\omega_{C2}+\omega_{B2})t+\theta_{c2}+\theta_{B2}-\theta_{\tau H2}\} \quad (31)$$

$$Q_1(t)=\sin(\omega_{C1}t+\theta_{C1})\times\cos\{(\omega_{C2}+\omega_{B2})t+\theta_{c2}+\theta_{B2}-\theta_{\tau H2}\} \quad (32)$$

$$I_2(t)=I_1(t)\times\cos(\omega_{B1}t+\theta_{B1}) \quad (33)$$

$$Q_2(t)=Q_1(t)\times\sin(\omega_{B1}t+\theta_{B1}) \quad (34)$$

$$I_3(t)=I_1(t)\times\sin(\omega_{B1}t+\theta_{B1}) \quad (35)$$

$$Q_3(t)=Q_1(t)\times\cos(\omega_{B1}t+\theta_{B1}) \quad (36)$$

An output I(t) of the adder RS11 is $I(t)=I_2(t)+Q_2(t)$. An output Q(t) of the adder RS12 is $Q(t)=I_3(t)-Q_3(t)$. A phase $\theta_{H2}(t)=\tan^{-1}(Q(t)/I(t))$ obtained from I(t) and Q(t) is represented by the following Equation (37):

$$\theta_{H2}(t)=(\omega_{C1}-\omega_{C2})t+(\omega_{B1}-\omega_{B2})t+\theta_{C1}-\theta_{C2}+\theta_{B1}-\theta_{B2}+\theta_{\tau H2} \quad (37)$$

(Transmission and Reception of a Transmission Wave Having the Angular Frequency $\omega_{C1}-\omega_{B1}$ from the Device 1)

The signal $tx1(t)$ having the angular frequency $\omega_{C1}-\omega_{B1}$ transmitted from the device 1 is calculated in the same manner.

$$tx1(t)=\cos(\omega_{C1}t+\theta_{C1})\cos(\omega_{B1}t+\theta_{B1})-\sin(\omega_{C1}t+\theta_{c1})\sin(\omega_{B1}t+\theta_{B1})=\cos\{(\omega_{C1}-\omega_{B1})t+\theta_{C1}-\theta_{B1}\} \quad (38)$$

Since the distance between the devices 1 and 2 is R and the delay time is $\tau_1$, the received signal $rx2(t)$ in the device 2 is represented by the following Equations (39) and (40):

$$rx2(t)=\cos\{(\omega_{C1}-\omega_{B1})(t-\tau_1)+\theta_{C1}-\theta_{B1}\}=\cos\{(\omega_{C1}-\omega_{B1})t+\theta_{C1}-\theta_{B1}-\theta_{\tau L1}\} \quad (39)$$

$$\theta_{\tau L1}=(\omega_{C1}-\omega_{B1})\tau_1 \quad (40)$$

Signals of the respective nodes of the device 2 can be represented by the following Equations (41) to (47):

$$I_1(t)=\cos(\omega_{C2}t+\theta_{C2})\times\cos\{(\omega_{C1}-\omega_{B1})t+\theta_{c1}-\theta_{B1}-\theta_{\tau L1}\} \quad (41)$$

$$Q_1(t)=\sin(\omega_{C2}t+\theta_{C2})\times\cos\{(\omega_{C1}-\omega_{B1})t+\theta_{c1}-\theta_{B1}-\theta_{\tau L1}\} \quad (42)$$

$$I_2(t)=I_1(t)\times\cos(\omega_{B2}t+\theta_{B2}) \quad (43)$$

$$Q_2(t)=Q_1(t)\times-\sin(\omega_{B2}t+\theta_{B2}) \quad (44)$$

$$I_3(t)=I_1(t)\times-\sin(\omega_{B2}t+\theta_{B2}) \quad (45)$$

$$Q_3(t)=Q_1(t)\times\cos(\omega_{B2}t+\theta_{B2}) \quad (46)$$

A phase $\theta_{H1}(t)=\tan^{-1}(Q(t)/I(t))$ detected by the device 2 from $I(t)=I_2(t)-Q_2(t)$ obtained from the adder RS21 and $Q(t)=I_3(t)+Q_3(t)$ obtained from the adder RS22 is represented by the following Equation (47):

$$\theta_{L1}(t)=\tan^{-1}(Q(t)/I(t))=-\{(\omega_{C1}-\omega_{C2})t-(\omega_{B1}-\omega_{B2})t+\theta_{C1}-\theta_{C2}-(\theta_{B1}-\theta_{B2})-\theta_{\tau L1}\} \quad (47)$$

(Transmission and Reception of a Transmission Wave Having the Angular Frequency $\omega_{C2}-\omega_{B2}$ from the device 2)

Similarly, when the signal $tx2(t)$ having the angular frequency $\omega_{C2}-\omega_{B2}$ transmitted from the device 2 is received by the device 1 after a delay $\tau_2$, a phase $\theta_{L2}(t)$ obtained from I(t) and Q(t) detected by the device 1 is calculated.

$$tx2(t)=\cos(\omega_{C2}+\theta_{C2})\cos(\omega_{B2}t+\theta_{B2})+\sin(\omega_{C2}t+\theta_{C2})\sin(\omega_{B2}t+\theta_{B2})=\cos\{(\omega_{C2}+\omega_{B2})t+\theta_{C2}-\theta_{B2}\} \quad (48)$$

$$rx1(t)=\cos\{(\omega_{C2}-\omega_{B2})(t-\tau_2)+\theta_{C2}-\theta_{B2}\}=\cos\{(\omega_{C2}-\omega_{B2})t+\theta_{C2}-\theta_{B2}-\theta_{\tau L2}\} \quad (49)$$

$$\theta_{\tau L2}=(\omega_{C2}-\omega_{B2})\tau_2 \quad (50)$$

Signals of the respective nodes of the device 1 can be represented by the following Equations (53) to (57):

$$I_1(t)=\cos(\omega_{C1}t+\theta_{C1})\times\cos\{(\omega_{C2}-\omega_{B2})t+\theta_{c2}-\theta_{B2}-\theta_{\tau L2}\} \quad (51)$$

$$Q_1(t)=\sin(\omega_{C1}t+\theta_{C1})\times\cos\{(\omega_{C2}-\omega_{B2})t+\theta_{c2}-\theta_{B2}-\theta_{\tau L2}\} \quad (52)$$

$$I_2(t)=I_1(t)\times\cos(\omega_{B1}t+\theta_{B1}) \quad (53)$$

$$Q_2(t)=Q_1(t)\times-\sin(\omega_{B1}t+\theta_{B1}) \quad (54)$$

$$I_3(t)=I_1(t)\times-\sin(\omega_{B1}t+\theta_{B1}) \quad (55)$$

$$Q_3(t)=Q_1(t)\times\cos(\omega_{B1}t+\theta_{B1}) \quad (56)$$

A phase $\theta_{H1}(t)=\tan^{-1}(Q(t)/I(t))$ detected by the device 1 from $I(t)=I_2(t)-Q_2(t)$ obtained from the adder RS11 and $Q(t)=I_3(t)+Q_3(t)$ obtained from the adder RS12 is represented by the following Equation (57):

$$\theta_{L2}(t)=(\omega_{C1}-\omega_{C2})t-(\omega_{B1}-\omega_{B2})t+\theta_{C1}-\theta_{C2}-(\theta_{B1}-\theta_{B2})+\theta_{\tau L2} \quad (57)$$

In step S6 in FIG. 6, the control section 11 of the device 1 acquires the I and Q signals received by the receiving section 15. In step S7, the control section 11 calculates the phases $\theta_{\tau H1}(t)$ and $\theta_{\tau L1}(t)$ represented by Equations (27) and (47) described above. In step S16 in FIG. 6, the control section 21 of the device 2 acquires the I and Q signals received by the receiving section 25. In step S17, the control section 21 calculates the phases $\theta_{\tau H2}(t)$ and $\theta_{\tau L2}(t)$ represented by Equations (37) and (57) described above.

The control section 11 gives acquired phase information to the transmitting section 14 and causes the transmitting section 14 to transmit the phase information (step S8). For example, the control section 11 supplies the I and Q signals based on the phase information instead of the oscillation signals supplied to the multipliers TM11 and TM12 shown in FIG. 4. Note that another transmitter for transmitting the phase information may be used.

In step S18, the control section 21 of the device 2 receives the phase information from the device 1. As explained above, the phase information may be the I and Q signals from the receiving section 15 of the device 1, may be information concerning phases obtained from the I and Q signals, or may be information concerning a difference between the phases.

In step S19, the control section 21 performs an operation of the following Equation (58) to calculate a distance. The following Equation (58) is an equation for adding up a difference between Equation (27) and Equation (47) and a difference between Equation (37) and Equation (57).

$$\{\theta_{H1}(t)-\theta_{L1}(t)\}+\{\theta_{H2}(t)-\theta_{L2}(t)\}=(\theta_{\tau H1}-\theta_{\tau L1})+(\theta_{\tau H2}-\theta_{\tau L2}) \quad (58)$$

The following Equations (59) and (60) hold:

$$\theta_{\tau H1}-\theta_{\tau L1}=(\omega_{C1}+\omega_{B1})\tau_1-(\omega_{C1}-\omega_{B1})\tau_1=2\omega_{B1}\tau_1 \quad (59)$$

$$\theta_{\tau H2}-\theta_{\tau L2}=(\omega_{C2}+\omega_{B2})\tau_2-(\omega_{C2}-\omega_{B2})\tau_2=2\omega_{B2}\tau_2 \quad (60)$$

The delays $\tau_1$ and $\tau_2$ of radio waves between the devices 1 and 2 are the same irrespective of a traveling direction. Therefore, the following Equation (61) is obtained from Equation (58):

$$\{\theta_{H1}(t)-\theta_{L1}(t)\}+\{\theta_{H2}(t)-\theta_{L2}(t)\}=(\theta_{\tau H1}-\theta_{\tau L1})+(\theta_{\tau H2}-\theta_{\tau L2})=2\times(\omega_{B1}+\omega_{B2})\tau_1 \quad (61)$$

Equation (61) described above indicates that a value proportional to a double of the distance R is calculated by addition of a phase difference between two frequencies by the I and Q signals detected by the device 2 and a phase difference between two frequencies by the I and Q signals detected by the device 1. In general, the angular frequency $\omega_{B1}$ by the oscillator 13 of the device 1 and the angular frequency $\omega_{B2}$ by the oscillator 13 of the device 2 can be matched with an error in the order of several ten ppm. Therefore, the distance R by Equation (61) described above can be calculated at resolution of equal to or higher than at least approximately 1 m.

In step S9, the control section 11 stops the oscillator 13. In step S20, the control section 21 stops the oscillator 23. Note that, as explained above, the control sections 11 and 21 only have to continue the oscillation in a period of transmission and reception in steps S4, S5, S14, and S15. Start and end timings of the oscillation of the oscillators 13 and 23 are not limited to the example shown in FIG. 6.

(Calculation of a Distance by a Residue of $2\pi$)

Incidentally, when the addition of the phase differences detected by the device 1 and the device 2 is performed, a result of the addition is sometimes equal to or smaller than $-\pi(\text{rad})$ or larger than $\pi(\text{rad})$. In this case, it is possible to calculate a correct distance R with respect to a detected phase by calculating a residue of $2\pi$.

Figure 7:
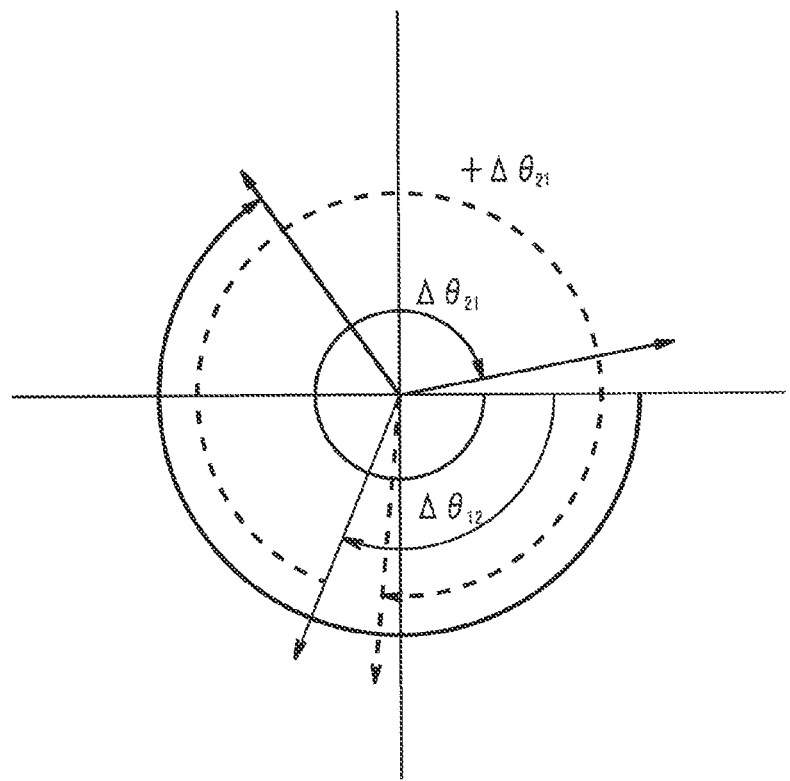
FIG. 7 is an explanatory diagram for explaining a method of calculating a distance using a system of residue.
Figure 8:
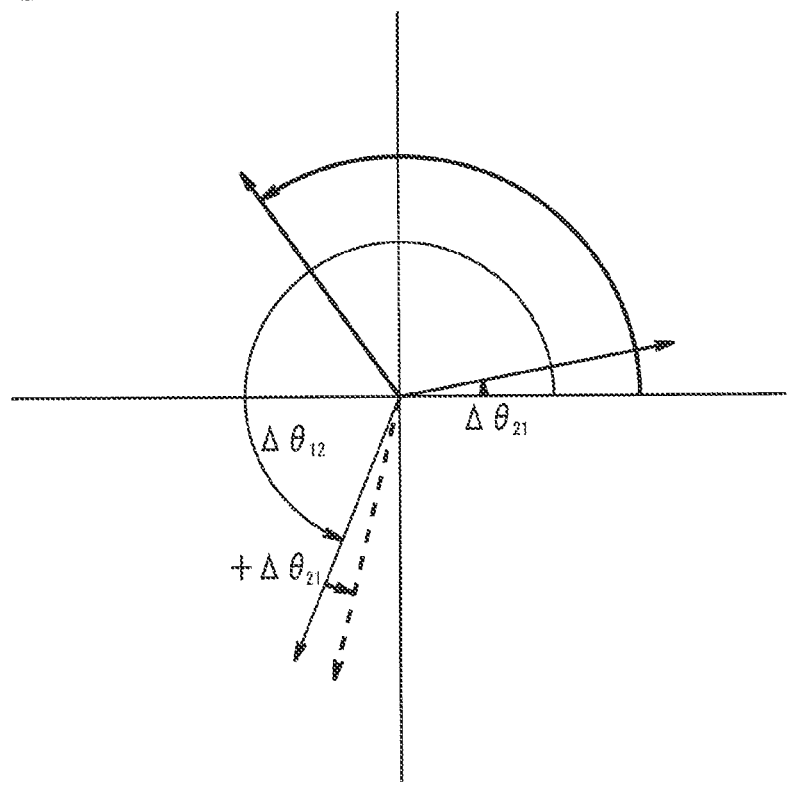
FIG. 8 is an explanatory diagram for explaining the method of calculating a distance using the system of residue.

FIGS. 7 and 8 are explanatory diagrams for explaining a method of calculating a distance using a system of residue.

For example, when R=11 m and $\omega_{B1}=\omega_{B2}=2\pi\times5$ M, a detected phase difference $\Delta\theta_{12}$ obtained by the device 1 and a detected phase difference $\Delta\theta_{21}$ obtained by the device 2 are respectively as represented by the following Equations (62) and (63):

$$\Delta\theta_{12}=\theta_{\tau H1}-\theta_{\tau L1}=-1.8849 \quad (62)$$

$$\Delta\theta_{21}=\theta_{\tau H2}-\theta_{\tau L2}=-6.0737 \quad (63)$$

The following Equation (61a) is obtained from Equation (61) described above:

$$(\tfrac{1}{2})[\{\Delta\theta_{12}\}+\{\Delta\theta_{21}\}]=(\omega_{B1}+\omega_{B2})(R/c) \quad (61a)$$

FIG. 7 shows a phase relation between Equations (62) and (63) described above. A phase of a sum of $\Delta\theta_{21}$ indicated by an arrow on inner most side and $\Delta\theta_{12}$ indicated by a second arrow from the inner side rotating in a clockwise direction on a basis of a phase 0 degree is a phase indicated by a third arrow from the inner side. A half angle of this phase is a phase of a thick line indicated by an arrow on the outermost side.

From Equation (61a), $-0.3993=(\omega_{B1}+\omega_{B2})(R/c)$ is obtained. When this equation is solved, R=-19 m. It is shown that a distance cannot be correctly calculated because a detected phase difference is larger than $-\pi(\text{rad})$.

Therefore, in the present embodiment, in such a case, as shown in FIG. 8, $27\pi$ is added to both of $\Delta\theta_{12}$ and $\Delta\theta_{21}$. That is, a phase of a sum of $2\pi+\Delta\theta_{21}$ indicated by an arrow on inner most side and $2\pi+\Delta\theta_{12}$ indicated by a second arrow from the inner side rotating in a counterclockwise direction on a basis of the phase 0 degree is a phase indicated by a third arrow from the inner side. A half angle of this phase is a phase of a thick line indicated by an arrow on the outermost side.

$$2\pi+(\Delta\theta_{12}+\Delta\theta_{21})/2=2.3008$$

From Equation (61a), R is calculated as R=11 m.

Consequently, in the present embodiment, when the detected phase differences are added up, a residue of $2\pi$ only has to be calculated to calculate the distance R. Note that the method of using the residue of $2\pi$ in the phase addition is applicable in other examples explained below.

(Selection From a Plurality of Distance Candidates)

Incidentally, a detected phase difference exceeding $2\pi$ cannot be detected. Therefore, a plurality of distance candidates are present with respect to a calculated detected phase difference. As a method of selecting a correct distance from the plurality of distance candidates, a method of transmitting three transmission waves having different angular frequencies and a method of determining a distance according to received power exist.

Figure 9:
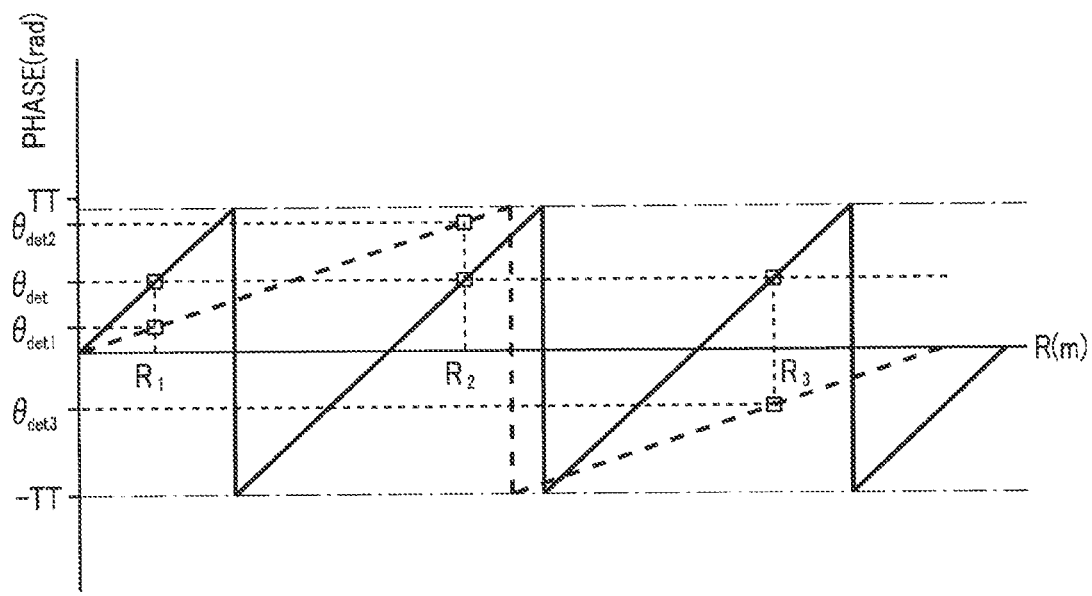
FIG. 9 is an explanatory diagram showing an example in which a distance is plotted on the horizontal axis and a phase is plotted on the vertical axis and the third transmission wave having a different angular frequency are transmitted.

FIG. 9 is an explanatory diagram showing an example in which a distance is plotted on the horizontal axis and a phase is plotted on the vertical axis and the third transmission wave having a different angular frequency are transmitted.

The following Equation (64) is obtained from Equation (61) described above:

$$(\tfrac{1}{2})\times\{(\theta_{cH1}-\theta_{cL1})+(\theta_{cH2}-\theta_{cL2})\}=(\omega_{B1}+\omega_{B2})\times(R/c) \quad (64)$$

When a left side is described as $\theta_{det}$, a relation between the distance R and $\theta_{det}$ is as indicated by a solid line in FIG. 9. However, although a sum $\theta_{det}$ of detected phase differences calculated by Equation (64) described above can take a value other than a value between $-\pi(\text{rad})$ and $\pi(\text{rad})$, the sum $\theta_{det}$ of the phase differences is a value converted into a value between $-\pi(\text{rad})$ and $\pi(\text{rad})$. In general, this is because a phase angle is displayed within a range $[-\pi(\text{rad}), \pi(\text{rad})]$.

Referring to FIG. 9, candidates of a distance by the sum $\theta_{det}$ of the detected phase differences include $R_1$, $R_2$, and $R_3$. The sum $\theta_{det}$ of the detected phase differences is an addition and subtraction result of phases obtained by transmission and reception of respective transmission waves having angular frequencies $\omega_{C1}+\omega_{B1}$, $\omega_{C1}-\omega_{B1}$, $\omega_{C2}+\omega_{B2}$ and $\omega_{C2}-\omega_{B2}$. However, an addition and subtraction result of phases obtained by transmission and reception of transmission waves having angular frequencies $\omega_{C1}+\omega_{B1}/Q$ and $\omega_{C2}+\omega_{B2}/Q$ is considered anew. Q is a rational number satisfying the following Inequality (65):

$$Q>1 \quad (65)$$

A relation between detected phases at the new angular frequencies and the distance R can be indicated by a broken line shown in FIG. 9. To select a correct distance from the candidates $R_1$, $R_2$, and $R_3$ of the distance, a result of the detected phases obtained at the new angular frequencies is referred to. That is, if $\theta_{det}1$ is detected, the correct distance is determined as the distance $R_1$. If $\theta_{det}2$ is detected, the correct distance is determined as the distance $R_2$. Note that, if a coverage of a radio wave is kept small, the inspection by the phase aliasing is unnecessary. Note that the transmission at the different three frequencies is explained above. However, the same can be realized by transmitting different three or more frequencies.

Figure 10:
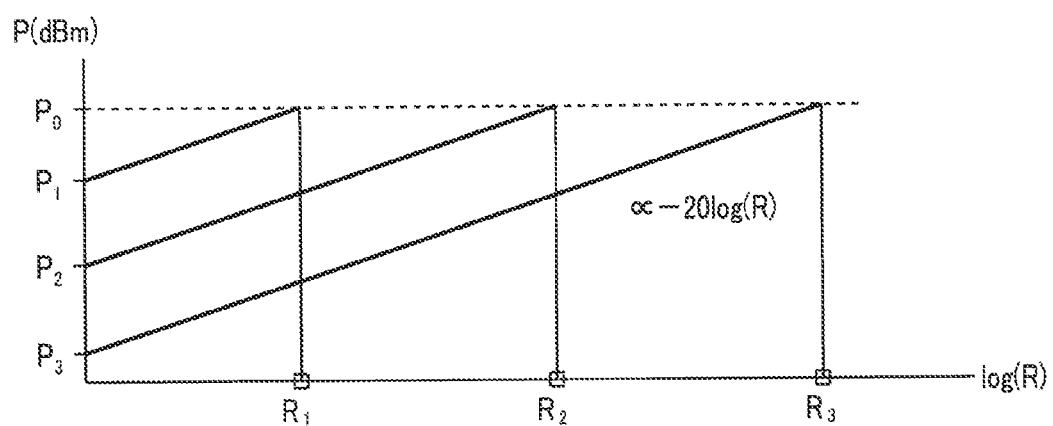
FIG. 10 is an explanatory diagram for explaining a method of selecting a correct distance through amplitude observation of a detected signal.

A method of selecting a correct distance according to amplitude observation of a detected signal is explained with reference to the explanatory diagram of FIG. 10.

In Equation (8) described above, the amplitude is attenuated at the attenuation $L_1$ according to the distance R. However, propagation attenuation in a free space is represented by the following Equation (66):

$$L_1=(\lambda/4\pi R)^2 \quad (66)$$

where $\lambda$ is a wavelength. According to Equation (66), if the distance R is large, the attenuation $L_1$ is also large and, if the distance R is small, the attenuation L1 is also small. FIG. 10 shows this relation. When it is assumed that an antenna gain of transmission and reception is 1 and transmission power is $P_0$, received power $P_1$ at the distance $R_1$ and received power $P_2$ at the distance $R_2$ are respectively represented by the following Equations (67) and (68):

$$P_1=(\lambda/4\pi R_1)^2\times P_0 \quad (67)$$

$$P_2=(\lambda/4\pi R_2)^2\times P_0 \quad (68)$$

It is possible to distinguish the distances $R_1$ and $R_2$ from the sum $\theta_{det}$ of the detected phase differences and the received power.

Note that, in this case, it is possible to perform sure distance measurement by using the residue of $2\pi$ in the phase addition as well.

In this way, in the present embodiment, basically, two transmission waves are adopted in each of the first device and the second device. Each of the first device and the second device transmits signals having two angular frequencies to each of the second device and the first device. Each of the first and second devices calculates two phases of two received signals having different angular frequencies. Any one of the first device and the second device transmits calculated phase information to the other. The device that receives the phase information accurately calculates the distance between the first device and the second device irrespective of initial phases of the oscillators of the first device and the second device according to an addition result a phase difference between the two received signals received by the first device and a phase difference between the two received signals received by the second device. In the distance measuring system, a reflected wave is not used. The accurate distance measurement is performed by only one direction from the first device and the second device. It is possible to increase a measurable distance.

(Problems in the Time-Series Transmission and Reception)

In the explanation described above, Equation (61) described above for calculating a distance from addition of detected phase differences is calculated assuming that the delays $\tau_1$ and $\tau_2$ of the radio wave are the same in Equation (58) described above. However, Equation (58) is an example in the case in which transmission and reception processing is simultaneously performed in the devices 1 and 2.

However, because of the provision of the Radio Law in the country, a frequency band in which simultaneous transmission and reception cannot be performed is present. For example, a 920 MHz band is an example of the frequency band. When distance measurement is performed in such a frequency band, transmission and reception has to be performed in time series.

Figure 11A:
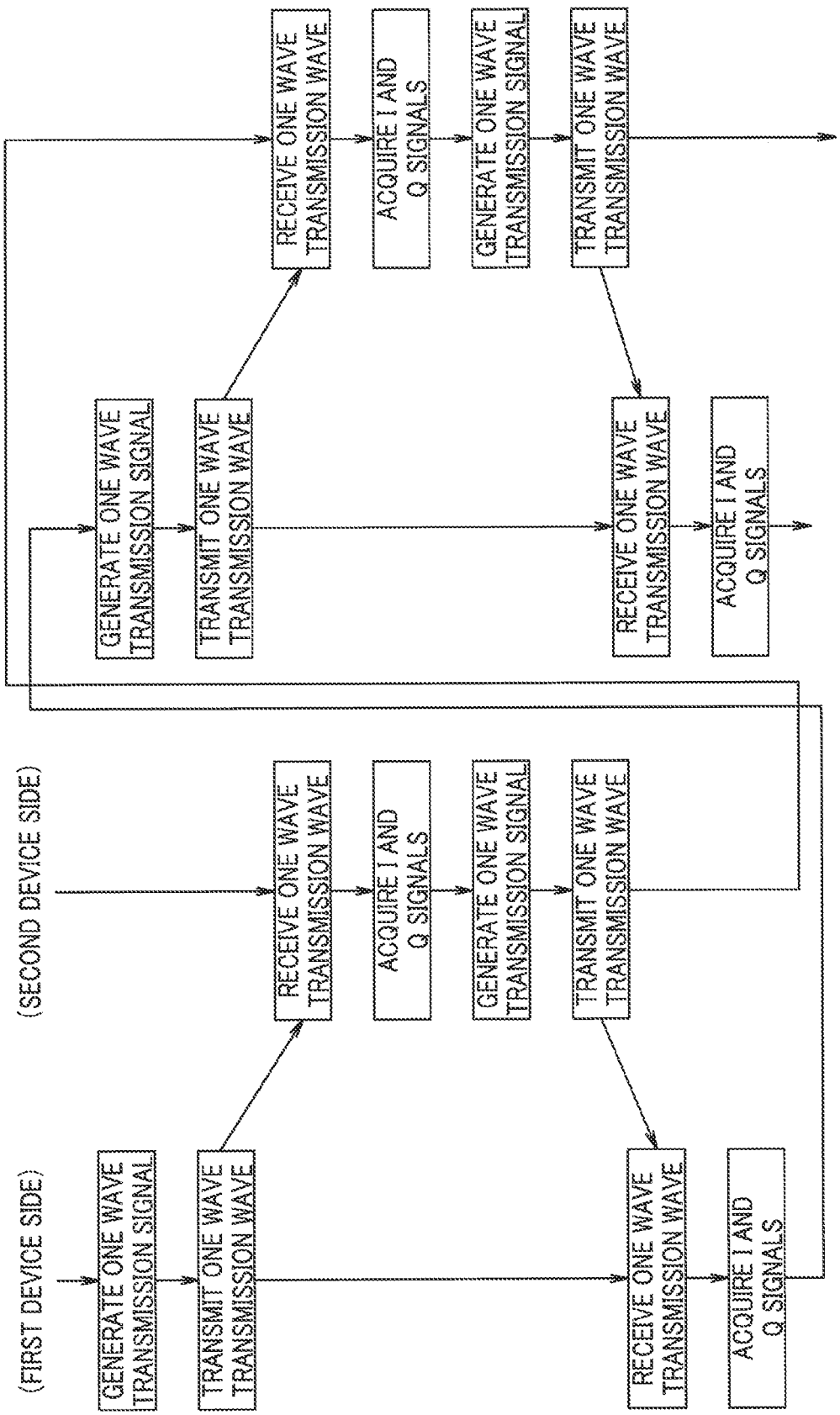
FIG. 11A is a flowchart for explaining the time-series transmission and reception.

FIG. 11A is a flowchart in time-series transmission and reception. FIGS. 11B to 15 are explanatory diagrams for explaining problems in the time-series transmission and reception and a method of solving the problems.

When it is specified that only one wave can be transmitted and received at the same time between the devices 1 and 2, it is necessary to carry out, in time-series processing, transmission and reception of at least four waves necessary for distance measurement. However, when the time-series transmission and reception is carried out, a phase equivalent to a delay that occurs in time-series processing is added to a detected phase. A phase required for propagation cannot be calculated. A reason for this is explained by modifying Equation (58) explained above.

Note that a broken line portion of FIG. 6 is substantially simultaneously executed. However, when transmission and reception of one wave is performed at a time in time-series processing, the broken line portion is as shown in FIG. 11A.

As in the explanation described above, in the devices 1 and 2 separated from each other by the distance R, a phase (shift amount) at the time when a signal having the angular frequency $\omega_{C1}+\omega_{B1}$ transmitted from the device 1 is detected in the device 2 is represented as $\theta_{H1}$, a phase at the time when a signal having the angular frequency $\omega_{C1}-\omega_{B1}$ transmitted from the device 1 is detected in the device 2 is represented as $\theta_{L1}$, a phase (shift amount) at the time when a signal having the angular frequency $\omega_{C2}+\omega_{B2}$ transmitted from the device 2 is detected in the device 1 is represented as $\theta_{H2}$, and a phase at the time when a signal having the angular frequency $\omega_{C2}-\omega_{B2}$ transmitted from the device 2 is detected in the device 1 is represented as $\theta_{L2}$.

Figure 11B:
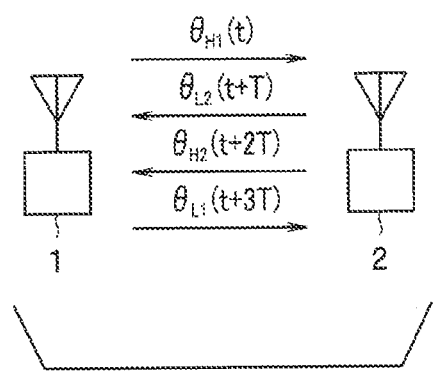
FIG. 11B is an explanatory diagram for explaining the time-series transmission and reception.
Figure 11C:
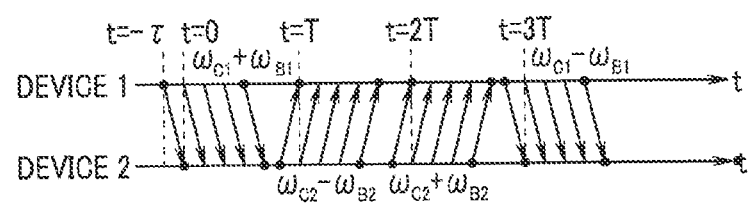
FIG. 11C is an explanatory diagram for explaining the time-series transmission and reception.

For example, phase detection order is set as $\theta_{H1}$, $\theta_{L2}$, $\theta_{H2}$, and $\theta_{L1}$. As shown in FIGS. 11B and 11C, respective transmission signals are transmitted and received while being shifted by a time T. In this case, a time period is substituted in (t) of Equations (27), (37), (47), and (57) described above. The following Equation (120) obtained by modifying Equation (58) described above holds:

$$\{\theta_{H1}(t)-\theta_{L1}(t+3T)\}+\{\theta_{H2}(t+2T)-\theta_{L2}(t+T)\}=(\theta_{\tau H1}-\theta_{\tau L1})+(\theta_{\tau H2}-\theta_{\tau L1})+(\omega_{C1}-\omega_{C2})4T \quad (120)$$

A last term of Equation (120) described above is a phase added by the time-series transmission and reception. The added phase is a multiplication result of error angular frequencies between the local angular frequencies used in the device 1 and the device 2 and a delay 4T, where the local frequencies are almost the same frequencies as the RF frequencies used in the device 1 and the device 2. When a local frequency is set to 920 MHz, a frequency error is set to 40 ppm, and a delay T is set to 0.1 ms, the added phase is 360°×14.7. It is shown that an error due to the added phase is too large and distance measurement cannot be correctly performed.

Figure 12A:
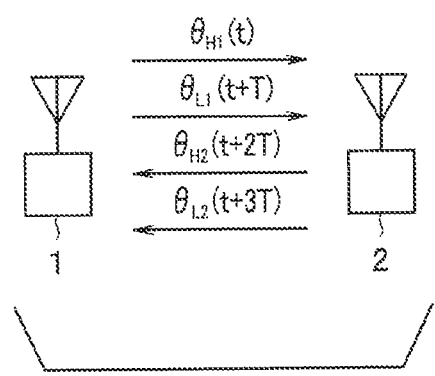
FIG. 12A is an explanatory diagram for explaining the time-series transmission and reception.
Figure 12B:
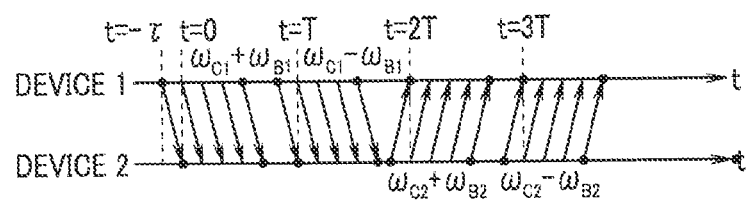
FIG. 12B is an explanatory diagram for explaining the time-series transmission and reception.

The phase detection order is set as $\theta_{H1}$, $\theta_{L1}$, $\theta_{H2}$, and $\theta_{L2}$. FIGS. 12A and 12B show an example of this case. In this case, the following Equation (121) is obtained by modifying Equation (58) described above:

$$\{\theta_{H1}(t)-\theta_{L1}(t+T)\}+\{\theta_{H2}(t+2T)-\theta_2(t+3T)\}=(\theta_{\tau H1}-\theta_{\tau L1})+(\theta_{\tau H2}-\theta_{\tau L2})+(\omega_{B1}-\omega_{B2})4T \quad (121)$$

A last term of Equation (121) described above is a phase added by the time-series transmission and reception. The added phase is a multiplication result of error angular frequencies between the local angular frequencies for baseband processing used in the device 1 and the device 2 and a delay 4T, where the local frequencies for baseband processing are almost the same frequencies as the baseband frequencies 0 used in the device 1 and the device 2. When a local frequency for baseband processing is set to 5 MHz, a frequency error is set to 40 ppm, and the delay T is set to 0.1 ms, the added phase is 360°×0.08=28.8°. It is shown from precedence that distance measurement can be correctly performed.

However, in this case, it depends on a system whether an error is within an allowable error of system specifications. The present embodiment presents a time-series procedure for reducing a distance error that occurs because of the time-series transmission and reception. Note that the present embodiment indicates a procedure that takes into account the regulation of transmission and reception specified by the Radio Law.

(Specific Procedure)

First, an influence due to a transmission delay is considered.

The following Equation (122) is obtained by modifying Equation (58) described above:

$$\{\theta_{H1}(t)+\theta_{H2}(t)\}-\{\theta_{L1}(t)+\theta_{L2}(t)\}=(\theta_{\tau H1}+\theta_{\tau H2})-(\theta_{\tau L1}+\theta_{\tau L2}) \quad (122)$$

In the equation, $$\theta_{H1}(t)+\theta_{H2}(t)=\theta_{\tau H1}-\theta_{\tau H2} \quad (123)$$

$$\theta_{L1}(t)+\theta_{L2}(t)=\theta_{\tau L1}+\theta_{\tau L2} \quad (124)$$

In wireless communication, there is a provision that, when a signal addressed to oneself is received, a reply can be transmitted without carrier sense. According to the provision, after transmission of a signal from the device 1 to the device 2 ends, a reply is immediately transmitted from the device 2 to the device 1. To simplify an analysis, it is assumed that the device 2 transmits a reply to the device 1 after to from the transmission by the device 1. The following Equation (125) is obtained from Equations (27) and (37):

$$\theta_{H1}(t)+\theta_{H2}(t+t_0)=\theta_{\tau H1}+\theta_{\tau H2}+\{(\omega_{B1}-\omega_{B2})+(\omega_{C1}-\omega_{C2})\}t_0 \quad (125)$$

A delay $t_0$ is a shortest time period and includes a time period in which a signal having the angular frequency $\omega_{C1}+\omega_{B1}$ is transmitted from the device 1 to the device 2, a transmission and reception timing margin, and a propagation delay. A third term and a fourth term on a right side are phase errors due to the delay to. The fourth term is particularly a problem because a frequency is high. This is referred to below.

Figure 13:
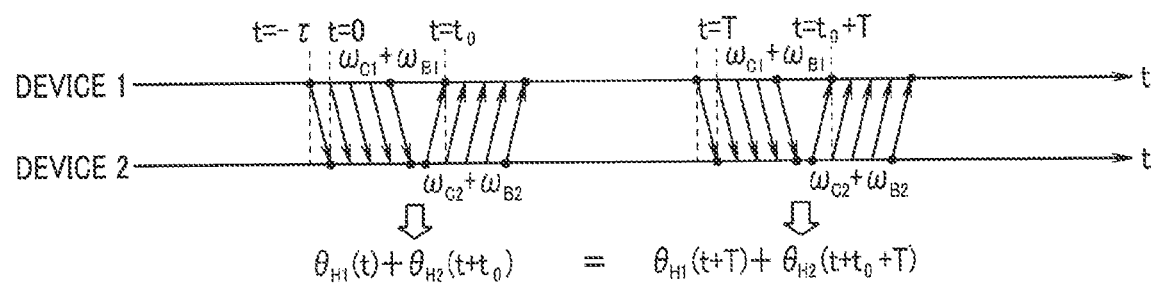
FIG. 13 is an explanatory diagram for explaining the time-series transmission and reception.

The delay T is further added to a left side of Equation (125). FIG. 13 shows such a transmission procedure. As shown in FIG. 13, an addition value of a detected phase in this case is the same irrespective of the addition of the delay T. Therefore, the following Equation (126) is obtained:

$$\theta_{H1}(t+T)+\theta_{H2}(t+t_0T)=\theta_{\tau H1}+\theta_{\tau H2}+\{(\omega_{B1}-\omega_{B2})+(\omega_{C1}-\omega_{C2})\}t_0 \quad (126)$$

A right side of Equation (126) described above and a right side of Equation (125) described above are the same. That is, if a relative time difference is the same (in the example explained above, T), an addition result of a phase in which a signal transmitted from the device 1 is received by the device 2 and a phase in which a signal transmitted from the device 2 is received by the device 1 does not change irrespective of the delay T. That is, the addition result of the phases is a value that does not depend on the delay T.

Transmission and reception of the angular frequency $\omega_{C1}-\omega_{B1}$ signal between the device 1 and the device 2 is explained the same. That is, the following Equations (127) and (128) are obtained from Equations (47) and (57) described above:

$$\theta_{L1}(t)+\theta_{L2}(t+t_0)=\theta_{\tau L1}+\theta_{\tau L2}+\{-(\omega_{B1}-\omega_{B2})+(\omega_{C1}-\omega_{C2})\}t_0 \quad (127)$$

$$\theta_{L1}(t+T)+\theta_{L2}(t+t_0T)=\theta_{\tau L1}+\theta_{\tau L2}+\{-(\omega_{B1}-\omega_{B2})+(\omega_{C1}-\omega_{C2})\}t_0 \quad (128)$$

From the above examination, a sequence is considered in which, after transmission and reception in both directions of the angular frequency $\omega_{C1}+\omega_{B1}$ signal, transmission of reception of the angular frequency $\omega_{C1}-\omega_{B1}$ signal is performed. When a transmission start time of the angular frequency $\omega_{C1}-\omega_{B1}$ signal from the device 1 is represented as T on a basis of a transmission start time of the angular frequency $\omega_{C1}+\omega_{B1}$ signal, the following Equation (129) is obtained from Equations (125) and (128) describe above, where $T>t_0$ is assumed.

$$\theta_{H1}(t)+\theta_{H2}(t+t_0)-\{\theta_{L1}(t+T)+\theta_{L2}(t+t_0+T)\}=\theta_{\tau H1}-\theta_{\tau L1}+\theta_{\tau H2}-\theta_{\tau L2}+2(\omega_{B1}-\omega_{B2})t_0 \qquad (129)$$

A last term of a left side of Equation (129) described above is a phase error due to a transmission delay. A delay error due to a received local frequency for high-frequency is cancelled by calculating a difference between the angular frequency $\omega_{C1}+\omega_{B1}$ signal and the angular frequency $\omega_{C1}-\omega_{B1}$ signal. Therefore, the phase error is, in terms of time series, multiplication of a shortest delay time $t_0$ and an error of a local angular frequency (e.g., $2\pi\times5$ MHz) for a baseband processing. If the delay time $t_0$ is set small, the error is small. Therefore, depending on a value of the delay time $t_0$, practically, it is considered possible to perform distance measurement without a problem in accuracy.

A method of removing the last term of Equation (129) described above, which is a distance estimation error factor, is explained.

The following Equation (130) is obtained from Equations (27) and (37) described above:

$$\theta_{H1}(t+t_0)+\theta_{H2}(t)=\theta_{\tau H1}+\theta_{\tau H2}-\{(\omega_{B1}-\omega_{B2})+(\omega_{C1}-\omega_{C2})\}t_0 \qquad (130)$$

Even if a predetermined delay D is added to a left side of Equation (130), as explained above, a value of a right side does not change. Therefore, the following Equation (131) is obtained:

$$\theta_{H1}(t+t_0+D)+\theta_{H2}(t+D)=\theta_{\tau H1}+\theta_{\tau H2}-\{(\omega_{B1}-\omega_{B2})+(\omega_{C1}-\omega_{C2})\}t_0 \qquad (131)$$

When the Equations (125) and (131) are added up, the following Equation (132) is obtained:

$$\theta_{H1}(t)+\theta_{H2}(t+t_0)+\theta_{H1}(t+t_0+D)+\theta_{H2}(t+D)=2(\theta_{\tau H1}+\theta_{\tau H2}) \qquad (132)$$

Figure 14:
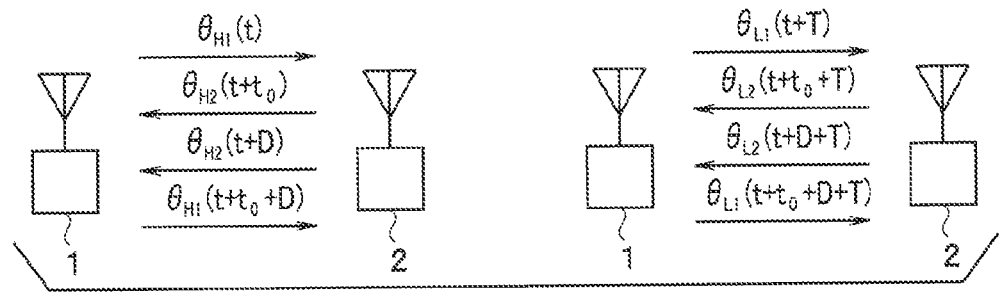
FIG. 14 is an explanatory diagram for explaining the time-series transmission and reception.

A left side of FIG. 14 shows a state of Equation (132) described above. When $D=t_0$ in Equation (132), the following Equation (133) is obtained:

$$\theta_{H1}(t)+2\theta_{H2}(t+t_0)+\theta_{H1}(t+2t_0)=2(\theta_{\tau H1}+\theta_{\tau H2}) \qquad (133)$$

A right side of Equation (133) described above is only a term of a radio wave propagation delay corresponding to a distance that does not depend on time.

From Equations (47) and (57) described above, the following Equation (134) is obtained:

$$\theta_{L1}(t+t_0)+\theta_{L2}(t)=\theta_{\tau L1}+\theta_{\tau L2}-\{-(\omega_{B1}-\omega_{B2})+(\omega_{C1}-\omega_{C2})\}t_0 \qquad (134)$$

Even if the predetermined delay D is added to a left side of Equation (134), a value of a right side does not change. Therefore, the following Equation (135) is obtained:

$$\theta_{L1}(t+t_0D)+\theta_{L2}(t+D)=\theta_{\tau L1}+\theta_{\tau L2}-\{-(\omega_{B1}-\omega_{B2})+(\omega_{C1}-\omega_{C2})\}t_0 \qquad (135)$$

When Equations (127) and (135) described above are added up, the following Equation (136) is obtained:

$$\theta_{L1}(t)+\theta_{L2}(t+t_0)+\theta_{L1}(t+t_0+D)+\theta_{L2}(t+D)=2(\theta_{\tau L1}+\theta_{\tau L2}) \qquad (136)$$

In Equation (136), when $D=t_0$, the following Equation (137) is obtained:

$$\theta_{L1}(t)+2\theta_{L2}(t+t_0)+\theta_{L1}(t+2t_0)=2(\theta_{\tau L1}+\theta_{\tau L2}) \qquad (137)$$

A right side of Equation (137) described above is only a term of a radio wave propagation delay corresponding to a distance that does not depend on time.

Equations (133) and (137) described above mean a sequence for performing phase detection of a transmission signal of the device 1 in the device 2, performing phase detection of a transmission signal of the device 2 in the device 1 after $t_0$, and performing the phase detection of the transmission signal of the device 1 in the device 2 again after $2t_0$. In the following explanation, the process in which transmission of the transmission signal of the device 1 and phase detection in the device 2 for the transmission signal and transmission of the transmission signal of the device 2 and phase detection in the device 1 for the transmission signal alternate and the phase detections are measured again by shifting time is referred to as "repeated alternation".

That is, the repeated alternation for respectively transmitting and receiving two carrier signals in the devices 1 and 2 and transmitting and receiving the carrier signal again at a to interval from the device 1 or 2 to the other device is performed. Consequently, although the order and time of the transmission are limited, it is possible to perform accurate distance measurement that does not depend on time.

Further, depending on a transmission and reception sequence of carrier signals, even if the repeated alternation is not performed at the to interval, it is possible to perform accurate distance measurement that does not depend on time.

That is, even if a fixed delay T is added to a left side of Equation (136) described above, a right side is fixed. Therefore, the following Equation (138) is obtained:

$$\theta_{L1}(t+T)+\theta_{L2}(t+t_0+T)+\theta_{L1}(t+t_0+D+T)+\theta_{L2}(t+D+T)=2(\theta\tau_{L1}+\theta\tau_{L2}) \qquad (138)$$

The following Equation (139) is obtained from Equations (132) and (138) described above:

$$\theta_{H1}(t)+\theta_{H2}(t+t_0)+\theta_{H1}(t+t_0+D)+\theta_{H2}(t+D)-\{\theta_{L1}(t+T)+\theta_{L2}(t+t_0+T)+\theta_{L1}(t+t_0+D+T)+\theta_{L2}(t+D+T)\}=2\{(\theta_{\tau H1}-\theta_{\tau L1})+(\theta_{\tau H2}-\theta_{\tau L2})\}=4\times(\omega_{B1}+\omega_{B2})\tau_1 \qquad (139)$$

Equation (139) described above indicates a sequence for, after performing the repeated alternation of reciprocation of the angular frequencies $\omega_{C1}+\omega_{B2}$ signal and $\omega_{C2}+\omega_{B2}$ signal at the time interval D, performing the repeated alternation of reciprocation of the angular frequencies $\omega_{C1}-\omega_{B1}$ signal and $\omega_{C2}-\omega_{B2}$ signal at the time interval D after T from a measurement start. By adopting this sequence, it is possible to remove a distance estimation error factor of the last term of Equation (129) described above and perform accurate distance measurement.

Figure 15:
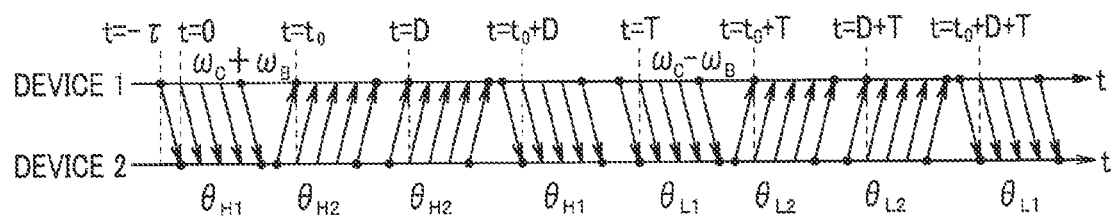
FIG. 15 is an explanatory diagram for explaining the time-series transmission and reception.

FIGS. 14 and 15 show the sequence. It is possible to extract only a propagation delay component by measuring a phase in such a sequence. That is, the control section 11 of the device 1 transmits a transmission wave having the angular frequency $\omega_{C1}+\omega_{B1}$ (hereinafter referred to as transmission wave H1A) at predetermined timing. Immediately after receiving the transmission wave H1A, the control section 21 of the device 2 transmits a transmission wave having the angular frequency $\omega_{C2}+\omega_{B2}$ (hereinafter referred to as transmission wave H2A). Further, after transmitting the transmission wave H2A, the control section 21 of the device 2 transmits a transmission wave having the angular frequency $\omega_{C2}+\omega_{B2}$ (hereinafter referred to as transmission wave H2B). After receiving the second transmission wave H2B, the control section 11 of the device 1 transmits a transmission wave having the angular frequency $\omega_{C1}+\omega_{B1}$ (hereinafter referred to as transmission wave H1B).

Further, the control section 11 transmits a transmission wave having the angular frequency $\omega_{C1}-\omega_{B1}$ (hereinafter referred to as transmission wave L1A). Immediately after receiving the transmission wave L1A, the control section 21 of the device 2 transmits a transmission wave having the angular frequency $\omega_{C2}-\omega_{B2}$ (hereinafter referred to as transmission wave L2A). Further, after transmitting the transmission wave L2A, the control section 21 of the device 2 transmits a transmission wave having the angular frequency $\omega_{C2}-\omega_{B2}$ (hereinafter referred to as transmission wave L2B). After receiving the second transmission wave L2B, the control section 11 of the device 1 transmits a transmission wave having the angular frequency $\omega_{C1}-\omega_{B1}$ (hereinafter referred to as transmission wave L1B).

In this way, as shown in FIGS. 14 and 15, the control section 21 of the device 2 acquires a phase $\theta_{H1}(t)$ based on the transmission wave H1A in a predetermined time from a predetermined reference time 0, acquires a phase $\theta_{H1}(t+t_0+D)$ based on the transmission wave H1B in a predetermined time from a time $t_0+D$, acquires a phase $\theta_{L1}(t+T)$ based on the transmission wave L1A in a predetermined time from the time T, and acquires a phase $\theta_{L1}(t+t_0+D+T)$ based on the transmission wave L1B in a predetermined time from a time $t_0+D+T$.

The control section 11 of the device 1 acquires a phase $\theta_{H2}(t+t_0)$ based on the transmission wave H2A in a predetermined time from a time $t_0$, acquires a phase $\theta_{H2}(t+D)$ based on the transmission wave H2B in a predetermined time from a time D, acquires a phase $\theta_{L2}(t+t_0+T)$ based on the transmission wave L2A in a predetermined time from a time $t_0+T$, and acquires a phase $\theta_{L2}(t+D+T)$ based on the transmission wave L2B in a predetermined time from a time $D+T$.

At least one of the devices 1 and 2 transmits phase information, that is, calculated four phases or two phase differences or an operation result of Equation (139) described above of the phase differences. The control section of the device 1 or 2, which receives the phase information, calculates a distance according to an operation of Equation (139) described above. Note that, although "calculate a phase difference" is described in steps S7 and S17 in FIG. 6, in this case, it is not always necessary to calculate a phase difference in steps S7 and S17. A phase difference may be calculated during the distance calculation in S19.

In this way, in the present embodiment, by repeatedly alternating the carrier signals from the first device and the second device, even when the carrier signals cannot be simultaneously transmitted and received, it is possible to perform accurate distance measurement. For example, the first device and the second device respectively transmit signals having two angular frequencies twice to the second device and the first device in a predetermined sequence and calculate phase differences respectively in the first and second devices. Any one of the first device and the second device transmits calculated phase information to the other. The device, which receives the phase information, calculates a distance between the first device and the second device on a basis of eight phases calculated by the first device and the second device. Consequently, the distance between the first device and the second device is accurately calculated irrespective of initial phases of the oscillators of the first device and the second device. In this way, even when signals having respective angular frequencies are not simultaneously transmitted and are transmitted and received at timings shifted from each other, it is possible to remove an error of distance estimation and perform accurate distance measurement.

(Problems of the Multipath)

In the above explanation, the device 2 receives the transmission signal two waves having the angular frequencies $\omega_{C1}+\omega_{B1}$ and $\omega_{C1}-\omega_{B2}$ from the device 1 and detects the phases $\theta_{H1}(t)$ and $\theta_{L1}(t)$. The device 1 receives the transmission signal two waves having the angular frequencies $\omega_{C2}+\omega_{B2}$ and $\omega_{C2}-\omega_{B2}$ from the device 2 and detects the phases $\theta_{H2}(t)$ and $\theta_{L2}(t)$. It is possible to perform the distance measurement using these four phases.

However, there is a problem that a phase of a received wave changes because of an influence of the multipath and a phase of a propagation delay corresponding to a distance cannot be accurately extracted. This problem is explained below using a two-wave model put under strict conditions in the influence of the multipath.

Figure 16:
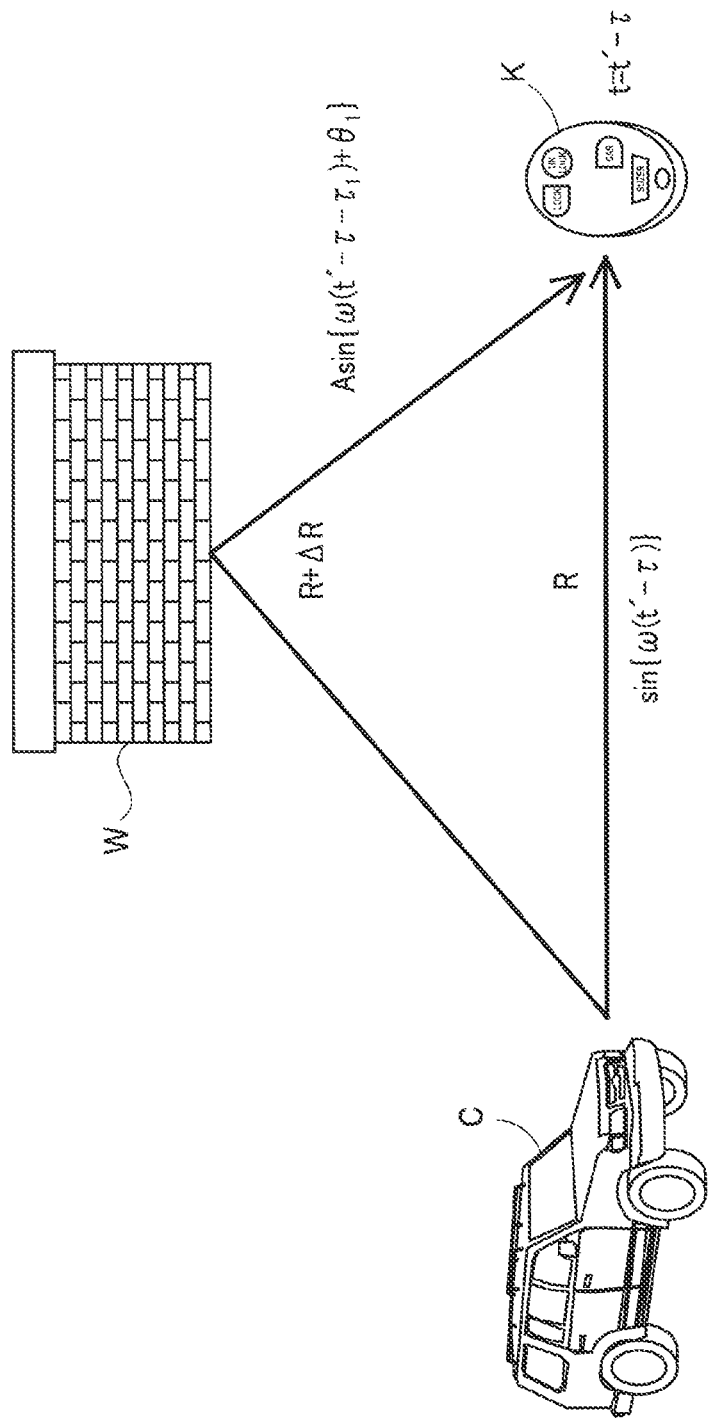
FIG. 16 is a diagram for explaining problems due to a multipath environment in distance measurement.

FIG. 16 is an explanatory diagram for explaining the problem due to such a multipath environment in the distance measurement.

As shown in FIG. 16, a sine wave $y(t')=\sin \omega t'$ transmitted from an automobile C reaches a key K via a route (a distance R) in which the sine wave $y(t')=\sin \omega t'$ is directly propagated to the key K and another route (a distance $R+\Delta R$) in which the sine wave $y(t')=\sin \omega t'$ is reflected on a wall W and propagated to the key K. A propagation delay of a direct wave passing through the route in which the sine wave $y(t')=\sin \omega t'$ is directly propagated from the automobile C to the key K is $\tau$. A propagation delay of a delayed wave passing through the route in which the sine wave $y(t')=\sin \omega t'$ is reflected on the wall W and propagated from the automobile C to the key K is $\tau+\tau_1$.

It is assumed that the key K receives two waves, that is, a wave propagated through a route in which the wave is propagated to the key K at the propagation delay $\tau$ and a wave propagated through a route in which the wave is reflected on a wall and propagated to the key at a propagation delay $\tau+\tau_1$. In this case, a signal $y(t')$ received by the key K is a signal obtained by adding up the two waves and is represented by the following Equation (69):

$$y(t')=\sin \{\omega(t'-\tau)\}+A \sin \{\omega(t'-\tau-\tau_1)+\theta_1\} \quad (69)$$

In the equation, $\theta_1$ represents a phase shift that occurs when the wave is reflected on the wall. A represents amplitude that is set taking into account a loss due to the reflection and a propagation loss of a distance error $\Delta R$. To simplify the calculation, t is set as $t=t'-\tau$. A signal at time t in the key K is represented by the following Equation (70):

$$y(t)=\sin \omega t+A \sin \{\omega(t-\tau_1)+\theta_1\}=\{1+A \cos(\omega\tau_1-\theta_1)\} \sin \omega t-A \sin(\omega\tau_1-\theta_1)\cos \omega t \quad (70)$$

When Equation (70) described above is modified using a composition formula of trigonometric functions, the following Equations (71) and (72) are obtained:

$$y(t)=\{1+A^2+2A \cos(\omega\tau_1-\theta_1)\}^{1/2} \sin(\omega t+\phi) \quad (71)$$

$$\phi=-\tan^{-1}(A \sin(\omega\tau_1-\theta_1)/\{1+A \cos(\omega\tau_1-\theta_1)\} \quad (72)$$

It is shown from Equations (71) and (72) that, because of an influence of a delayed wave $A \sin \{\omega(t-\pi_1)+\theta_1\}$ reflected on the wall W, amplitude and a phase of a received signal of the key K change compared with a case of only a direct wave. A phase change corresponding to an angular frequency $\omega=\omega_{C1}+\omega_{B1}$ is represented as $\phi_H$ and a phase change corresponding to an angular frequency $\omega=\omega_{C1}-\omega_{B1}$ is represented as $\phi_L$. When a difference $\phi_L-\phi_H$ of the phase changes is calculated, the following Equation (73) is obtained:

$$\phi_L-\phi_H=-\tan^{-}[A \sin \{(\omega_{C1}-\omega_{B1})\tau_1-\theta_1\}]/[1A \cos \{(\omega_{C1}-\omega_{B1})\tau_1-\theta_1\}]+\tan^{-1}[A \sin \{(\omega_{C1}+\omega_{B1})\tau_1-\theta_1\}]/[1+A \cos \{(\omega_{C1}+\omega_{B1})\tau_1-\theta_1\}] \quad (73)$$

Equation (73) described above indicates a phase detection error caused by presence of the delayed wave. In the equation, $\tau_1$ represents a delay time of the delayed wave with respect to the direct wave and is a value proportional to a difference of a propagation distance. As it is shown from Equation (73), $\phi_L-\phi_H$ depends on $\theta_1$. However, $\phi_L-\phi_H$ depends on a reflecting object and an incident angle unrelated to the propagation distance.

Figure 17:
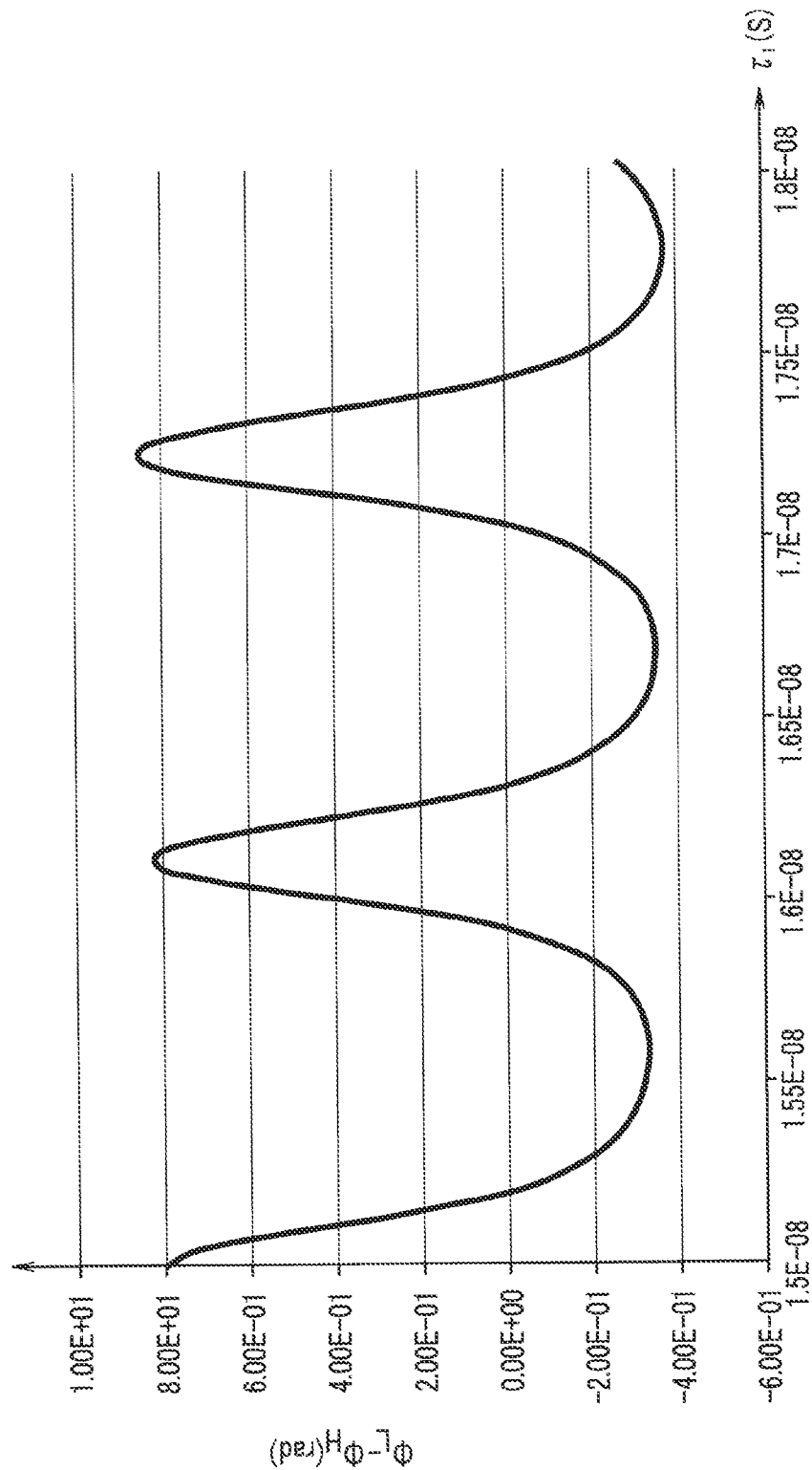
FIG. 17 is a graph showing a relation between a delay time $\tau_1$ and a difference $\phi_L - \phi_H$ of a phase change with time plotted on the horizontal axis and amplitude plotted on the vertical axis.

FIG. 17 is a graph showing a relation between the delay time $\tau_1$ and the difference $\phi_L-\phi_H$ of a phase change with time plotted on the horizontal axis and amplitude plotted on the vertical axis. Note that, in FIG. 17, a relation in a case of A=0.5, $\theta_1$=0(rad), $\tau_1$=16.8 (ns), $\omega_{C1}$=2π×900 M(Hz), and $\omega_{B1}$=2π×5 M(Hz) is shown.

Since a difference of a delay time between the direct wave and the delayed wave is $\tau_1$, the phase changes $\phi_H$ and $\phi_L$, angular frequencies of which respectively correspond to $\omega_{C1}+\omega_{B1}$ and $\omega_{C1}-\omega_{B1}$, are represented by the following Equations (74) and (75):

$$\phi_H=(\omega_{C1}+\omega_{B1})\tau_1 \quad (74)$$

$$\phi_L=(\omega_{C1}-\omega_{B1})\tau_1 \quad (75)$$

From Equations (74) and (75), since $\tau_1=(\phi_H-\phi_L)/2\omega_{B1}$, the distance error ΔR due to a difference of a path is represented by the following Equation (76):

$$\Delta R=c\tau_1=c\times(\phi_H-\phi_L)/(2\omega_{B1}) \quad (76)$$

When $\omega_{B1}$=2π×5 M(Hz), $\tau_1$ is about 16 (ns), $-0.80 \leq \phi_H-\phi_L \leq 0.4$. In this case, the distance error ΔR is approximately 1.9 m to 3.8 m. That is means, when 2 m is requested as distance accuracy in the distance measuring system under such a condition, distance measurement is performed with an unallowable distance error. Therefore, in this case, it is necessary to compensate for the influence due to the multipath.

(Specific Example for Solving the Problems)

Therefore, in the present embodiment, the transmitting sections 14 and 24 transmit a signal having an angular frequency $\omega=\omega_{C1}$ separately from the transmission waves having the angular frequencies $\omega=\omega_{C1}+\omega_{B1}$ and $\omega=\omega_{C1}-\omega_{B1}$.

A result obtained by calculating amplitude ratios of the three waves, specifically, an amplitude ratio $\Delta A_{H0}$ of the angular frequency $\omega_{C1}+\omega_{B1}$ with respect to the angular frequency $\omega_{C1}$ and an amplitude ratio $\Delta A_{L0}$ of the angular frequency $\omega_{C1}-\omega_{B1}$ with respect to the angular frequency $\omega_{C1}$ is used. The added signal having the angular frequency $\omega_{C1}$ is an average angular frequency of $\omega_{C1}+\omega_{B1}$ and $\omega_{C1}-\omega_{B1}$. However, an effect of the added signal is not lost even if the angular frequency of the added signal slightly deviates from the average.

In the key K, concerning a received signal received at the time t, when amplitude $A_H$ at the angular frequency $\omega_{C1}+\omega_{B1}$, amplitude $A_0$ at the angular frequency $\omega_{C1}$, and amplitude $A_L$ at the angular frequency $\omega_{C1}-\omega_{B1}$ are respectively calculated from Equation (71) described above, the following Equations (77) to (79) are obtained:

$$A_H=[1+A^2+2A\cos\{(\omega_{C1}+\omega_{B1})\tau_1-\theta_1\}]^{1/2} \quad (77)$$

$$A_0=\{1+A^2+2A\cos(\omega_{C1}\tau_1-\theta_1)\}^{1/2} \quad (78)$$

$$A_L=[1+A^2+2A\cos\{(\omega_{C1}-\omega_{B1})\tau_1-\theta_1\}]^{1/2} \quad (79)$$

However, it is assumed that the phase shift $\theta_1$ caused by the wall W during the reflection is the same value in an applied frequency range. From Equations (77) to (79) described above, the following Equations (80) and (81) in which amplitude ratios $\Delta A_{H0}$ and $\Delta A_{L0}$ are indicated in decibel are obtained:

$$\Delta A_{H0}=10\log\{1+A^2+2A\cos\{(\omega_{C1}-\omega_{B1})\tau_1-\theta_1\}\}-10\log\{1+A^2+2A\cos(\omega_{C1}\tau_1-\theta_1)\} \quad (80)$$

$$\Delta A_{L0}=10\log\{1+A^2+2A\cos\{(\omega_{C1}-\omega_{B1})\tau_1-\theta_1\}\}-10\log\{1+A^2+2A\cos(\omega_{C1}\tau_1-\theta_1)\} \quad (81)$$

Figure 18:
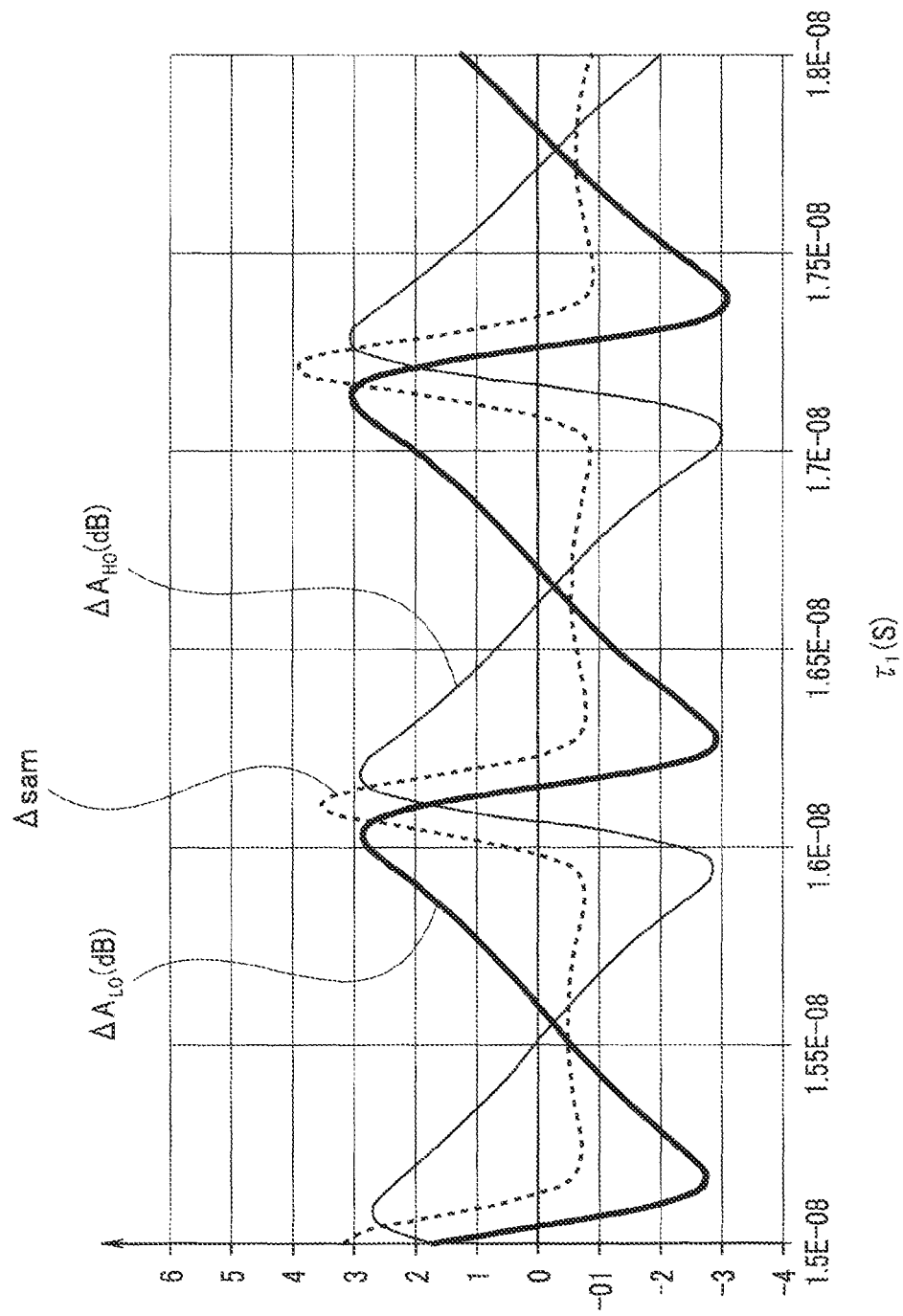
FIG. 18 is a graph showing a relation between Equations (80) and (81) and $\Delta sum = \Delta A_{H0} + \Delta A_{L0}$ and $\tau_1$.

FIG. 18 is a graph showing a relation between Equations (80) and (81) described above and $\Delta\text{sum}=\Delta A_{H0}+\Delta A_{L0}$ and $\tau_1$ by using the same display as FIG. 17. In FIG. 18, $\theta_1$=0(rad). Note that a change in $\theta_1$ is equivalent to a shift of the horizontal axis $\tau_1$. Shapes of respective characteristic curves in the graph do not change.

As it is shown from comparison of FIG. 17 and FIG. 18, the delay time $\tau_1$ that takes a maximal value of $\Delta\text{sum}=\Delta A_{H0}+A_{L0}$ and a maximal value of $\phi_H-\phi_L$ is equal. Therefore, under the consideration of this point, in the present embodiment, the phase difference $\phi_H+\phi_L$ is corrected using $\Delta\text{sum}=\Delta A_{H0}+\Delta A_{L0}$.

Figure 19:
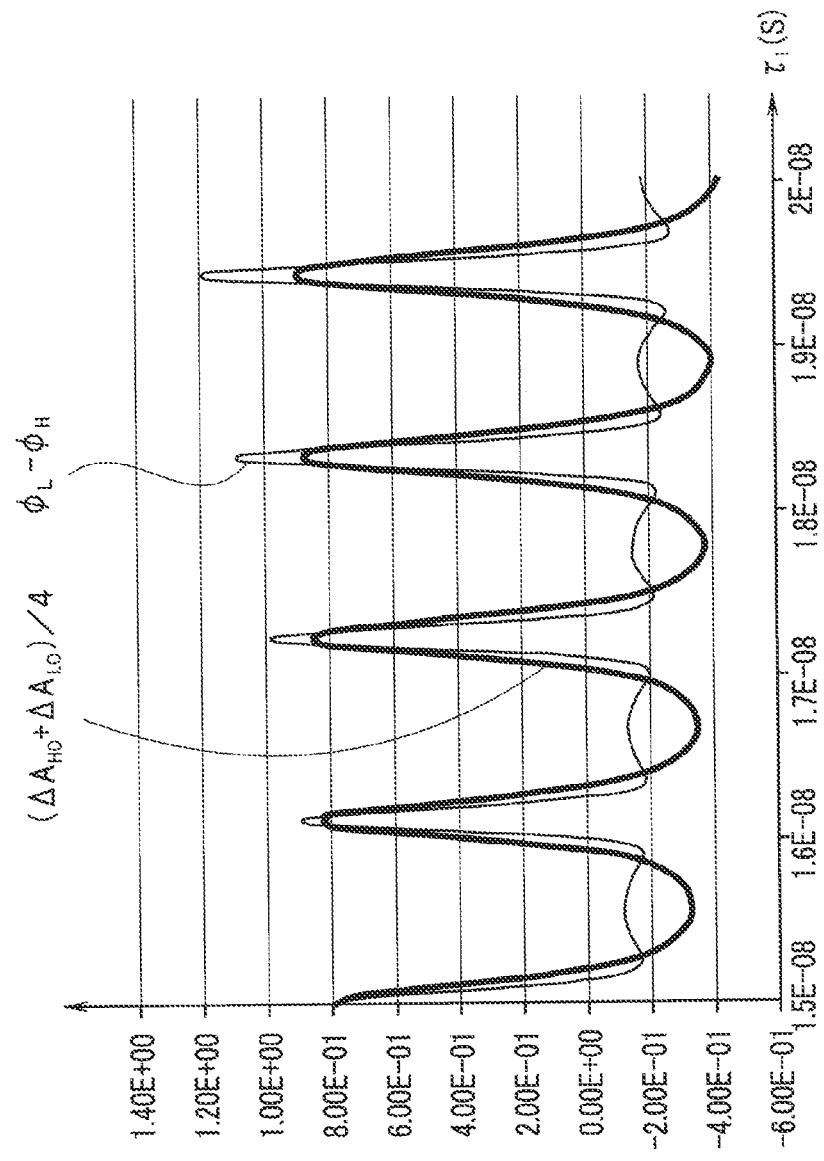
FIG. 19 is a graph for explaining $\tau_1$ dependency of $\phi_L - \phi_H$ and $\tau_1$ dependency of $\Delta sum/4 = (\Delta A_{H0} + \Delta A_0)/4$ using the same display as FIGS. 17 and 18.

FIG. 19 is a graph for explaining $\tau_1$ dependency of $\phi_L-\phi_H$ and $\tau_1$ dependency of $\Delta\text{sum}/4=(\Delta A_{H0}+\Delta A_{L0})/4$ by using the same display as FIGS. 17 and 18.

As shown in FIG. 19, a characteristic curve of $\phi_H-\phi_L$ and a characteristic curve of $\Delta\text{sum}/4=(\Delta A_{H0}+\Delta A_{L0})/4$ show changes that are not the same but similar. If $(\Delta A_{H0}+\Delta A_{L0})/4$ is subtracted from a phase detected using two waves by making use of this relation, it is possible to greatly reduce a phase error due to the multipath. Note that addition of amplitude ratios is multiplied with (1/4). However, if target $\tau_1$ is changed, (1/4) is not always an optimum value. This multiplication value is a design parameter and may be changed when necessary.

When the distance error ΔR is calculated with respect to a value obtained by subtracting $(\Delta A_{H0}+\Delta A_{L0})/4$ from the phase error due to the multipath, the following Equation (82) is obtained:

$$\Delta R=\{\phi_L-\phi_H|\text{in rad}-(\Delta A_{H0}+\Delta A_{L0}|\text{in dB})/4\}\times c/(2\omega_{B1}) \quad (82)$$

Figure 20:
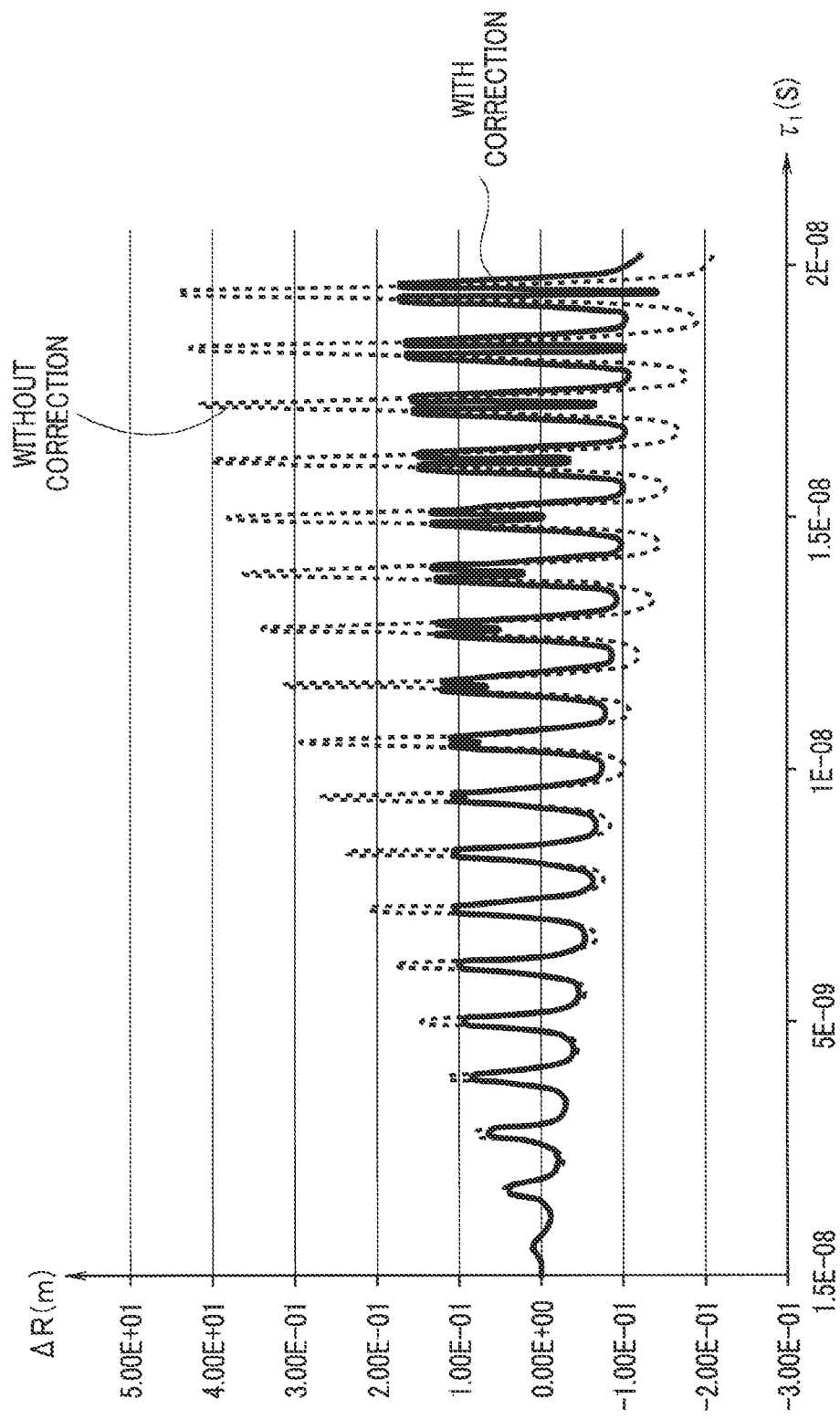
FIG. 20 is a graph showing a distance error $\Delta R$ without correction and a distance error $\Delta R$ with correction.

FIG. 20 is a graph showing the distance error ΔR without correction and the distance error ΔR with correction using the same display as FIGS. 17 to 19. Note that the vertical axis of FIG. 20 indicates the distance error ΔR (m). It is shown from Equation (82) described above that, in a range in which $\tau_1$ is 0 (ns) to 20 (ns), the distance error ΔR can be reduced to 1.8 m or less by subtracting $(\Delta A_{H0}+\Delta A_{L0})/4$ from a detected phase. In a range in which $\tau_1$ is 0 (ns) to 10 (ns), the distance error ΔR can be reduced to 1.2 m. In this way, in the present embodiment, it is possible to improve distance accuracy by making use of information concerning the amplitude ratios obtained using the three waves.

(Operation of Distance Measurement in Which Three Waves Corresponding to the Multipath are Used)

Figure 21:
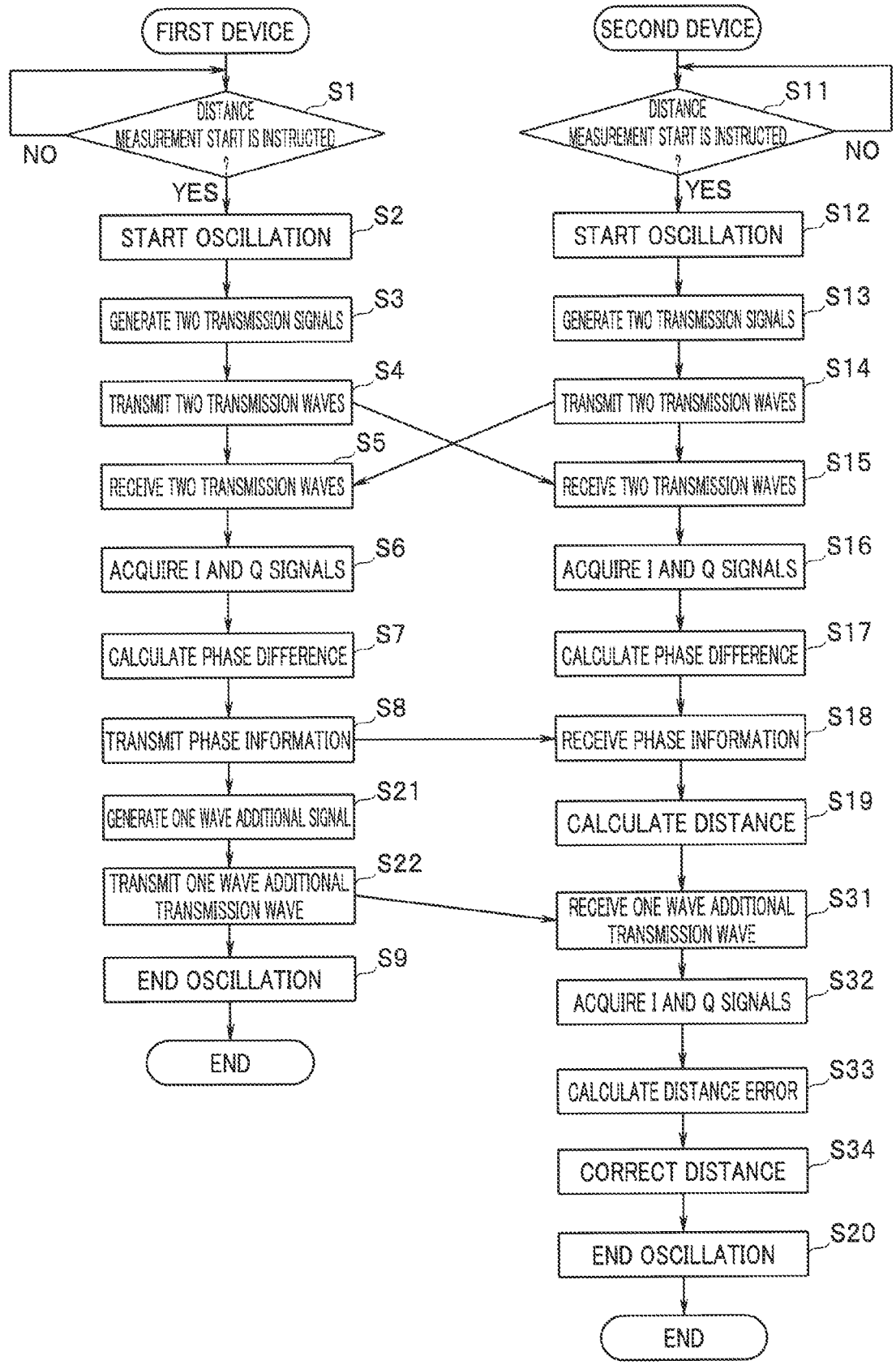
FIG. 21 is a flowchart for explaining an operation in the first embodiment.

An operation of the distance measuring system is explained with reference to the flowchart of FIG. 21 concerning a case in which three waves are used. In FIG. 21, the same procedures as the procedures in FIG. 6 are denoted by the same signs and explanation of the procedures is omitted. In FIG. 21, an operation of the device 1 is shown on a left side and an operation of the device 2 is shown on a right side. In FIG. 21, an arrow connecting steps of the devices 1 and 2 indicates that communication is performed between the devices 1 and 2.

As example shown in FIG. 21 is different from the flow shown in FIG. 6 in that procedures in steps S21 and S22 are added on the device 1 side and procedures in steps S31 to S34 are added on the device 2 side. Step S21 is a procedure for generating a transmission signal (an additional signal) of one wave having the angular frequency $\omega_{C1}$, which is an additional signal of a third wave, from the device 1. Step S22 is a procedure for transmitting an additional transmission wave of one wave based on the generated additional signal.

When receiving the additional transmission wave in step S31, the device 2 acquires I and Q signals in step S32 and calculates a distance error in step S33. In step S34, the device 2 subtracts the distance error from the distance calculated in step S19 and calculates a corrected distance.

Note that, in the flow shown in FIG. 21, as in the flow shown in FIG. 6, it is not always necessary to calculate a phase difference in steps S7 and S17. A phase difference may be calculated during the distance calculation in step S19.

Other action is the same as the action shown in FIG. 6.

Incidentally, the calculation of the distance error in step S33 is based on Equation (82) described above. The amplitude ratio $\Delta A_{H0}$ and the amplitude ratio $\Delta A_{L0}$ are not affected by time as indicated by Equations (80) and (81) described above. Therefore, the additional signal may be transmitted at any time timing. For example, in the example shown in FIG. 21, the additional signal is transmitted after the phase difference calculation. The additional signal may be transmitted immediately after transmission of two transmission waves or may be transmitted before the transmission of the two transmission waves.

In the example shown in FIG. 21, the device 2 receives the additional signal transmitted by the device 1 and calculates the distance error. However, it is also possible that the device 2 transmits an additional signal having an angular frequency $\omega_{c2}$, the device 1 calculates a distance error using the received additional signal and received two transmission waves and transmits information concerning the calculated distance error to the device 2, and the device 2 corrects a distance.

Other action is the same as the action in the case in which the two waves are used.

As explained above, in the present embodiment, by transmitting the two waves of the carrier signals from the first device and the second device to each other and transmitting the one wave of the additional signal, it is possible to calculate a distance error in the multipath and perform distance measurement with the influence of the multipath reduced.

Note that the processing concerning the multipath, the calculation processing of a distance by the residue of $2\pi$, the selection processing from the plurality of distance candidates, the processing in the time-series transmission and reception, and the like can be used in combination as appropriate.

Second Embodiment

Figure 22:
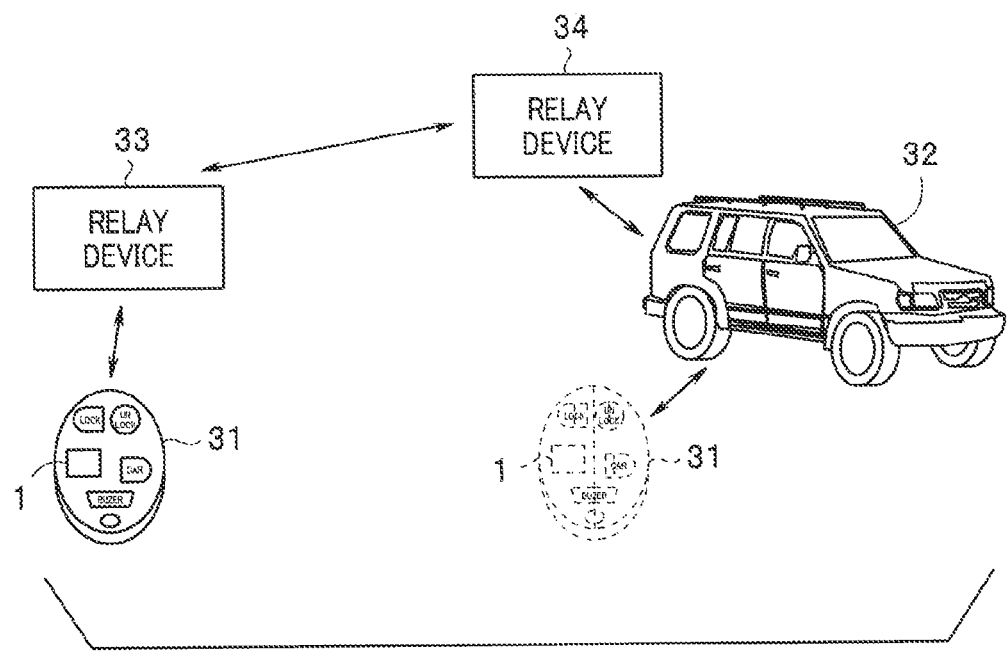
FIG. 22 is an explanatory diagram showing a second embodiment of the present invention.
Figure 23:
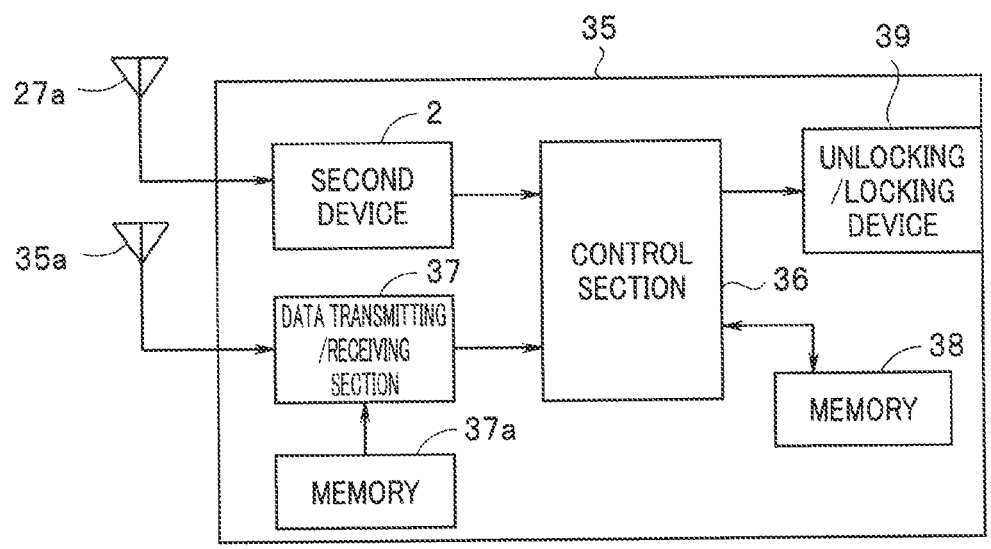
FIG. 23 is an explanatory diagram showing the second embodiment of the present invention.

FIGS. 22 and 23 are explanatory diagrams showing a second embodiment of the present invention. The present embodiment indicates an example in which the respective distance measuring systems are applied to a smart entry system.

In FIG. 22, a key 31 can transmit, by radio, a signal for enabling unlocking and locking of a door of an automobile 32 and a start of an engine of the automobile 32. That is, the key 31 includes a not-shown data transmitting/receiving section and can transmit encrypted peculiar data for authentication with the data transmitting/receiving section. A radio wave from the data transmitting/receiving section of the key 31 is received in a not-shown vehicle control device 35 mounted on the automobile 32.

As shown in FIG. 23, a control section 36 is provided in the vehicle control device 35. The control section 36 controls respective sections of the vehicle control device 35. The control section 36 is configured of a processor including a CPU. The control section 36 may operate a computer program stored in a memory 38 and control the respective sections.

A data transmitting/receiving section 37 is provided in the vehicle control device 35. The data transmitting/receiving section 37 can perform wireless communication with the data transmitting/receiving section of the key 31 via an antenna 35a. The data transmitting/receiving section 37 receives the peculiar data transmitted from the key 31 and transmits predetermined response data to the key 31 to perform authentication of the key 31 and the automobile 32.

The data transmitting/receiving section 37 can finely set electric field intensity. The authentication is not performed unless the key 31 is located in a relatively close position where the key 31 is capable of receiving transmission data of the data transmitting/receiving section 37, that is, near the automobile 32.

For example, as indicated by a broken line in FIG. 22, it is assumed that the key 31 is located sufficiently close to the automobile 32. In this case, the data transmitting/receiving section 37 is capable of communicating with the key 31. The data transmitting/receiving section 37 authenticates the key 31 through collation with peculiar data recorded in a memory 37a. The data transmitting/receiving section 37 outputs a signal indicating that the key 31 is authenticated to the control section 36. Consequently, the control section 36 controls an unlocking/locking device 39 to give permission of locking or unlocking.

In FIG. 22, attackers of a relay attack carry relay devices 33 and 34. The relay device 33 is capable of communicating with the key 31. The relay device 34 is capable of communicating with the data transmitting/receiving section 37 in the automobile 32. The relay devices 33 and 34 relay communication between the key 31 and the data transmitting/receiving section 37. Consequently, even when the key 31 is sufficiently separated from the automobile 32 as shown in FIG. 22 and direct communication between the key 31 and the data transmitting/receiving section 37 cannot be performed, the data transmitting/receiving section 37 can authenticate the key 31 through the relay devices 33 and 34.

Therefore, in the present embodiment, the control section 36 determines on a basis of an authentication result of the data transmitting/receiving section 37 and a distance measurement result from the second device 2 whether unlocking and locking, a start of the engine, and the like are permitted.

The second device 2 in the first embodiment is incorporated in the key 31. On the other hand, the device 1 in the first embodiment is mounted on the vehicle control device 35. A transmission wave from the device 1 is received in the device 2 via an antenna 27a. A transmission wave from the device 2 is received in the device 1 via the antenna 27a. The transmission wave from the device 1 is directly received by the antenna 27a in some cases and is received by the antenna 27a through the relay devices 33 and 34 in other cases. Similarly, the transmission wave from the second device 2 is directly received by the device 1 from the antenna 27a in some cases and is received by the device 1 from the antenna 27a through the relay devices 33 and 34.

When it is assumed that phases of the transmission waves from the device 1 and the device 2 do not change in the relay devices 33 and 34, the device 2 can calculate a distance from the key 31 on a basis of the phases calculated in the devices 1 and 2. The device 2 outputs the calculated distance to the control section 36. A distance threshold for permitting authentication of the key 31 is stored in the memory 38. When the distance calculated by the device 2 is within the distance threshold read out from the memory 38, the control section 36 assumes that the key 31 is authenticated and permits unlocking and locking, a start of the engine, and the like. When the distance calculated by the device 2 is larger than the distance threshold read out from the memory 38, the control section 36 does not permit the authentication of the key 31. Therefore, in this case, the control section 36 does not permit unlocking and locking, a start of the engine, and the like.

Note that the relay devices 33 and 34 can change the phases of the transmission waves from the device 1 and the device 2. Even in this case, since initial phases of the devices 1 and 2 are unknown, the relay devices 33 and 34 cannot calculate a phase shift amount necessary for keeping the distance calculated by the device 2 within the distance threshold read out from the memory 38. Therefore, even if the relay devices 33 and 34 are used, possibility that the authentication of the key 31 is permitted is sufficiently small.

As explained above, in the present embodiment, by using the distance measuring system in the first embodiment, it is possible to prevent unlocking and the like of a vehicle from being performed by a relay attack to the smart entry system.

(Transmission Sequence)

FIGS. 24 to 35 are explanatory diagrams showing various sequences adoptable in the respective embodiments.

Figure 24:
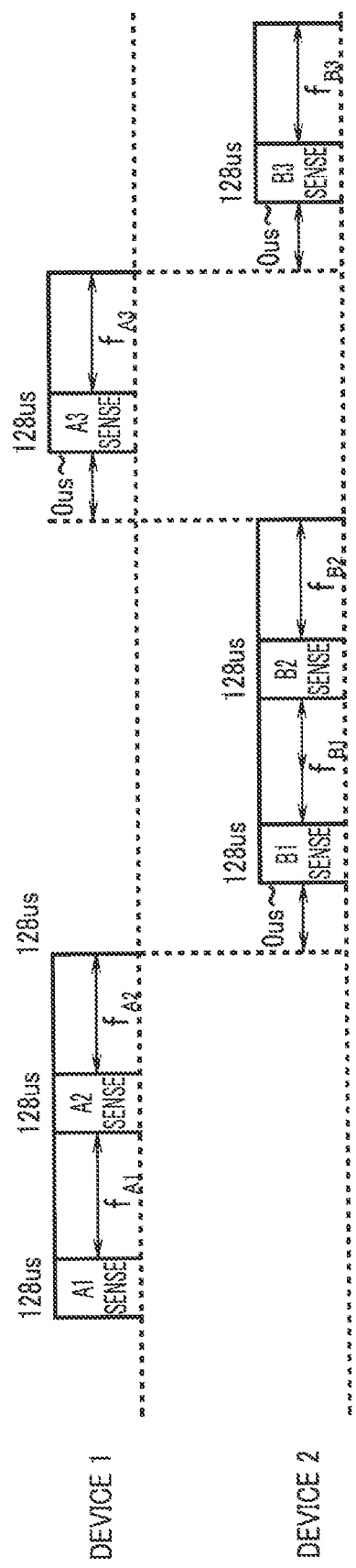
FIG. 24 is an explanatory diagram showing one of various sequences.

FIG. 24 shows a sequence in which the carrier sense is performed, a response is absent, and the repeated alternation is absent. This example of the sequence is an example in which presence or absence of a distance measurement frequency is determined by the carrier sense. When the distance measurement frequency is sensed by the carrier sense, (a) the sequence may be started from the beginning again after a predetermined time (e.g., several milliseconds) or (b) may be started in the carrier sense exception sequence. Note that the transmission wave having the center frequency is a transmission wave for calculating only amplitude ratios with respect to other transmission waves and may be measured at any timing after or before reception of the respective transmission waves.

Figure 25:
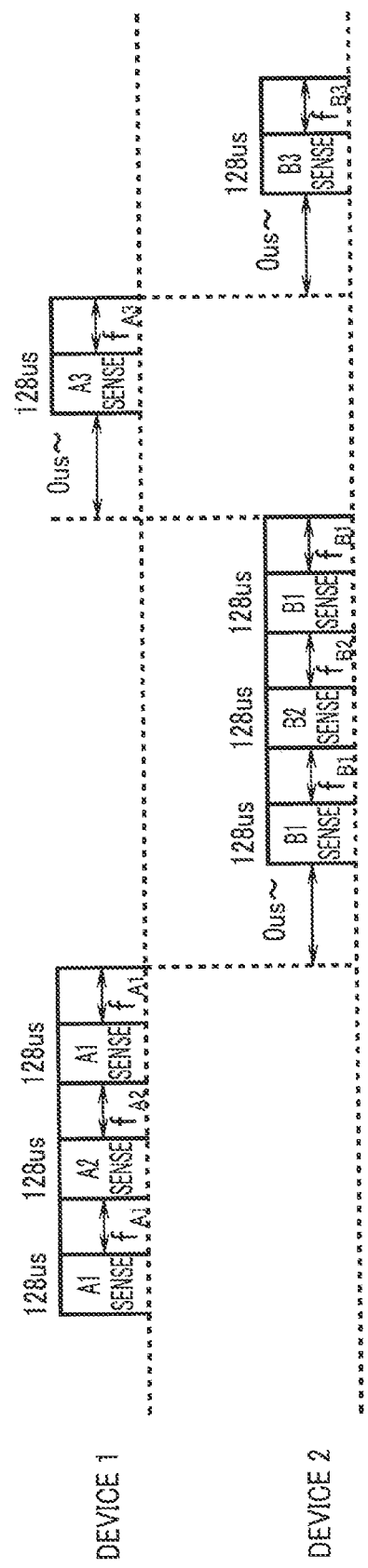
FIG. 25 is an explanatory diagram showing one of the various sequences.

FIG. 25 shows a sequence in which the carrier sense is performed, a response is absent, and the repeated alternation is present. This example of the sequence is also an example in which presence or absence of a distance measurement frequency is determined by the carrier sense. When the distance measurement frequency is sensed by the carrier sense, (a) the sequence may be started from the beginning again after a predetermined time (e.g., several milliseconds) or (b) may be started in the carrier sense exception sequence. Note that the transmission wave having the center frequency is a transmission wave for calculating only amplitude ratios with respect to other transmission waves and may be measured at any timing before or after reception of the respective transmission waves.

Figure 26:
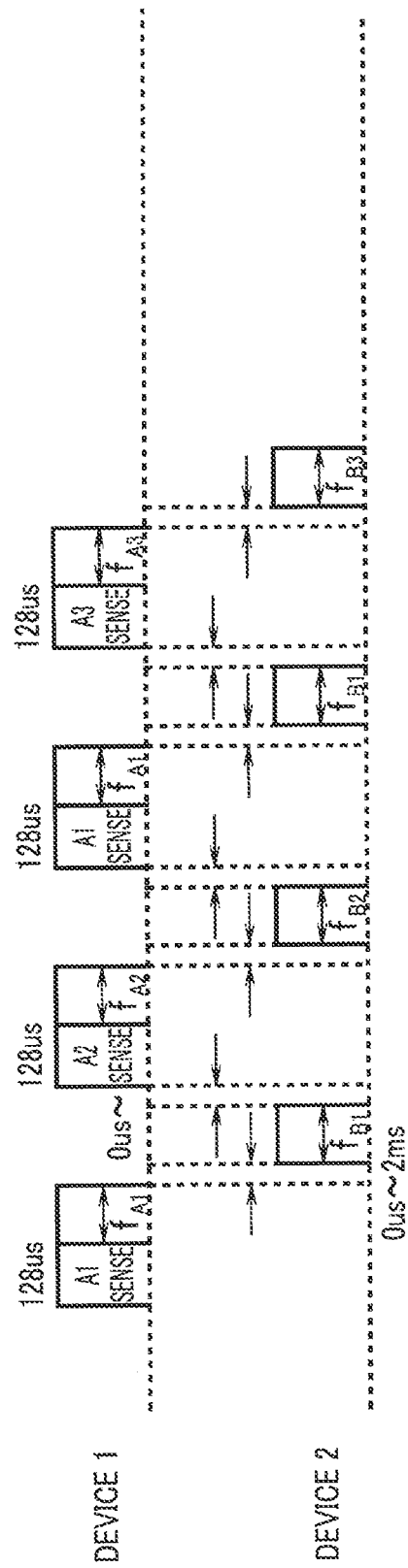
FIG. 26 is an explanatory diagram showing one of the various sequences.

FIG. 26 shows a sequence in which the carrier sense is performed, a response is present, and the repeated alternation is present. This example of the sequence is also an example in which presence or absence of a distance measurement frequency is determined by the carrier sense. When the distance measurement frequency is sensed by the carrier sense, (a) the sequence may be started from the beginning again after a predetermined time (e.g., several milliseconds) or (b) may be started in the carrier sense exception sequence. Note that the transmission wave having the center frequency is a transmission wave for calculating only amplitude ratios with respect to other transmission waves and may be measured at any timing before or after reception of the respective transmission waves.

Figure 27:
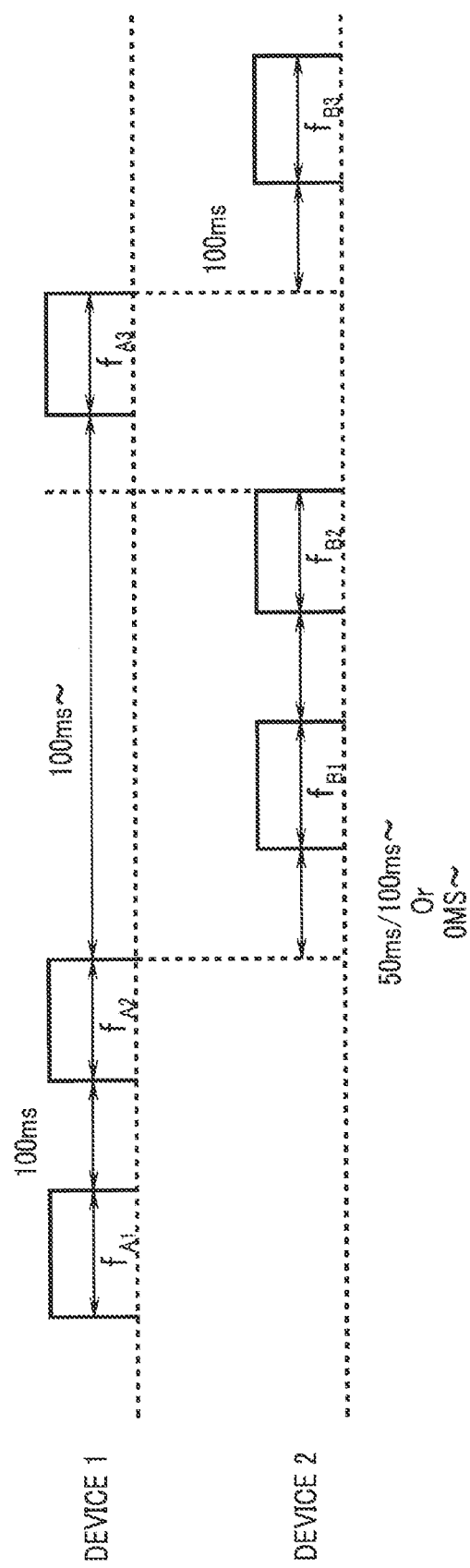
FIG. 27 is an explanatory diagram showing one of the various sequences.

FIG. 27 shows a sequence in which the carrier sense is absent, a response is absent, and the repeated alternation is absent. Note that the transmission wave having the center frequency is a transmission wave for calculating only amplitude ratios with respect to other transmission waves and may be measured at any timing before or after reception of the respective transmission waves.

Figure 28:
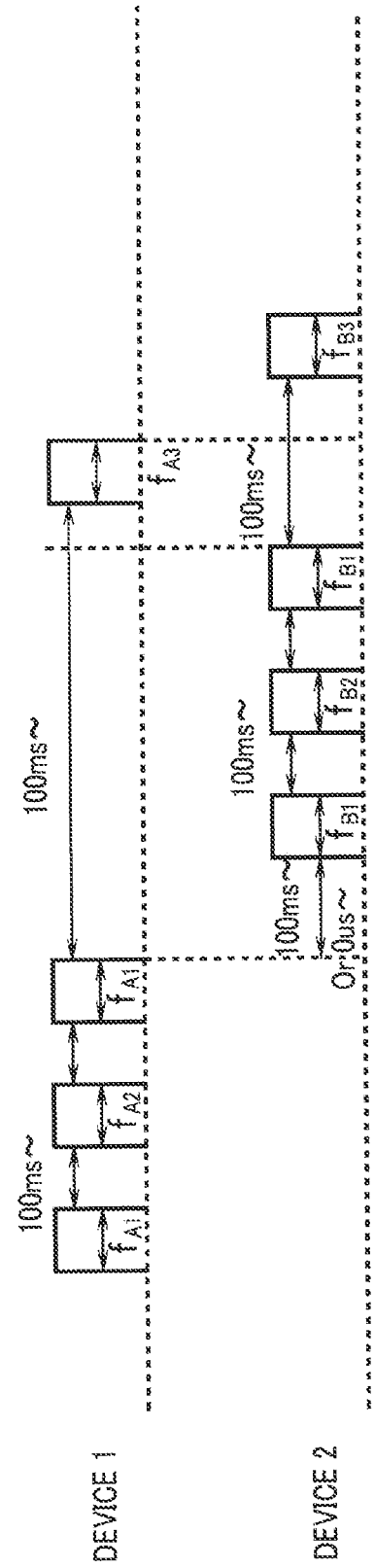
FIG. 28 is an explanatory diagram showing one of the various sequences.

FIG. 28 shows a sequence in which the carrier sense is absent, a response is absent, and the repeated alternation is present. Note that the transmission wave having the center frequency is a transmission wave for calculating only amplitude ratios with respect to other transmission waves and may be measured at any timing before or after reception of the respective transmission waves.

Figure 29:
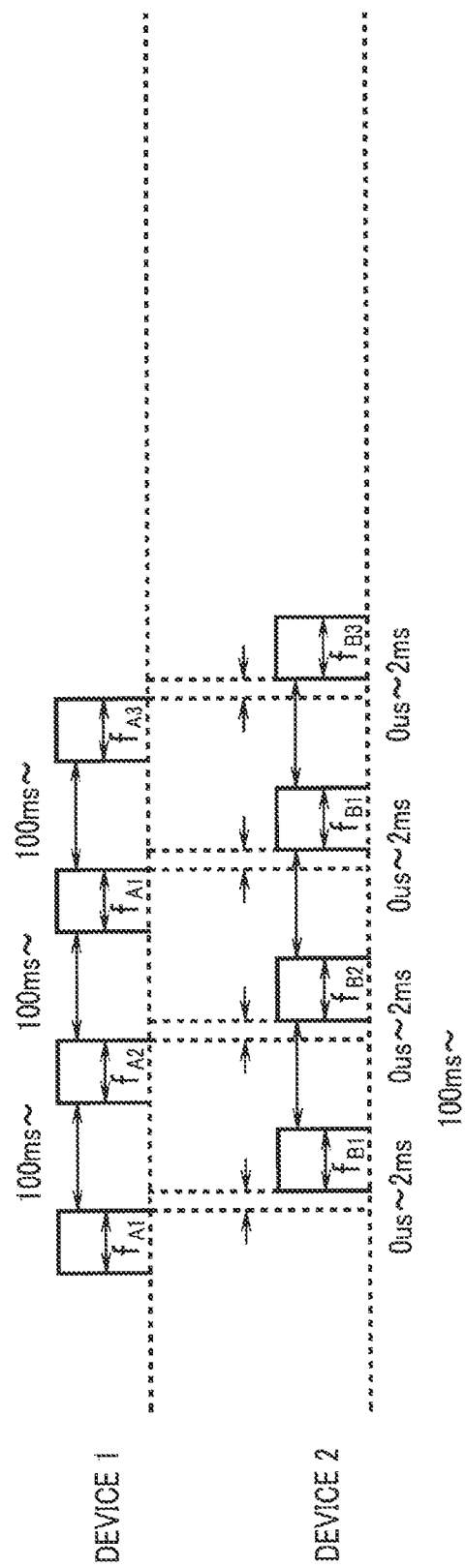
FIG. 29 is an explanatory diagram showing one of the various sequences.

FIG. 29 shows a sequence in which the carrier sense is absent, a response is present, and the repeated alternation is present.

Figure 30:
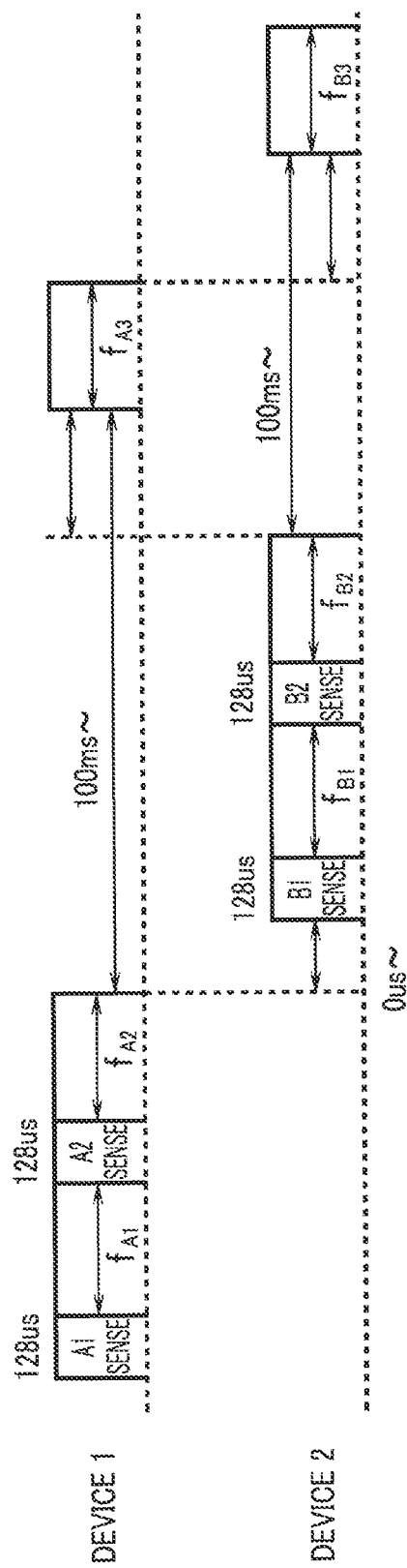
FIG. 30 is an explanatory diagram showing one of the various sequences.

FIG. 30 shows a sequence in which the carrier sense is present in some cases and is absent in other cases, a response is absent, and the repeated alternation is absent. This example of the sequence is also an example in which presence or absence of a distance measurement frequency is determined by the carrier sense. When the distance measurement frequency is sensed by the carrier sense, (a) the sequence may be started from the beginning again after a predetermined time (e.g., several milliseconds) or (b) may be started in the carrier sense exception sequence. Note that the transmission wave having the center frequency is a transmission wave for calculating only amplitude ratios with respect to other transmission waves and may be measured at any timing before or after reception of the respective transmission waves.

Figure 31:
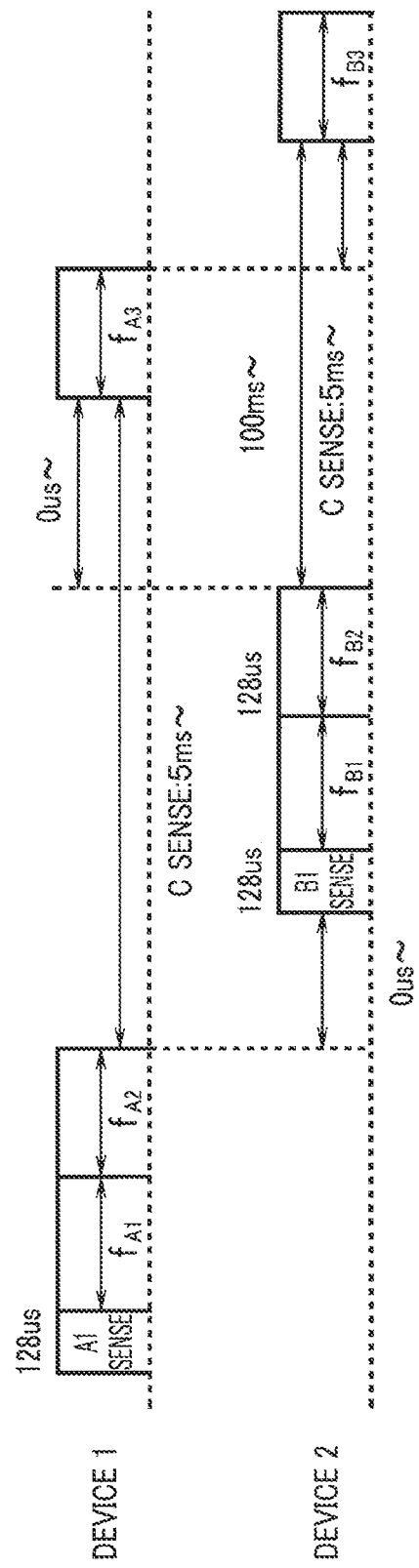
FIG. 31 is an explanatory diagram showing one of the various sequences.

FIG. 31 shows a sequence in which the carrier sense is present in some cases and is absent in other cases, a response is absent, and the repeated alternation is absent. This example of the sequence is also an example in which presence or absence of a distance measurement frequency is determined by the carrier sense. When the distance measurement frequency is sensed by the carrier sense, (a) the sequence may be started from the beginning again after a predetermined time (e.g., several milliseconds) or (b) may be started in the carrier sense exception sequence. Note that the transmission wave having the center frequency is a transmission wave for calculating only amplitude ratios with respect to other transmission waves and may be measured at any timing before or after reception of the respective transmission waves.

Figure 32:
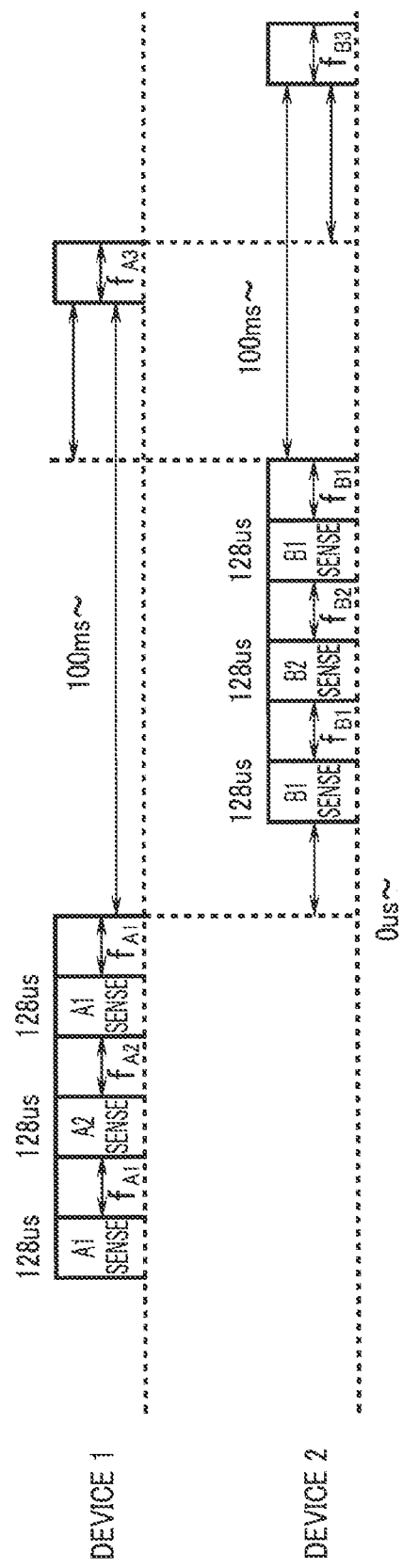
FIG. 32 is an explanatory diagram showing one of the various sequences.

FIG. 32 shows a sequence in which the carrier sense is present in some cases and is absent in other cases, a response is absent, and the repeated alternation is present. This example of the sequence is also an example in which presence or absence of a distance measurement frequency is determined by the carrier sense. When the distance measurement frequency is sensed by the carrier sense, (a) the sequence may be started from the beginning again after a predetermined time (e.g., several milliseconds) or (b) may be started in the carrier sense exception sequence. Note that the transmission wave having the center frequency is a transmission wave for calculating only amplitude ratios with respect to other transmission waves and may be measured at any timing before or after reception of the respective transmission waves.

Figure 33:
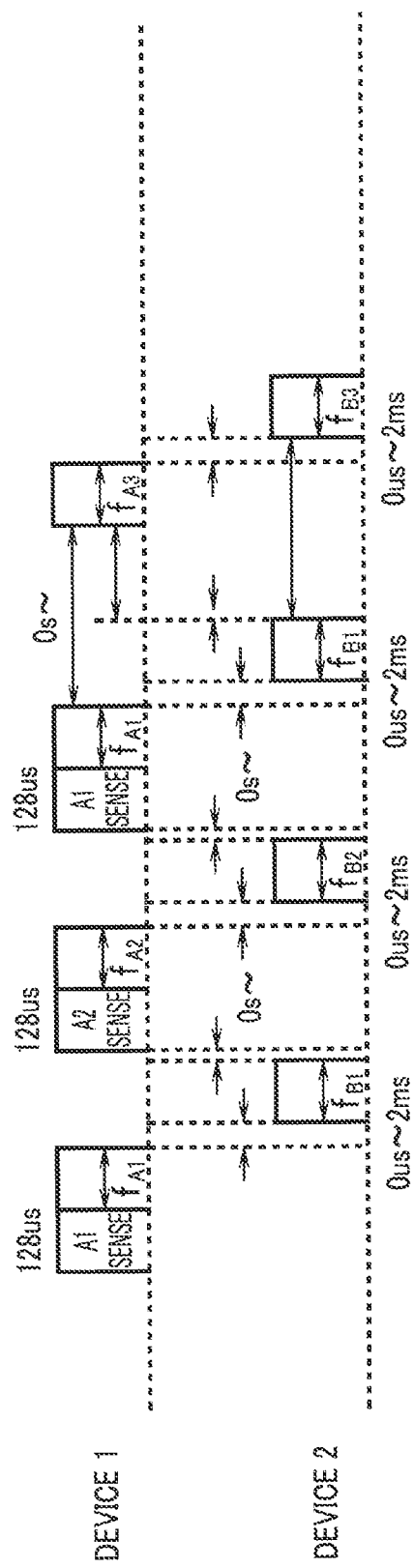
FIG. 33 is an explanatory diagram showing one of the various sequences.

FIG. 33 shows a sequence in which the carrier sense is present in some cases and is absent in other cases, a response is present, and the repeated alternation is present. This example of the sequence is also an example in which presence or absence of a distance measurement frequency is determined by the carrier sense. When the distance measurement frequency is sensed by the carrier sense, (a) the sequence may be started from the beginning again after a predetermined time (e.g., several milliseconds) or (b) may be started in the carrier sense exception sequence. Note that the transmission wave having the center frequency is a transmission wave for calculating only amplitude ratios with respect to other transmission waves and may be measured at any timing before or after reception of the respective transmission waves.

Figure 34:
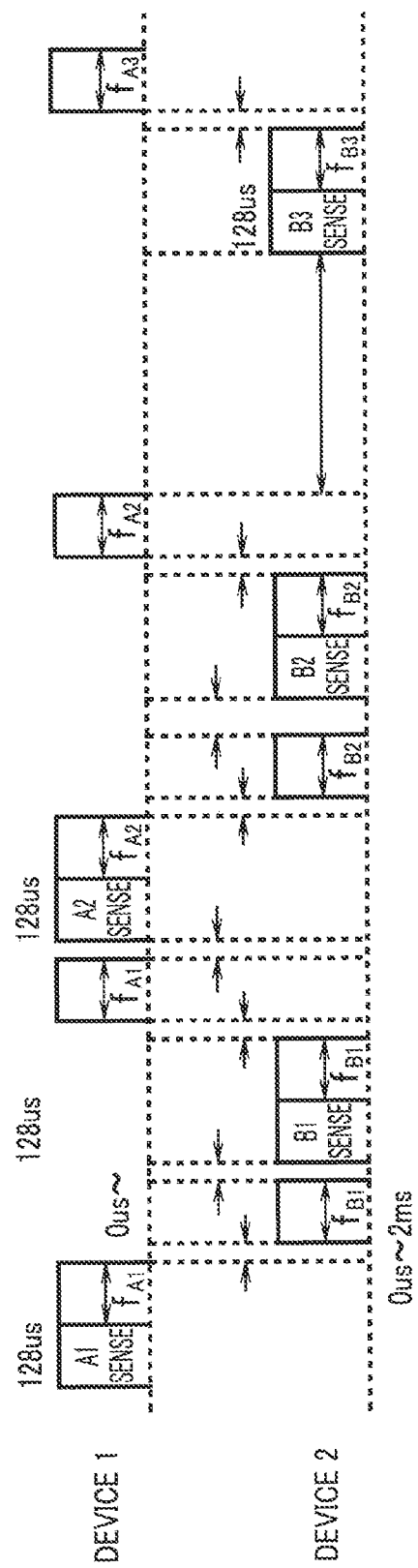
FIG. 34 is an explanatory diagram showing one of the various sequences.

FIG. 34 shows a sequence in which the carrier sense is performed, a response is present, and the repeated alternation is present. This example of the sequence is also an example in which presence or absence of a distance measurement frequency is determined by the carrier sense. When the distance measurement frequency is sensed by the carrier sense, (a) the sequence may be started from the beginning again after a predetermined time (e.g., several milliseconds) or (b) may be started in the carrier sense exception sequence. Note that the transmission wave having the center frequency is a transmission wave for calculating only amplitude ratios with respect to other transmission waves and may be measured at any timing before or after reception of the respective transmission waves.

Figure 35:
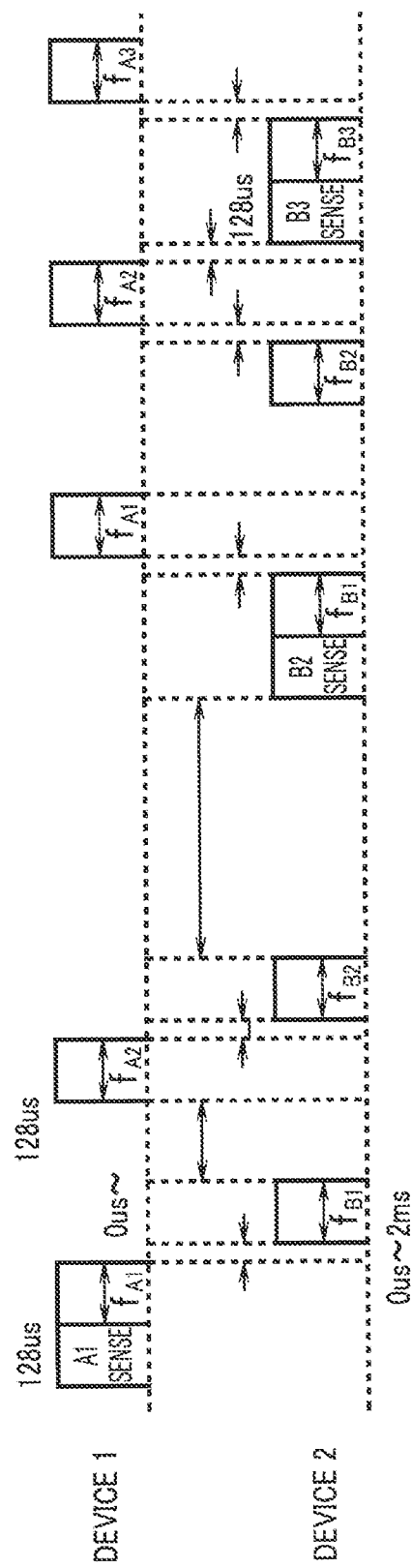
FIG. 35 is an explanatory diagram showing one of the various sequences.

FIG. 35 shows a sequence in which the carrier sense is present in some cases and is absent in other cases, a response is present, and the repeated alternation is present. This example of the sequence is also an example in which presence or absence of a distance measurement frequency is determined by the carrier sense. When the distance measurement frequency is sensed by the carrier sense, (a) the sequence may be started from the beginning again after a predetermined time (e.g., several milliseconds) or (b) may be started in the carrier sense exception sequence. Note that the transmission wave having the center frequency is a transmission wave for calculating only amplitude ratios with respect to other transmission waves and may be measured at any timing before or after reception of the respective transmission waves.

(Modification Concerning the Multipath)

Figure 36:
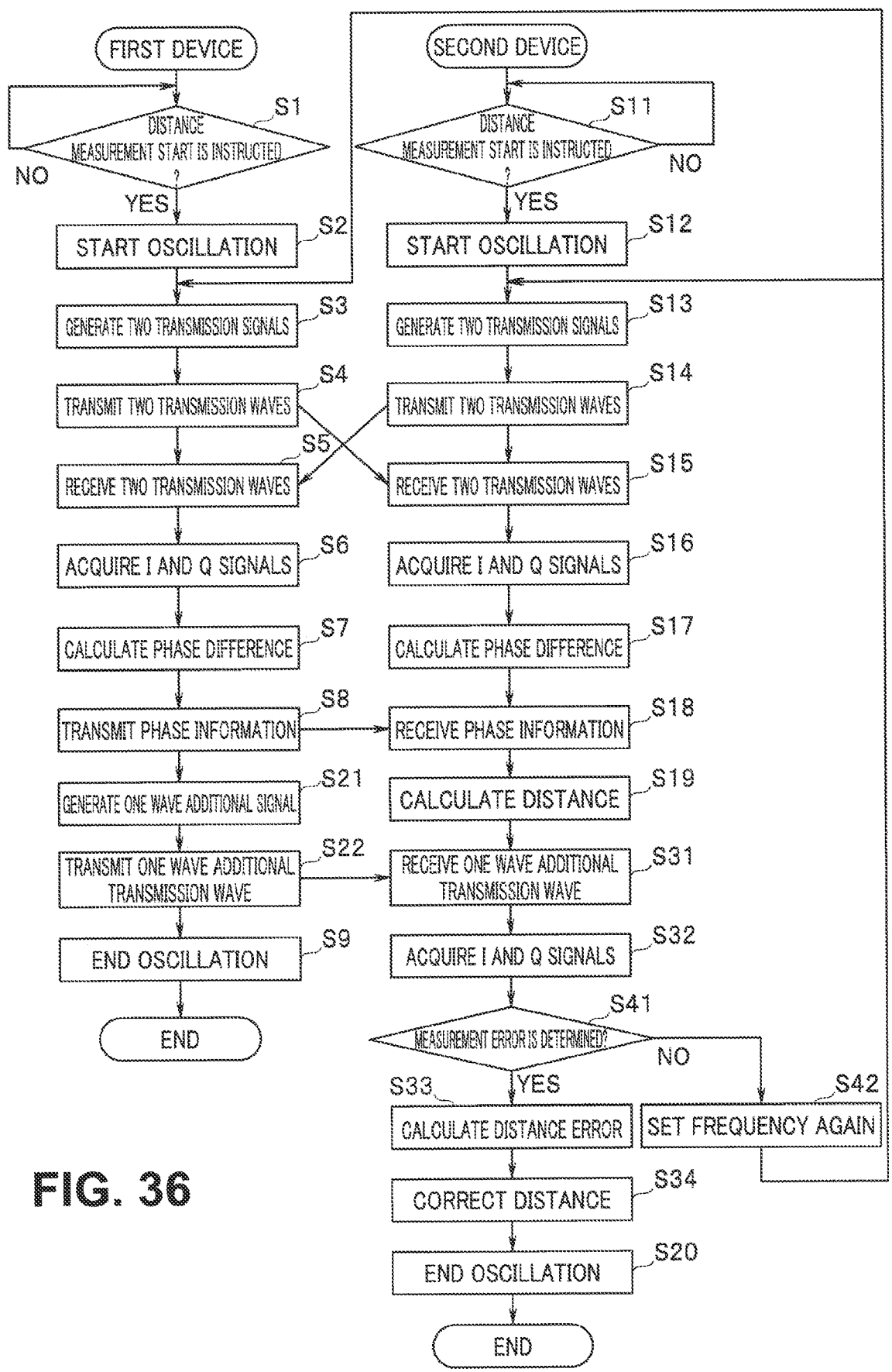
FIG. 36 is a flowchart for explaining an operation in a modification in which a multipath is taken into account.

FIG. 36 is a flowchart for explaining an operation in a modification in which a multipath is taken into account and corresponds to FIG. 21. In FIG. 36, the same procedures as the procedures in FIG. 21 are denoted by the same signs and explanation of the procedures is omitted.

As shown in FIG. 17, in the phase detection error ($\phi_L-\phi_H$) due to the presence of the delayed wave, a maximal value occurs at a predetermined interval on a delay time difference axis. In other words, a value of the phase detection error $\phi_L-\phi_H$ due to the presence of the delayed wave is small on the delay time difference axis on which a maximum value does not occur. As indicated by Equation (73) described above for obtaining the graph of FIG. 17, it is possible to reduce the value of the phase detection error $\phi_L-\phi_H$ by changing the angular frequencies $\omega_{C1}$ and $\omega_{B1}$. Note that, when a frequency difference is increased or a frequency is set again to shift the center frequency, from Equations (80) and (81), the waveform shown in FIG. 18 is shifted to the horizontal axis. Therefore, it is shown that it is possible to avoid a worst condition of phase deterioration.

Therefore, in the modification, it is determined whether phase fluctuation due to the delayed wave is large. When it is determined that the phase fluctuation is large, control for changing a carrier frequency is performed. When it is determined that the phase fluctuation is small, a distance error is calculated to correct a distance.

For example, in the modification, it may be determined whether the phase fluctuation is large according to $\Delta A_{H0}$ and $\Delta A_{L0}$ calculated by Equations (80) and (81) described above. As it is evident from FIG. 18, both of $\Delta A_{H0}$ and $\Delta A_{L0}$ are positive when phase fluctuation due to the path of the delay difference $\tau_1$ is large. On the other hand, when both of $\Delta A_{H0}$ and $\Delta A_{L0}$ are negative, the phase fluctuation is also large as it is evident from comparison of Equations (73) and (80).

Therefore, in the modification, the amplitude ratios $\Delta A_{H0}$ and $\Delta A_{L0}$ are observed. When both of $\Delta A_{H0}$ and $\Delta A_{L0}$ are positive or negative, it is determined that the phase error due to the multipath is relatively large. The frequency difference is increased, the center frequency is shifted, or a frequency is set again to perform distance measurement. Consequently, it is possible to reduce distance accuracy deterioration.

Note that, when an addition result of $\Delta A_{H0}+\Delta A_{L0}$ is smaller than a first predetermined threshold (TH1) or larger than a second predetermined threshold (TH2), it is also effective to determine that the phase error due to the multipath is large and perform the same operation.

FIG. 36 shows an example in which the second device calculates a distance. When acquiring I and Q signals in step S32, the control section 21 determines a distance error in the next step S41. For example, the control section 21 determines whether $TH1 \leq \Delta A_{H0}+\Delta A_{L0} \leq TH2$ holds. When $TH1 \leq \Delta A_{H0}+\Delta A_{L0} \leq TH2$ holds, the control section 21 determines that an error of a distance is relatively small, shifts the processing to step S33, and calculates a distance error.

On the other hand, when $\Delta A_{H0}+\Delta A_{L0}$ is smaller than the threshold TH1 or larger than the threshold TH2 in step S41, the control section 21 determines that the phase error due to the multipath is large and shifts the processing to step S42. In step S42, the control section 21 sets a carrier frequency again and returns the processing to steps S3 and S13. When the same operation is repeated thereafter and it is determined that the distance error is relatively small, the distance is corrected.

Note that, in the flow shown in FIG. 36, as in the flow shown in FIG. 21, a phase difference does not always need to be calculated in steps S7 and S17. A phase difference may be calculated during the distance calculation in step S19.

Note that, as indicated by Equation (82) described above, the correction in step S34 in FIGS. 21 and 36 is correction for subtracting $(\Delta A_{H0}+\Delta A_{L0}|$in dB$)/4$ from the detected phase difference. However, to increase accuracy of the correction, it is also possible to perform the subtraction, for example, after intentionally distorting $(\Delta A_{H0}+\Delta A_{L0}|$in dB$)$. An example is sin $\{(\Delta A_{H0}+\Delta A_{L0}|$in dB$)/4\}$. Although not shown in the figure, in this case, amplitude is compressed and phase accuracy is improved when the delay $\tau_1$ is large according to a sine function.

(Modification)

Figure 37:
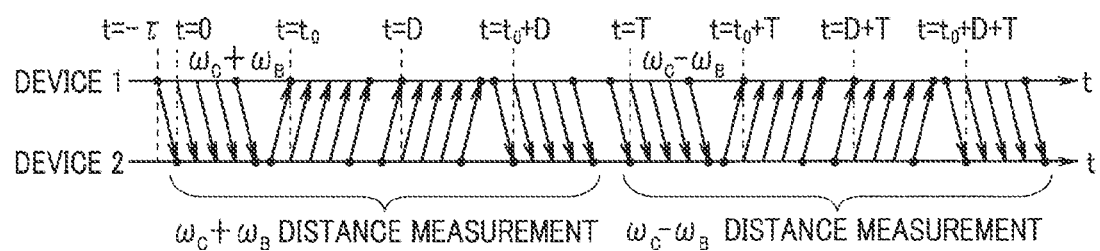
FIG. 37 is an explanatory diagram showing a relation between a transmission sequence and a period in which an initial phase is maintained.
Figure 38:
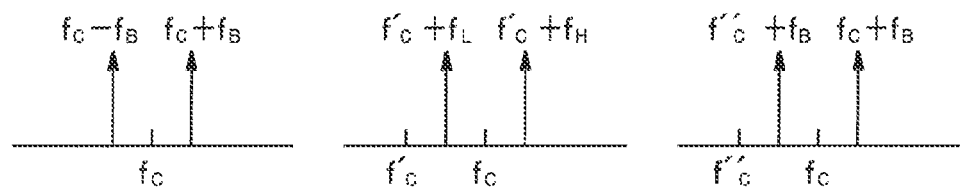
FIG. 38 is an explanatory diagram showing a carrier frequency used for distance measurement.
Figure 39:
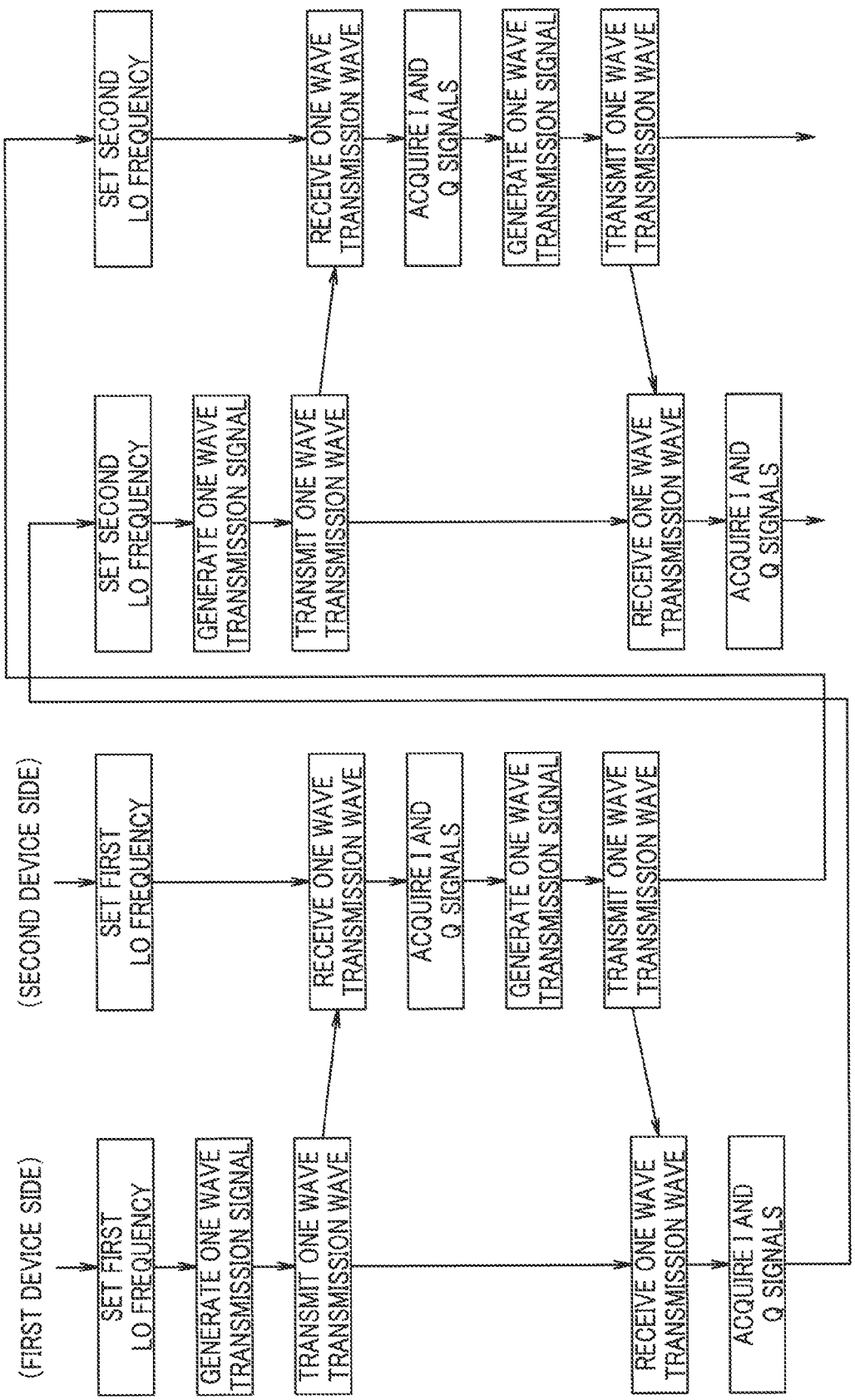
FIG. 39 is a flowchart for explaining a modification.

FIGS. 37 to 39 show a modification. In the modification, a period in which an initial phase should be fixed is explained. FIG. 37 is an explanatory diagram showing a relation between a transmission sequence and a period in which an initial phase is maintained. FIG. 38 is an explanatory diagram showing a carrier frequency used for distance measurement. FIG. 39 is a flowchart for explaining the modification.

In the first embodiment, the simultaneous transmission and the simultaneous reception of the respective two frequencies from the devices 1 and 2 are assumed. In a period of the transmission and reception, the oscillators 13 and 23 are caused to continue oscillation such that the initial phase does not change. On the other hand, in the second embodiment, between the devices 1 and 2, it is specified that only one wave can be transmitted and received at the same time, transmission and reception of at least four waves necessary for distance measurement is carried out in time-series processing, and carrier signals from the devices 1 and 2 are repeatedly alternated to enable accurate distance measurement even when the time-series transmission and reception is performed.

For example, as explained above, in the example shown in FIG. 15, the transmission and reception of the transmission wave having the angular frequency $\omega_{C1}+\omega_{B1}$ from the device 1, the two times of transmission and reception of the transmission wave having the angular frequency $\omega_{C2}+\omega_{B2}$ from the device 2, and the transmission and reception of the transmission wave having the angular frequency $\omega_{C1}+\omega_{B1}$ from the device 1 are performed.

Further, the transmission and reception of the transmission wave having the angular frequency $\omega_{C1}-\omega_{B1}$ from the device 1, the two times of transmission and reception of the transmission wave having the angular frequency $\omega_{C2}-\omega_{B2}$ from the device 2, and the transmission and reception of the transmission wave having the angular frequency $\omega_{C1}-\omega_{B1}$ from the device 1 are performed.

An addition result of phases obtained in the devices 1 and 2 according to first transmission and reception of four waves in FIG. 15 is shown in a former half portion (first to fourth terms) of Equation (139) described above. The addition result of the first to fourth terms is $2(\theta_{\tau H1}+\theta_{\tau H2})$ as shown in Equation (132) described above. As shown in Equations (20) and (30) described above, the addition result does not include a term of an initial phase. That is, information concerning the initial phase is not included in an operation result of phases obtained by the first transmission and reception of the four waves in FIG. 15. Therefore, in an operation of the first to fourth terms of Equation (139) described above, a correct result is obtained if the initial phase is not changed only in the transmission and reception period of the four waves.

Similarly, an addition result of phases obtained in the devices 1 and 2 by last transmission and reception of fourth waves in FIG. 15 is shown in a latter half portion (fifth to eighth terms) of Equation (139) described above. The addition result of the fifth to eighth terms is $2(\theta_{\tau L1}+\theta_{\tau L2})$ as shown in Equation (138) described above. As shown in Equations (40) and (50) described above, the addition result does not include a term of an initial phase. That is, information concerning the initial phase is not included in an operation result of phases obtained by last transmission and reception of the four waves in FIG. 15. Therefore, in an operation of the fifth to eighth terms of Equation (139) described above, a correct result is obtained if the initial phase is not changed only in the transmission and reception period of the four waves.

FIG. 37 shows this state and indicates that an initial phase is maintained fixed in a distance measurement period in which the angular frequencies $\omega_{C1}+\omega_{B1}$ and $\omega_{C2}+\omega_{B2}$ are used and an initial phase is maintained fixed in a distance measurement period in which the angular frequencies $\omega_{C1}-\omega_{B1}$ and $\omega_{C2}-\omega_{B2}$ are used.

That is, for example, when the sequence of FIG. 15 is adopted, it is sufficient to cause the oscillators 13 and 23 to continue oscillation such that the initial phase does not change in a period of the first transmission and reception of the four waves and cause the oscillators 13 and 23 to continue oscillation such that the initial phase does not change in a period of last transmission and reception of the four waves. Even if the oscillation of the oscillators 13 and 23 stops and the initial phase changes until transmission and reception of a fifth wave from transmission and reception of a fourth wave, an accurate distance can be calculated on a basis of Equation (139) described above.

Incidentally, in the respective embodiments, the example is explained in which the two carrier signals transmitted by the devices 1 and 2 has a frequency of a sum of or a difference between, for example, the relatively high angular frequencies $\omega_{C1}$ and $\omega_{C2}$ and, for example, the relatively low angular frequencies $\omega_{B1}$ and $\omega_{B2}$. Note that the angular frequencies $\omega_{C1}$ and $\omega_{C2}$ are set to substantially the same frequency and the angular frequencies $\omega_{B1}$ and $\omega_{B2}$ are set to substantially the same frequency.

(Concerning Two Carrier Signals)

However, in the distance measurement in the respective embodiments, as explained below, the devices 1 and 2 only have to transmit two carrier signals respectively having predetermined frequency differences.

An angular frequency $\omega_C+\omega_B$ and an angular frequency $\omega_C-\omega_B$ can be modified as described below.

$$\omega_C+\omega_B=(\omega_C-\Delta\omega_C)+(\Delta\omega_C+\omega_B)=\omega'_C+\omega_H \quad (201)$$

$$\omega_C-\omega_B=(\omega_C-\Delta\omega_C)+(\Delta\omega_C-\omega_B)=\omega'_C+\omega_L \quad (202)$$

When transmission waves having the angular frequency we and the angular frequency $\omega_B$ are represented as $f_C$ and $f_B$ on a frequency axis, transmission waves having the angular frequency $\omega_C+\omega_B$ and the angular frequency $\omega_C-\omega_B$ are as shown on a left side of FIG. 38.

Equations (201) and (202) described above indicate that a representation method is changed without changing a frequency. The transmission wave having the angular frequency $\omega_C+\omega_B$ is obtained by a sum of transmission waves having an angular frequency $\omega'_C$ and an angular frequency $\omega_H$. The transmission wave having the angular frequency $\omega_C-\omega_B$ is obtained by a sum of transmission waves having the angular frequency $\omega'_C$ and an angular frequency $\omega_L$.

The center in FIG. 38 shows transmission waves based on this representation. The transmission waves having the angular frequencies $\omega'_C$, $\omega_H$, and $\omega_L$ are respectively represented as $f'_C$, $f_H$, and $f_L$ on the frequency axis. A transmission wave having a frequency $f_C-f_B$ and a transmission wave having a frequency $f_C+f_B$ on the left side of FIG. 38 respective indicates that the transmission waves can be represented as a transmission wave having the same frequency $f_C+f_L$ and a transmission wave having the same frequency $f'_C+f_H$.

That is, Equations (201) and (202) described above indicate that two carriers transmitted by the devices 1 and 2 do not need to be obtained by a sun of and a difference between two frequencies and the devices 1 and 2 only have to generate two carriers having a predetermined frequency difference and transmit the carriers.

As an example in which the transmission waves having the angular frequency $\omega_C+\omega_B$ and the angular frequency $\omega_C-\omega_B$ shown on the left side of FIG. 38 are obtained, for example, the oscillators 13 and 23 shown in FIG. 1 only have to generate a local signal having the angular frequency $\omega_C$ as a relatively high local frequency (hereinafter referred to as RF-LO frequency) and a local signal having the angular frequency $\omega_B$ as a relatively low local frequency (hereinafter referred to as IF-LO frequency) and the transmitting section 14 and 24 only have to generate signals having a sum of or a difference between the local frequencies as transmission signals.

On the other hand, the transmission waves in the center of FIG. 38 are obtained by generating a local signal having the angular frequency $\omega'_C$ as the RF-LO frequency and generating two local signals having the angular frequencies $\omega_L$ and $\omega_H$ as the IF-LO frequency and generating, in the transmitting sections 14 and 24, signals having a sum of these local frequencies as transmission signals. That is, the transmission waves in the center of FIG. 38 are obtained by fixing the RF-LO frequency and changing the IF-LO frequency.

The angular frequency $\omega_C-\omega_B$ can be modified as shown below.

$$\omega_C-\omega_B=(\omega_C-2\omega_B)+(2\omega_B-\omega_B)=\omega''_C-\omega_B \qquad (203)$$

A right side of FIG. 38 shows transmission waves based on the representation of Equation (203) and indicates that, when a transmission wave having an angular frequency of $\omega''_C$ is represented as $f''_C$ on the frequency axis, the transmission wave having the frequency $f_C-f_B$ on the left side of FIG. 38 can be represented as a transmission wave having the same frequency $f''_C+f_B$.

For example, the transmission waves on the right side of FIG. 38 are obtained by generating a local signal having the angular frequency $\omega'_C$ and a local signal having the angular frequencies $\omega''_C$ as the RF-LO frequency and generating a local signal having the angular frequency $\omega_B$ as the IF-LO frequency and generating, in the transmitting sections 14 and 24, signals having a sum of these local frequencies as transmission signals. That is, the transmission waves on the right side of FIG. 38 are obtained by fixing the IF-LO frequency and changing the RF-LO frequency.

(Change of the Carrier Frequencies)

In this way, the devices 1 and 2 only have to transmit the two carrier signals respectively having the predetermined frequency difference in the distance measurement. Moreover, when transmission and reception of a carrier having a higher frequency of the two carriers is alternately performed and transmission and reception of a carrier having a low frequency is subsequently alternately performed as in the sequence shown in FIG. 15, initial phases may be different in the transmission and reception of the carrier having the high frequency and the transmission and reception of the carrier having the low frequency.

Further, only the carrier having the high frequency is used for an operation of Equation (132) described above obtained by decomposing Equation (139) described above and only the carrier having the low frequency is used for an operation of Equation (138) described above. That is, the operation of Equation (132) described above and the operation of Equation (138) described above only have to be independently performed. The local frequencies may be changed between a transmission and reception period of the carrier having the high frequency and a transmission and reception period of the carrier having the low frequency.

When the change in the initial phase and the change in the carrier angular frequency are allowed, a flow shown in FIG. 39 can be adopted instead of the flow shown in FIG. 11A.

In the flow shown in FIG. 39, the device 1 sets a first local (LO) frequency before one wave transmission signal generation and the device 2 sets a first local (LO) frequency before reception of one wave transmission wave from the device 1. The device 1 generates a carrier having a high frequency, for example, as one wave transmission signal using the local signal having the first LO frequency. The device 2 receives the one wave transmission wave using the carrier having the high frequency and acquires I and Q signals.

After acquisition of the I and Q signals based on the transmission signal having the high frequency from the device 2 and before generation of the next one wave transmission signal, the device 1 sets a second local (LO) frequency. Similarly, after the transmission of the one wave transmission wave to the device 1 and before reception of the next one wave transmission wave, the device 2 sets a second local (LO) frequency. The device 1 generates a carrier having a low frequency, for example, as one wave transmission signal using the local signal having the second LO frequency. The device 2 receives the transmission wave of the device 1 using the carrier having the low frequency and acquires I and Q signals.

(Configuration Example of the Oscillators and the Transceivers)

In this way, the devices 1 and 2 only have to be capable of generating and transmitting the two carrier signals having the predetermined frequency difference. Circuits having various configurations can be adopted as the oscillators 13 and 23, the transmitting sections 14 and 24, and the receiving sections 15 and 25 in FIG. 1.

Figure 40A:
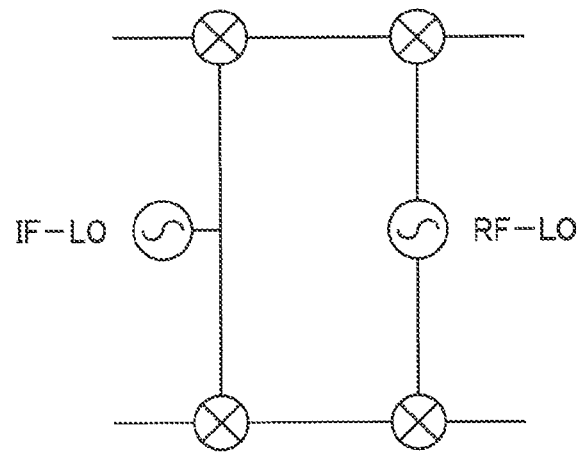
FIG. 40A is an explanatory diagram showing, in a simplified manner, an example of the configurations of an oscillator 13, the transmitting section 14, and the receiving section 15 of a device 1.
Figure 40B:
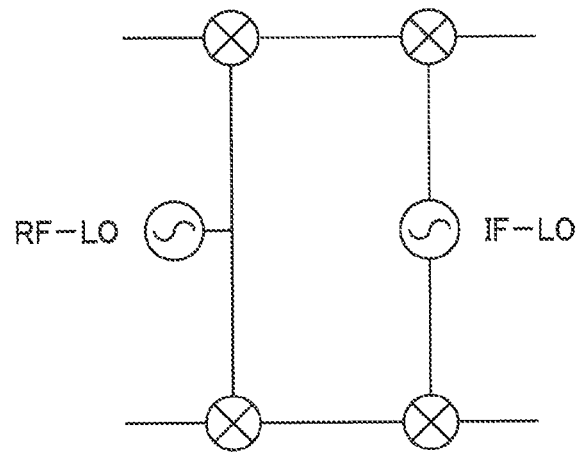
FIG. 40B is an explanatory diagram showing, in a simplified manner, an example of the configurations of an oscillator 23, the transmitting section 24, and the receiving section 25 of a device 2.

FIG. 40A is an explanatory diagram showing, in a simplified manner, an example of the configurations of the oscillator 13, the transmitting section 14, and the receiving section 15 of the device 1. FIG. 40B is an explanatory diagram showing, in a simplified manner, an example of the configurations of the oscillator 23, the transmitting section 24, and the receiving section 25 of the device 2.

As shown in FIGS. 40A and 40B, the device 1 and the device 2 include an oscillator that generates an IF-LO frequency and an oscillator that generates an RF-LO frequency. Oscillation frequencies of the oscillators are, for example, fixed. Two carrier signals having a frequency difference can be generated by adding the IF-LO frequency to or subtracting the IF-LO frequency from the RF-LO frequency.

Figure 41A:
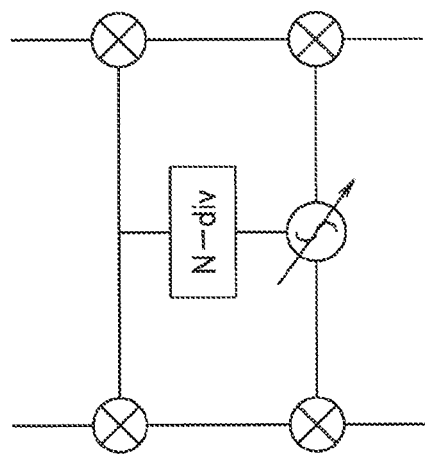
FIG. 41A is an explanatory diagram showing, in a simplified manner, an example of the configurations of the oscillator 13, the transmitting section 14, and the receiving section 15 of the device 1.
Figure 41B:
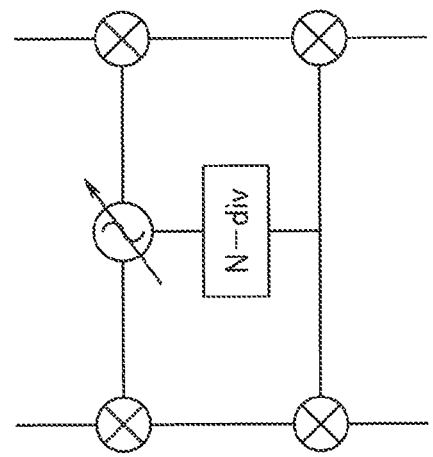
FIG. 41B is an explanatory diagram showing, in a simplified manner, an example of the configurations of the oscillator 23, the transmitting section 24, and the receiving section 25 of the device 2.

FIG. 41A is an explanatory diagram showing, in a simplified manner, an example of the configurations of the oscillator 13, the transmitting section 14, and the receiving section 15 of the device 1. FIG. 41B is an explanatory diagram showing, in a simplified manner, an example of the configurations of the oscillator 23, the transmitting section 24, and the receiving section 25 of the device 2.

The examples shown in FIGS. 41A and 41B are examples in which two carrier signals having a frequency difference are generated by an oscillator having a variable frequency and a frequency divider (N-div).

Figure 42:
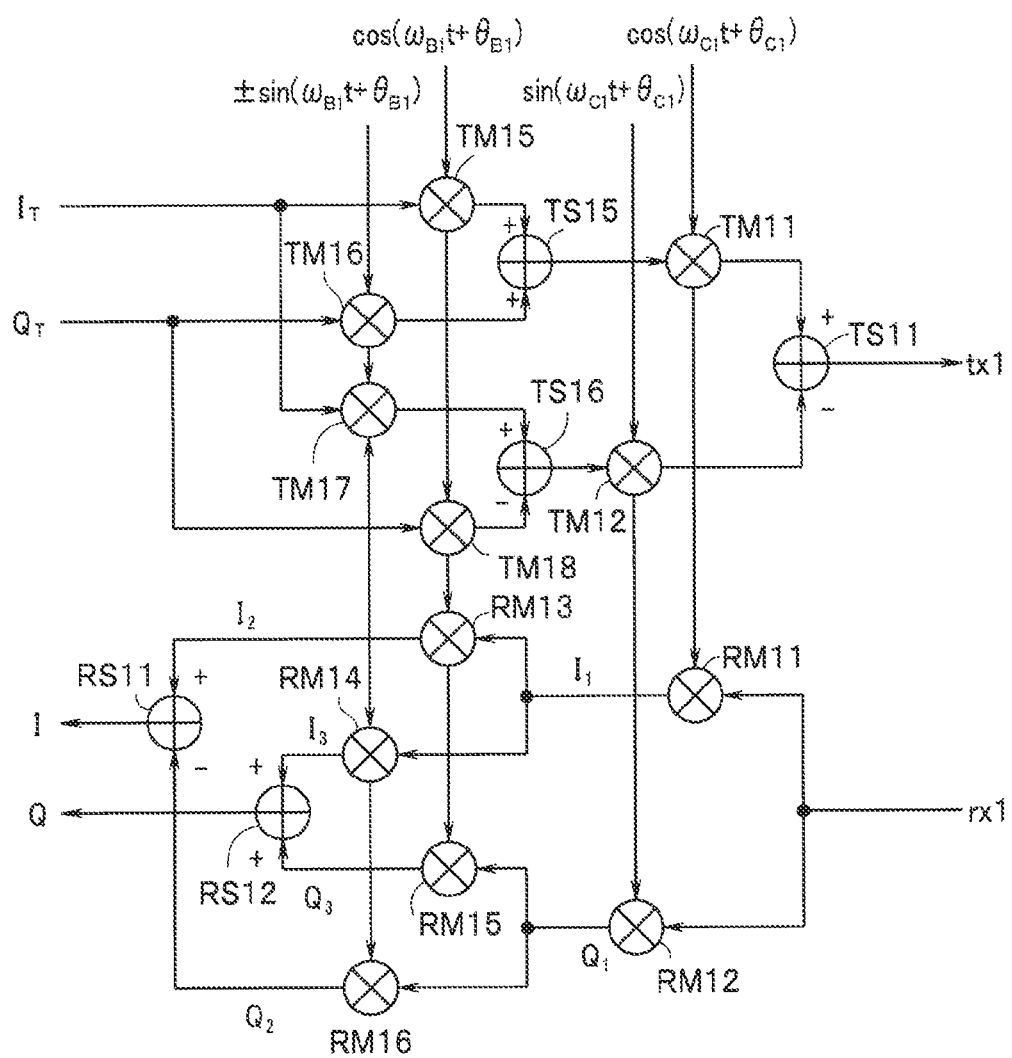
FIG. 42 is a circuit diagram more specifically showing an example of a circuit that generates signals given to multipliers TM11 and TM12 in FIG. 4.
Figure 43:
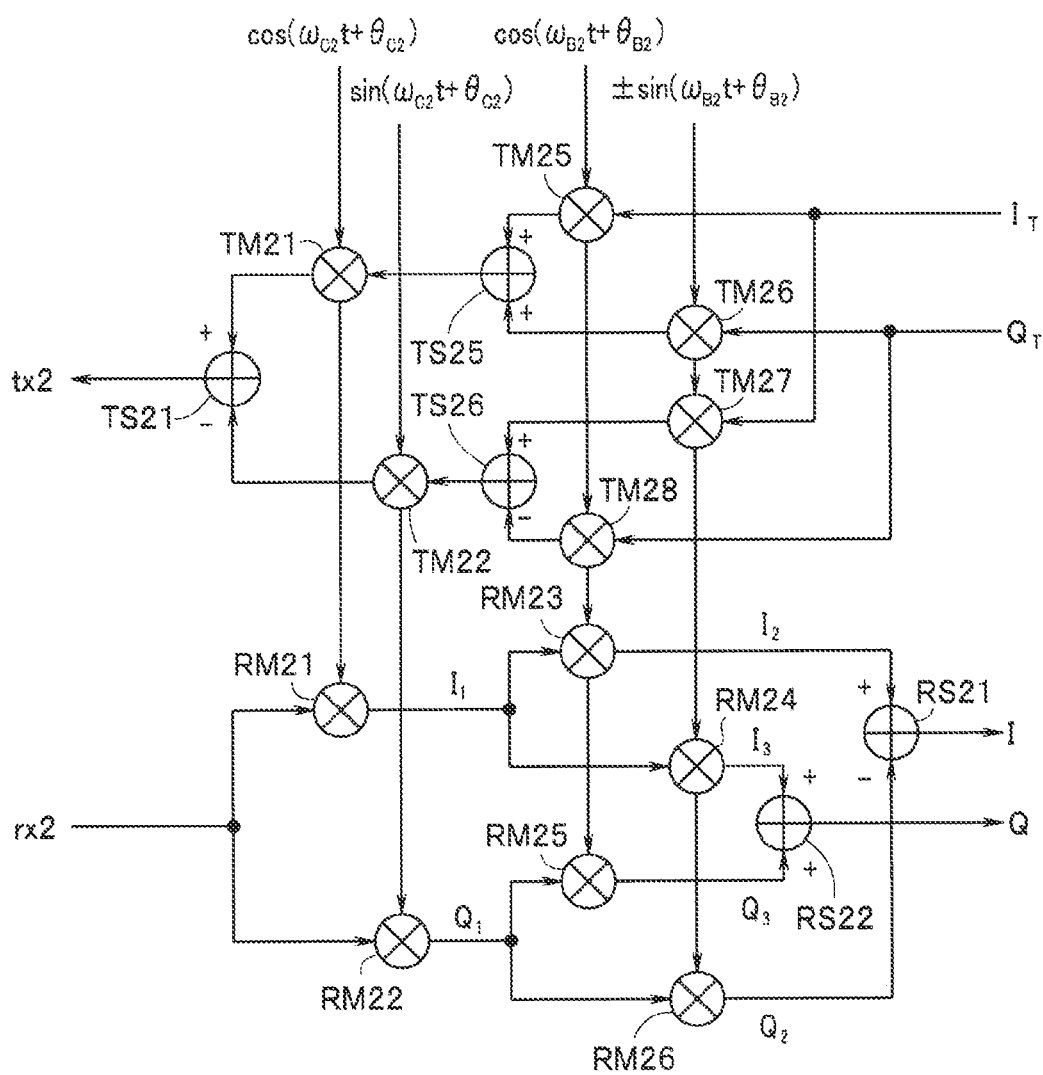
FIG. 43 is a circuit diagram more specifically showing an example of a circuit that generates signals given to multipliers TM21 and TM22 in FIG. 5.

FIG. 42 is a circuit diagram more specifically showing an example of a circuit that generates signals given to the multipliers TM11 and TM12 in FIG. 4. FIG. 43 is a circuit diagram more specifically showing an example of a circuit that generates signals given to the multipliers TM21 and TM22 in FIG. 5.

In FIG. 42, a multiplier TM15 gives, to an adder TS15, a multiplication result of an $I_T$ signal and a local signal $\cos(\omega_{B1}t+\theta_{B1})$ from the oscillator 13. A multiplier TM16 gives, to the adder TS15, a multiplication result of a $Q_T$ signal and a local signal $\pm\sin(\omega_{B1}t+\theta_{B1})$ from the oscillator 13. The adder TS15 adds up the two inputs and gives an addition result to the multiplier TM11.

A multiplier TM17 gives, to an adder TS16, a multiplication result of the $I_T$ signal and the local signal $\pm\sin(\omega_{B1}t+\theta_{B1})$ from the oscillator 13. A multiplier TM18 gives, to the adder TS16, a multiplication result of the $Q_T$ signal and the local signal $\cos(\omega_{B1}t+\theta_{B1})$ from the oscillator 13. The adder TS16 subtracts the output of a multiplier TM18 from the output of the multiplier TM17 and gives a subtraction result to the multiplier TM12. The other components are the same as the components shown in FIG. 4.

In FIG. 43, a multiplier TM25 gives, to an adder TS25, a multiplication result of the $I_T$ signal and a local signal $\cos(\omega_{B2}t+\theta_{B2})$ from the oscillator 23. A multiplier TM26 gives, to the adder TS25, a multiplication result of the $Q_T$ signal and a local signal $\pm\sin(\omega_{B2}t+\theta_{B2})$ from the oscillator 23. The adder TS25 adds up the two inputs and gives an addition result to the multiplier TM21.

A multiplier TM27 gives, to an adder TS26, a multiplication result of the $I_T$ signal and the local signal $\pm\sin(\omega_{B2}t+\theta_{B2})$ from the oscillator 23. A multiplier TM28 gives, to the adder TS26, a multiplication result of the $Q_T$ signal and the local signal $\cos(\omega_{B2}t+\theta_{B2})$ from the oscillator 23. The adder TS26 subtracts the output of the multiplier TM28 from the output of the multiplier TM27 and gives a subtraction result to the multiplier TM22. The other components are the same as the components shown in FIG. 5.

Figure 44:
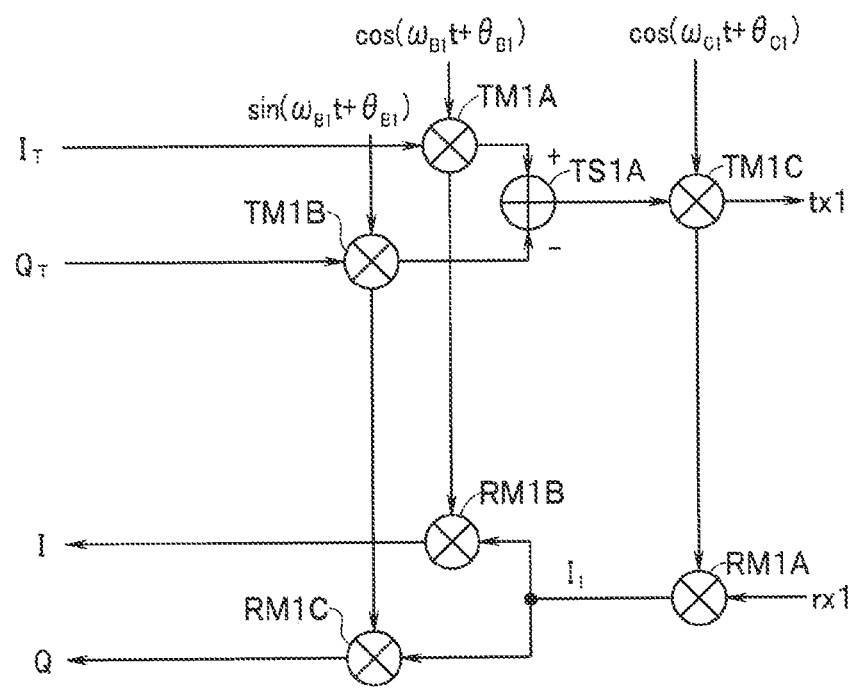
FIG. 44 is a circuit diagram showing an example of specific configurations of the transmitting section 14 and the receiving section 15 shown in FIG. 1.
Figure 45:
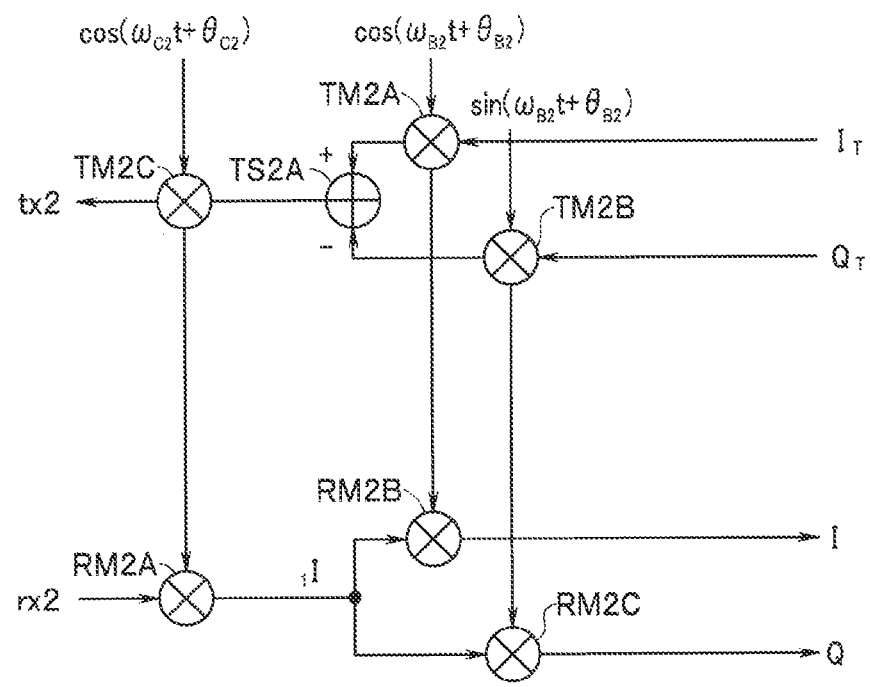
FIG. 45 is a circuit diagram showing an example of specific configurations of the transmitting section 24 and the receiving section 25 shown in FIG. 1.

FIG. 44 is a circuit diagram showing an example of specific configurations of the transmitting section 14 and the receiving section 15 shown in FIG. 1. FIG. 45 is a circuit diagram showing an example of specific configurations of the transmitting section 24 and the receiving section 25 shown in FIG. 1. Note that FIGS. 44 and 45 show transceivers having a heterodyne configuration.

In FIG. 44, a multiplier TM1A gives, to an adder TS1A, a multiplication result of the $I_T$ signal and the local signal $\cos(\omega_{B1}t+\theta_{B1})$ from the oscillator 13. A multiplier TM1B gives, to the adder TS1A, a multiplication result of the $Q_T$ signal and the local signal $\sin(\omega_{B1}t+\theta_{B1})$ from the oscillator 13. The adder TS1A subtracts the output of the multiplier TM1B from the output of the multiplier TM1A and gives a subtraction result to a multiplier TM1C. The multiplier TM1C multiplies together the output of the adder TS1A and a local signal $\cos(\omega_{C1}t+\theta_{C1})$ and outputs a multiplication result as the transmission signal tx1.

A multiplier RM1A multiplies together the received signal rx1 and the local signal $\cos(\omega_C t+\theta_C)$ to obtain an $I_1$ signal and outputs the $I_1$ signal to multipliers RM1B and RM1C. The multiplier RM1B outputs a multiplication result of the $I_1$ signal and the local signal $\cos(\omega_{B1}t+\theta_{B1})$ as an I signal. The multiplier RM1C outputs a multiplication result of the $I_1$ signal and the local signal $\sin(\omega_{B1}t+\theta_{B1})$ as a Q signal.

In FIG. 45, a multiplier TM2A gives, to an adder TS2A, a multiplication result of the $I_T$ signal and the local signal $\cos(\omega_{B2}t+\theta_{B2})$ from the oscillator 23. A multiplier TM2B gives, to the adder TS2A, a multiplication result of the $Q_T$ signal and the local signal $\sin(\omega_{B2}t+\theta_{B2})$ from the oscillator 23. The adder TS2A subtracts the output of the multiplier TM2B from the output of the multiplier TM2A and gives a subtraction result to a multiplier TM2C. The multiplier TM2C multiplies together the output of the adder TS2A and a local signal $\cos(\omega_{C2}t+\theta_{C2})$ and outputs a multiplication result as the transmission signal tx2.

A multiplier RM2A multiplies together the received signal rx2 and the local signal $\cos(\omega_{C2}+\theta_{C2})$ to obtain the $I_1$ signal and outputs the $I_1$ signal to multipliers RM2B and RM2C. The multiplier RM2B outputs a multiplication result of the $I_1$ signal and the local signal $\cos(\omega_{B2}t+\theta_{B2})$ as the I signal. The multiplier RM2C outputs a multiplication result of the $I_1$ signal and the local signal $\sin(\omega_{B2}t+\theta_{B2})$ as the Q signal.

Figure 46:
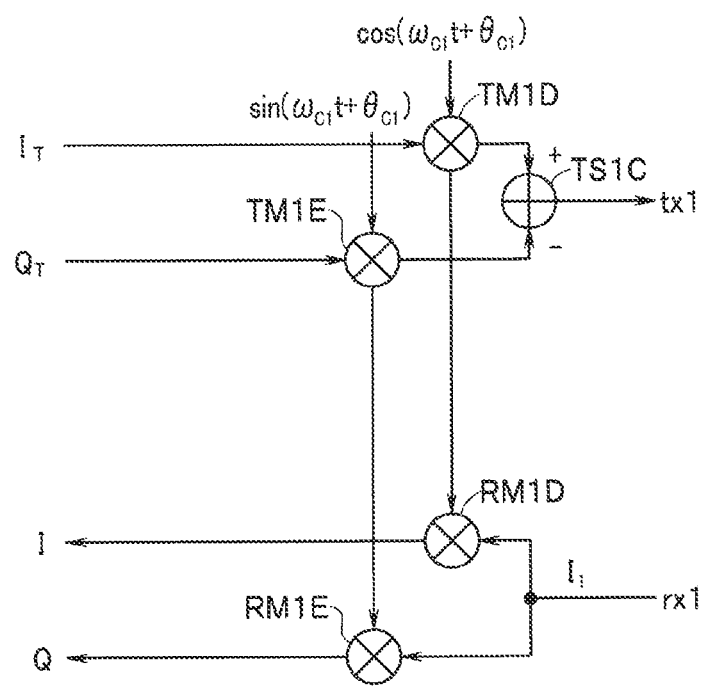
FIG. 46 is a circuit diagram showing an example of the specific configurations of the transmitting section 14 and the receiving section 15 shown in FIG. 1.
Figure 47:
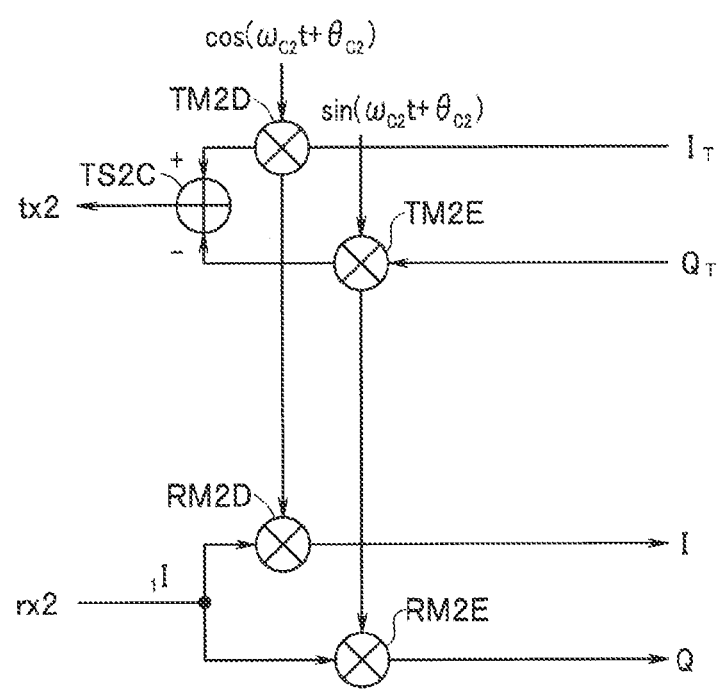
FIG. 47 is a circuit diagram showing an example of the specific configurations of the transmitting section 24 and the receiving section 25 shown in FIG. 1.

FIG. 46 is a circuit diagram showing an example of the specific configurations of the transmitting section 14 and the receiving section 15 shown in FIG. 1. FIG. 47 is a circuit diagram showing an example of the specific configurations of the transmitting section 24 and the receiving section 25 shown in FIG. 1. Note that FIGS. 46 and 47 show transceivers in which a direct conversion scheme is adopted.

In FIG. 46, a multiplier TM1D gives, to an adder TS1C, a multiplication result of the $I_T$ signal and the local signal $\cos(\omega_{C1}t+\theta_{C1})$ from the oscillator 13. A multiplier TM1E gives, to the adder TS1C, a multiplication result of the $Q_T$ signal and the local signal $\sin(\omega_{C1}t+\theta_{C1})$ from the oscillator 13. The adder TS1C subtracts the output of the multiplier TM1E from the output of the multiplier TM1D and outputs a subtraction result as the transmission signal tx1.

A multiplier RM1D multiplies together the received signal rx1 and the local signal $\cos(\omega_{C1}t+\theta_{C1})$ and outputs a multiplication result as the I signal. A multiplier RM1E multiplies together the received signal rx1 and the local signal $\sin(\omega_{C1}t+\theta_{C1})$ and outputs a multiplication result as the Q signal.

In FIG. 47, a multiplier TM2D gives, to the adder TS2C, a multiplication result of the $I_T$ signal and the local signal $\cos(\omega_{C2}t+\theta_{C2})$ from the oscillator 23. A multiplier TM2E gives, to the adder TS2C, a multiplication result of the $Q_T$ signal and the local signal $\sin(\omega_{C2}t+\theta_{C2})$ from the oscillator 23. The adder TS2C subtracts the output of the multiplier TM2E from the output of the multiplier TM2D and outputs a subtraction result as the transmission signal tx2.

A multiplier RM2D multiplies together the received signal rx2 and the local signal $\cos(\omega_{C2}t+\theta_{C2})$ and outputs a multiplication result as the I signal. A multiplier RM2E multiplies together the received signal rx2 and the local signal $\sin(\omega_{C2}t+\theta_{C2})$ and outputs a multiplication result as the Q signal.

(Transmission Example of Phase Information)

In the respective embodiments, the phase information is transmitted from either one of the first device and the second device to the other. However, as explained above, a method of transmitting the phase information is not particularly limited. For example, the phase information may be transmitted by shifting by a phase obtained from a received signal, a phase of a carrier signal to be transmitted.

Figure 48:
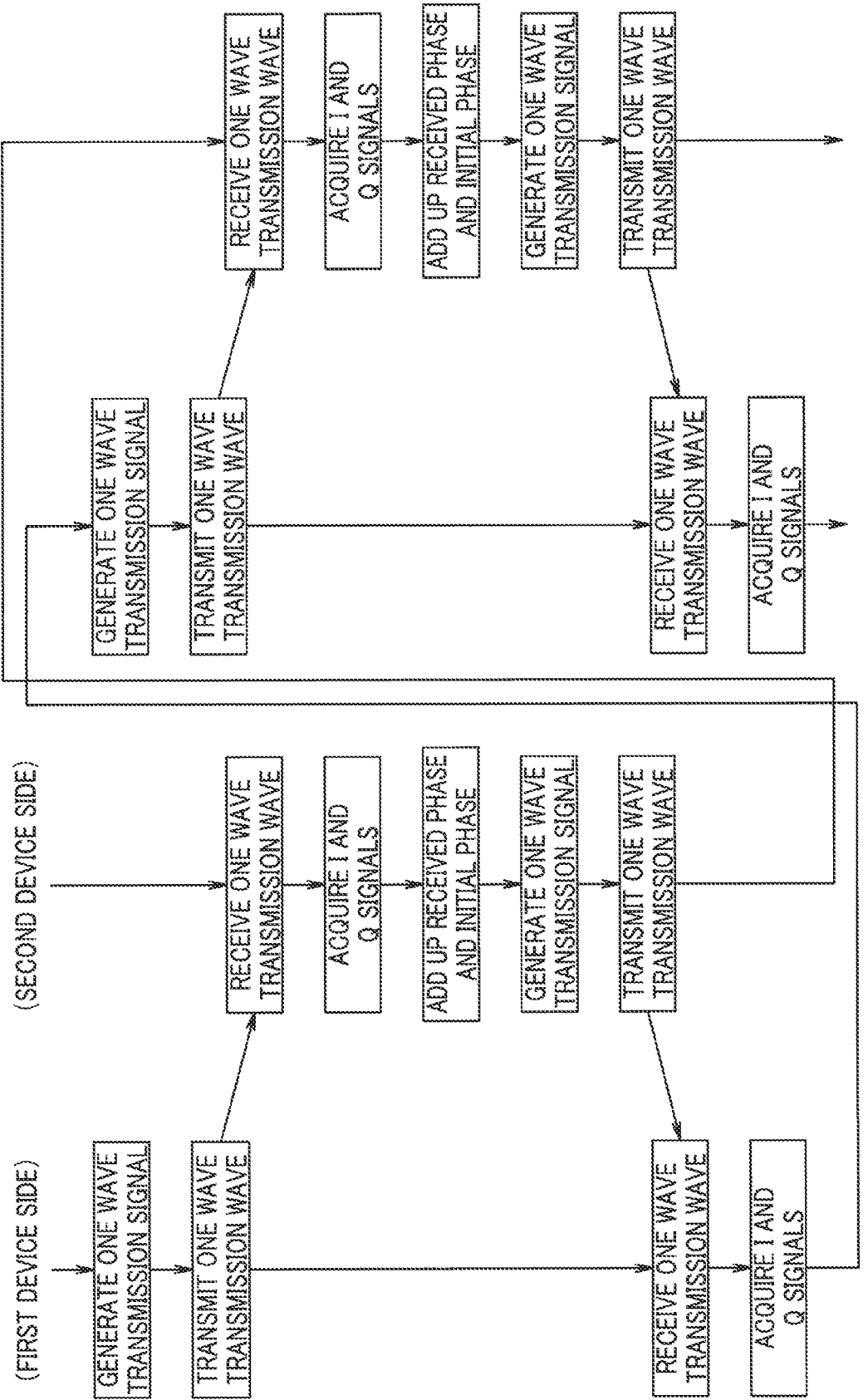
FIG. 48 is a flowchart for explaining an example corresponding to FIG. 11A in which a second device transmits phase information to a first device.

For example, in this case, it is possible to adopt a flow in which the broken line portion of FIG. 6 is replaced with a flow shown in FIG. 48 and steps S7, S8, and S18 in FIG. 6 are omitted.

FIG. 48 is a flowchart for explaining an example corresponding to FIG. 11A in which the second device transmits phase information to the first device. FIG. 48 includes a step of adding up a received phase and an initial phase between the acquisition step for the I and Q signals and the one wave transmission signal generating step in the second device shown in FIG. 11A. Consequently, a carrier signal in which a phase detected from a received signal is added to the initial phase of the device 2 is generated. The device 1 can acquire phase information calculated by the device 2 by receiving the carrier signal from the device 2 and calculating a phase.

Figure 49:
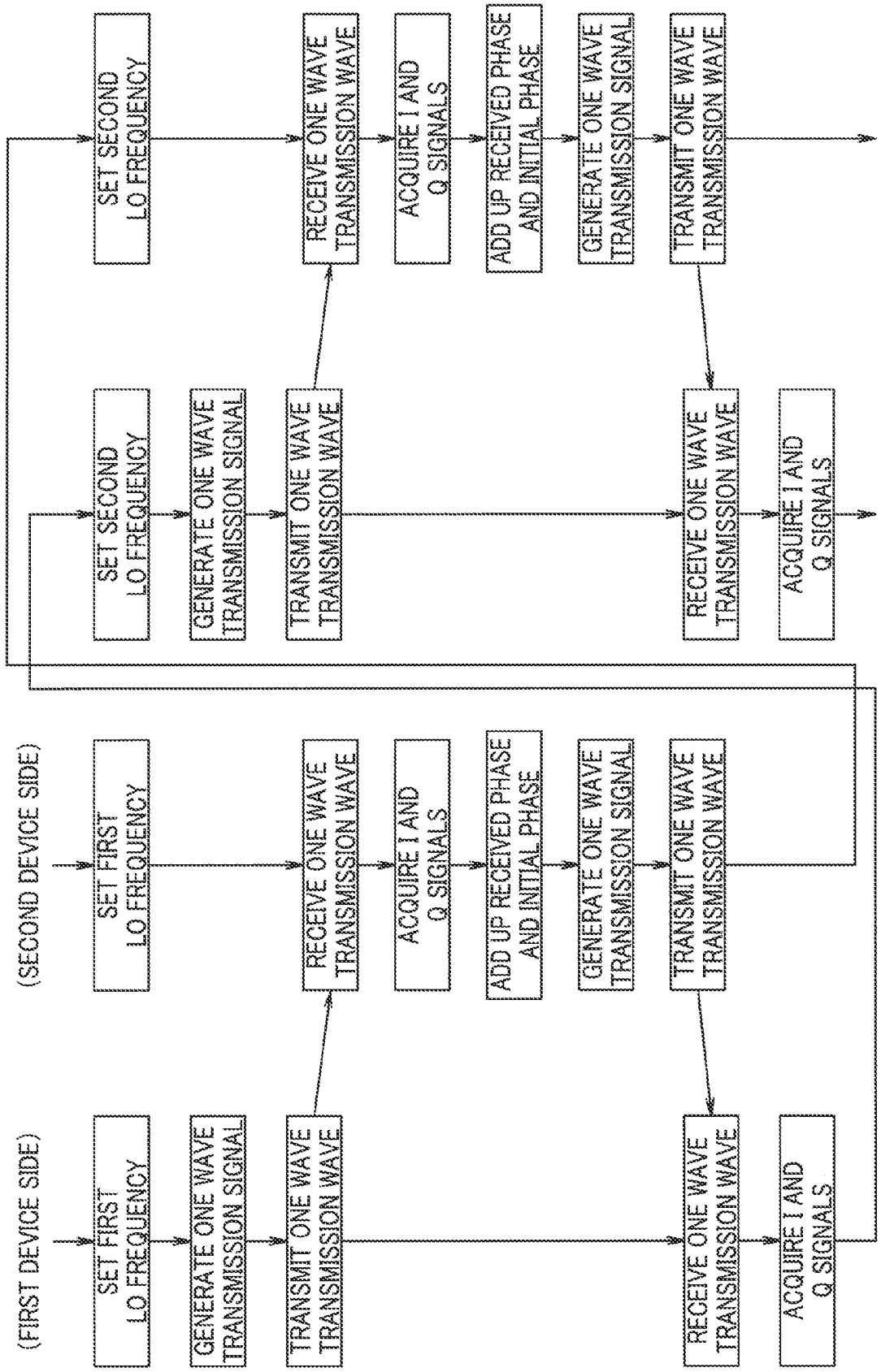
FIG. 49 is a flowchart for explaining an example corresponding to FIG. 39.

FIG. 49 is a flowchart for explaining an example corresponding to FIG. 39. A flow shown in FIG. 49 includes a step of adding up a received phase and an initial phase between the acquisition step for I and Q signals and the one wave transmission signal generating step in the device 2 shown in FIG. 39 In this way, even when the carrier frequency is changed halfway in the distance measurement, the phase information may be transmitted while being included in the information concerning the phase of the carrier signal transmitted for the distance measurement.

While certain embodiments have been described, these embodiments have been presented by way of example only, and are not intended to limit the scope of the inventions.

Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A distance measuring device that calculates a distance between a first device and a second device, at least one of which is movable, on a basis of phases of first to sixth known signals transmitted with a plurality of carrier frequencies, the distance measuring device comprising:
the first device including
a first reference signal source, and
a first transceiver configured to transmit the first known signal corresponding to a first carrier frequency, the second known signal corresponding to a second carrier frequency different from the first carrier frequency, and the third known signal corresponding to a third carrier frequency different from the first and second carrier frequencies, and to receive the fourth known signal corresponding to the first carrier frequency, the fifth known signal corresponding to the second carrier frequency, and the sixth known signal corresponding to the third carrier frequency, using an output of the first reference signal source;
the second device including
a second reference signal source configured to operate independently from the first reference signal source, and
a second transceiver configured to transmit the fourth known signal corresponding to the first carrier frequency, the fifth known signal corresponding to the second carrier frequency, and the sixth known signal corresponding to the third carrier frequency, and to receive the first to third known signals, using an output of the second reference signal source;
a first phase detector provided in the first or second device, the first phase detector being configured to detect phases of the fourth and fifth known signals received by the first transceiver;
a second detector provided in the first or second device, the second detector being configured to detect phases of the first and second known signals received by the second transceiver; and
a calculating section provided in the first or second device, the calculating section being configured to calculate the distance between the first device and the second device, wherein
the first transceiver and the second transceiver perform a total of five times of transmissions and receptions including four times of transmissions and receptions including a plurality of times of transmissions and receptions of at least one of the first, second, fourth, or fifth known signals, and a single time of transmission and reception of at least one of the third or sixth known signals,
at least one of the first phase detector or the second phase detector detects a phase with respect to the first, second, fourth, and fifth known signals,
the calculating section calculates the distance between the first device and the second device by offsetting a frequency difference between the first known signal and fourth known signal and a frequency difference between the second known signal and the fifth known signal by an operation including a difference operation of the phases, and
the calculating section corrects the calculated distance on a basis of an amplitude ratio with respect to the third known signal or the sixth known signal.

2. The distance measuring device according to claim 1, wherein
the first transceiver implements carrier sense of the first to third carrier frequencies before the transmissions of the first to third known signals, respectively, and
the second transceiver implements carrier sense of the fourth to sixth carrier frequencies before the transmissions of the fourth to sixth known signals, respectively.

3. A distance measuring device that calculates a distance between a first device and a second device, at least one of which is movable, on a basis of phases of first to sixth known signals transmitted with a plurality of carrier frequencies, the distance measuring device comprising:
the first device including
a first reference signal source, and
a first transceiver configured to transmit the first known signal corresponding to a first carrier frequency, the second known signal corresponding to a second carrier frequency different from the first carrier frequency, and the third known signal corresponding to a third carrier frequency different from the first and second carrier frequencies, and to receive the fourth known signal corresponding to the first carrier frequency, the fifth known signal corresponding to the second carrier frequency, and the sixth known signal corresponding to the third carrier frequency, using an output of the first reference signal source;
the second device including
a second reference signal source configured to operate independently from the first reference signal source, and
a second transceiver configured to transmit the fourth known signal corresponding to the first carrier frequency, the fifth known signal corresponding to the second carrier frequency, and the sixth known signal corresponding to the third carrier frequency, and to receive the first to third known signals, using an output of the second reference signal source;
a first phase detector provided in the first or second device, the first phase detector being configured to detect phases of the fourth and fifth known signals received by the first transceiver;
a second detector provided in the first or second device, the second detector being configured to detect phases of the first and second known signals received by the second transceiver; and
a calculating section provided in the first or second device, the calculating section being configured to calculate the distance between the first device and the second device, wherein
the first transceiver and the second transceiver perform a total of nine times of transmissions and receptions including eight times of transmissions and receptions including a plurality of times of transmissions and receptions of at least one of the first, second, fourth, or fifth known signals, and a single time of transmission and reception of at least one of the third or sixth known signals,
at least one of the first phase detector or the second phase detector detects a phase with respect to the first, second, fourth, and fifth known signals, the calculating section calculates the distance between the first device and the second device by offsetting a frequency difference between the first known signal and fourth known signal and a frequency difference between the second known signal and the fifth known signal by an operation including a difference operation of the phases, and the calculating section corrects the calculated distance on a basis of an amplitude ratio with respect to the third known signal or the sixth known signal.

4. The distance measuring device according to claim 3, wherein the first transceiver implements carrier sense of the first to third carrier frequencies before the transmissions of the first to third known signals, respectively, and the second transceiver implements carrier sense of the fourth to sixth carrier frequencies before the transmissions of the fourth to sixth known signals, respectively.

\* \* \* \* \*